(12) United States Patent
Piper et al.

(10) Patent No.: US 7,792,162 B2
(45) Date of Patent: Sep. 7, 2010

(54) SELECTABLE MULTIWAVELENGTH LASER FOR OUTPUTTING VISIBLE LIGHT

(75) Inventors: James Austin Piper, Huntley's Cover (AU); Helen Margaret Pask, Seaforth (AU); Hamish Ogilvy, Lane Cove (AU); Richard Paul Mildren, Abbotsford (AU)

(73) Assignee: Lighthouse Technologies Pty Ltd., New South Wales (AU)

( * ) Notice: Subject to any disclaimer, the term of this patent is extended or adjusted under 35 U.S.C. 154(b) by 108 days.

(21) Appl. No.: 11/575,877

(22) PCT Filed: Sep. 23, 2005

(86) PCT No.: PCT/AU2005/001464

§ 371 (c)(1),
(2), (4) Date: Apr. 21, 2008

(87) PCT Pub. No.: WO2006/032105

PCT Pub. Date: Mar. 30, 2006

(65) Prior Publication Data

US 2008/0259969 A1   Oct. 23, 2008

(51) Int. Cl.
*H01S 3/10* (2006.01)
(52) U.S. Cl. ............... 372/21; 372/20; 372/22
(58) Field of Classification Search ........... 372/3, 372/21, 22, 108, 20
See application file for complete search history.

(56) References Cited

U.S. PATENT DOCUMENTS

| | | | |
|---|---|---|---|
| 4,165,469 A | 8/1979 | Ammann | |
| 4,327,337 A | 4/1982 | Liu | |
| 5,088,096 A | 2/1992 | Pocholle et al. | |
| 5,257,274 A * | 10/1993 | Barrett et al. | 372/20 |
| 5,673,281 A * | 9/1997 | Byer | 372/3 |
| 6,304,583 B1 * | 10/2001 | Ohmer et al. | 372/21 |

FOREIGN PATENT DOCUMENTS

EP   1471613 A2   10/2004

OTHER PUBLICATIONS

Lithium Triborate (LBO) crystals. Laser Crystals Solutions—nonlinear optical material retrived for the internet <URL: http://lc-solutions.com/product/lbo.php.

* cited by examiner

*Primary Examiner*—Armando Rodriguez
(74) *Attorney, Agent, or Firm*—Knobbe Martens Olson & Bear LLP

(57) ABSTRACT

The invention provides a laser system (100) wherein the output may be selected from two or more different wavelengths of output laser light. The system (100) comprises a laser capable of having at least two different wavelengths of laser light resonating in the cavity (105) simultaneously. One of the frequencies is generated by a Raman crystal (135) which shifts the frequency of light generated by the lasing medium (125). A tunable non-linear medium (140), such as LBO, is provided in the cavity for selectively frequency converting at least one of the at least two different wavelengths of laser light. The conversion may be SHG, SFG or DFG for example. A tuner (145) is provided to tune the non-linear medium to select the particular wavelength to convert. Temperature tuning or angle tuning of the non-linear medium can be used. A Q switch (130) may also be provided in the cavity. The output laser beam can be used for treatment, detection or diagnosis of a selected area on or in a subject, and can be used in opthalmological and dermatological fields.

50 Claims, 17 Drawing Sheets

SELECTABLE MULTIWAVELENGTH LASER FOR OUTPUTTING VISIBLE LIGHT

TECHNICAL FIELD

The present invention relates to a selectable multiwavelength laser system, a method for selectably providing an output laser beam from a laser system at different wavelengths and methods of using laser light.

BACKGROUND OF THE INVENTION

Solid-state Raman lasers are a practical and efficient approach to optical frequency down conversion, offering high (up to 70 to 80%) conversion efficiencies with respect to the pump power, excellent beam quality and ease of alignment. In recent years use of crystals for stimulated Raman scattering (SRS) has been gaining interest because, in comparison with high-pressure gaseous and dye (liquid) Raman lasers, crystalline Raman lasers offer better gain, better thermal and mechanical properties, and the ability to operate at high pulse repetition frequency. Further they are compatible with compact all solid-state laser technology.

Solid-state lasers are commonly used in the opthalmological and dermatological fields. For these applications there is commonly a need to have available a range of different wavelengths.

U.S. Pat. No. 4,165,469 (Ammann, 1979) revealed a solid-state laser capable of providing different frequencies of laser output light. The laser disclosed in U.S. Pat. No. 4,165,469 is limited to the use of lithium iodate crystal, which performs the functions both of Raman-shifting and of frequency doubling to generate a plurality of possible output frequencies based on the frequency-doubled first, second or higher order Stokes stimulated Raman scattering in the lithium iodate crystal. This limitation is a significant disadvantage, as the laser of the invention is limited to the output frequencies obtainable using lithium iodate, since it is rare to find crystals capable of performing both of these functions together. A further disadvantage is that, since the lithium iodate crystal serves two discrete functions, it is not possible to optimise the position of that crystal independently for two functions. Yet a further disadvantage is that lithium iodate has limited utility in high power applications, since it has a relatively low damage threshold. Yet another disadvantage is that, since the laser of the prior art requires a reasonably long Raman crystal (in order to obtain sufficient gain), and this Raman crystal needs to be rotated in order to achieve phase matching, there will be substantial beam displacement due to refraction when the crystal is off normal incidence. This means that the cavity of the prior art will need to be significantly realigned for each wavelength, which thus greatly reduces the utility of the laser of the prior art.

There is therefore a need for a versatile solid-state laser system wherein the output may be selected from two or more different wavelengths of output laser light, and which is capable of being optimised with respect to generation of Raman wavelengths and independently with respect to subsequent conversion (for example frequency doubling or sum frequency generation) of the Raman wavelength. There is a further need for such a system to be designed so that it is straightforward to manufacture, can be incorporated into a practical device without undue difficulty, and so that the step of selecting a wavelength is easily carried out by the operator or end-user of the system.

OBJECT OF THE INVENTION

It is an object of the present invention to overcome or substantially ameliorate at least one of the above disadvantages. It is another object to at least partially satisfy at least one of the abovementioned needs. It is a further object to provide a laser system capable of selecting between two or more wavelengths of output laser light.

SUMMARY OF THE INVENTION

In broad aspect of the invention there is provided laser system, the system comprising:

a) a resonator cavity capable of having at least two laser light beams, each beam being of a different wavelength, resonating in the cavity simultaneously;

b) a tunable non-linear medium, which does not Raman frequency shift the laser light beams, disposed in the cavity to selectively frequency convert at least one of the laser light beams to a frequency altered laser light beam comprising a single converted wavelength;

c) a tuner to tune the non-linear medium; and d) an output coupler for outputting the frequency altered laser light beam from the cavity.

Each of the different wavelengths may be single wavelength or a band of wavelengths. The wavelength differences between the frequency altered wavelength and the wavelengths of the two laser light beams may be of a such a magnitude to enable the tunable non-linear medium to selectively frequency convert one of these wavelengths but not any of the other wavelengths at the same time. Where a Raman-active medium is disposed in the cavity the tunable non linear medium in the cavity may be different from the Raman-active medium. The tuner may be adapted to tune and detune the non-linear medium. There may be two or more tunable non-linear media and two or more tuners. Each non-linear medium may have a tuner associated therewith or coupled thereto which is adapted to tune and detune the non-linear medium with which it is associated or coupled. The frequency altered laser light comprising a single converted wavelength may comprise a wavelength that is a frequency doubled, frequency tripled, frequency quadrupled, frequency summed or frequency differenced wavelength or otherwise frequency transformed, that has been derived from at least one of the laser light beams.

The resonator cavity may comprise an intracavity etalon. The resonator cavity may comprise at least two reflectors, there is a laser material located in the cavity, a pump source located outside of the cavity for pumping the laser material with a pump beam to generate a cavity laser beam, optionally, a Q-switch for converting continuous laser light into pulsed laser light and a Raman-active medium located in the cavity for Raman-shifting the wavelength of the cavity laser beam and wherein the tunable non-linear medium is disposed in the cavity to selectively frequency convert a laser light beam selected from the group consisting of the cavity laser beam and laser beams which have been produced through wavelength-shifting of the cavity laser beam by the Raman-active medium, to a frequency altered laser light beam comprising a single converted wavelength. One or more of the laser material, the Raman-active medium and the non-linear medium may be a solid. The tunable non-linear medium may be tuned to selectively frequency convert at least one of the laser light beams to a frequency altered laser light beam comprising a single converted visible is wavelength. The tunable non-linear medium may be tuned to selectively frequency convert at least one of the laser light beams to a frequency altered laser light beam comprising a single converted visible wavelength in the range from 532 nm to 658 nm. The tunable non-linear medium may be tuned to selectively frequency convert at least one of the laser light beams to a frequency altered laser light beam comprising a single converted visible wavelength selected from the group consisting of 532 nm, 555 nm, 559 nm, 579 nm, 588 nm, 606 nm, 621 nm, 636 nm and 658 nm. The tuner may be selected from the group consisting of an angle tuner and a temperature tuner. The non-linear medium may be selected from the group consisting of a temperature tunable non-linear medium, an angle tunable non-linear medium. There may be two or more tunable non-linear media. The non-linear medium may comprise a periodic structure which forms a grating within the medium, and wherein the tuner comprises a mechanical translator, for translating the non-linear medium laterally to the laser beam. The non-linear medium may be a single, temperature tunable non-linear medium oriented in the cavity such that laser beams passing therethrough undergo total internal reflection within the medium.

In one form of the invention there is provided a laser system wherein the output may be selected from two or more different wavelengths of output laser light, said system comprising:

a) a laser capable of having at least two different wavelengths of laser light resonating therein simultaneously;

b) a non-linear medium for selectively frequency converting at least one of the at least two different wavelengths of laser light;

c) a tuner to tune the non-linear medium to selectively frequency convert at least one of the at least two different wavelengths of laser light to generate a single converted wavelength of laser light; and d) an output coupler for outputting the single converted wavelength of laser light.

The tuner may be for tuning the non-linear medium to selectively frequency convert one of the at least two different wavelengths of laser light to generate laser light comprising a single converted wavelength. The tuner may be for tuning the non-linear medium to selectively frequency convert two or more of the at least two different wavelengths of laser light to generate laser light comprising two or more converted wavelengths.

The frequency converting may comprise frequency doubling, sum frequency generation, difference frequency generation, or other parametric non-linear frequency conversion. Thus the non-linear medium may be capable of selectively converting a single wavelength by frequency doubling (second harmonic generation: SHG), or a pair of wavelengths by sum frequency generation (SFG) or difference frequency generation (DFG). The non-linear medium may be capable of being tuned to generate more than one frequency of laser light simultaneously, and may generate 1, 2, 3, 4 or 5 or more than 5 frequencies simultaneously. The laser may be any multi-wavelength laser, and may be a Raman laser, and may be a solid state laser. The laser system may comprise a cavity, or resonator, defined by at least two reflectors, and the non-linear medium may be in the cavity. The resonator may be a high-Q resonator, and may be high Q for each wavelength of laser light that resonates in the resonator. This may be achieved by use of mirrors that are highly reflective for said wavelengths. The reflectance of the mirrors may be greater than about 95%, or greater than about 96, 97, 98, 99 or 99.5% at said wavelengths, and may be about 95, 96, 97, 98, 99 or 99.5%. In an embodiment, the single converted wavelength of laser light may not resonate in the cavity. For high efficiency, the single converted wavelength may make as few passes within the resonator as possible. Accordingly, the output coupler may be as highly transmissive as possible toward the single converted wavelength. In an embodiment, the output coupler may be greater than about 50% transmissive toward the single converted wavelength, or greater than about 60, about 70, about 80, about 90, about 95 or about 99% transmissive towards the single converted wavelength, and further may be for example about 50, about 55, about 60, about 65, about 70, about 75, about 80, about 85, about 90, about 95, about 96, about 97, about 98, about 99 or about 99.5 transmissive towards the single converted wavelength. The output coupler may comprise at least one of the at least two reflectors which define the cavity, which may be at least partially transmissive for the wavelength that is outputted from the cavity, and may be at least partially reflective for the other wavelength(s) resonating in the cavity. The output coupler may alternatively be a polarisation coupling device for example an intracavity polarising beam splitter.

The laser may comprise:

a) a resonator cavity comprising at least two reflectors;

b) a laser material located in the cavity;

c) a pump source located outside of the cavity for pumping the laser material with a pump beam to generate a cavity laser beam;

d) optionally, a Q-switch for converting continuous laser light into pulsed laser light; and e) a Raman-active medium located in the resonator cavity for Raman-shifting the wavelength of the cavity laser beam.

The output coupler may output the single converted wavelength of laser light from the cavity.

The Raman-active medium, or Raman crystal, may be capable of Raman-shifting a laser beam generated by the laser material (i.e. a fundamental frequency laser beam).

The non-linear medium for selectively frequency converting at least one of the at least two different wavelengths of laser light may be disposed in the cavity. The non-linear medium may be a tunable non-linear medium. The non-linear medium, does not Raman frequency shift the two different wavelengths of laser light. The non-linear medium may be disposed in the cavity and may be capable of selectively frequency converting either one wavelength (in the case of SHG) of laser light, a pair of wavelengths (in the case of SFG or DFG) of laser light, or other wavelength(s) by other parametric non-linear frequency conversion, said wavelength(s) of laser light being selected from the group consisting of the cavity laser beam and laser beams which have been produced through wavelength-shifting of the cavity laser beam by the Raman-active medium, to generate a single converted wavelength of laser light.

In a first aspect of the invention there is provided a laser system, said system comprising:

a) a resonator cavity comprising at least two reflectors;

b) a laser material located in the cavity;

c) a pump source located outside of the cavity for pumping the laser material with a pump beam to generate a cavity laser beam;

d) optionally, a Q-switch for converting continuous laser light into pulsed laser light;

e) a Raman-active medium located in the resonator cavity for Raman-shifting the wavelength of the cavity laser beam;

f) at least one tunable non-linear medium disposed in the cavity to selectively frequency convert a laser beam selected from the cavity laser beam and Raman shifted laser beams which have been produced through wavelength-shifting of the cavity laser beam by the Raman-active medium, to a frequency altered laser light beam comprising a single converted wavelength;

g) a tuner to tune the non-linear medium; and h) an output coupler to output the frequency altered laser light beam from the cavity.

The wavelength differences between the frequency altered wavelength and the wavelengths of the two laser light beams may be of a such a magnitude to enable the tunable non-linear medium to selectively frequency convert one of these wavelengths but not any of the other wavelengths at the same time. The tunable non linear medium may be different from the Raman-active medium. The tuner may be adapted to tune and detune the non-linear medium. There may be two or more tunable non-linear media and two or more tuners. Each non-linear medium may have a tuner associated therewith or coupled thereto which is adapted to tune and detune the non-linear medium with which it is associated or coupled. The converted laser light beam comprising at least one converted wavelength may comprise a wavelength that is a frequency doubled, frequency tripled, frequency quadrupled, frequency summed or frequency differenced wavelength or otherwise wavelength converted that has been derived from at least one of the cavity and Raman shifted laser light beams.

In a particular embodiment of the invention there is provided a laser system wherein the output may be selected from two or more different wavelengths of output laser light, said system comprising:

a) a resonator cavity comprising at least two reflectors;

b) a laser material located in the cavity;

c) a pump source located outside of the cavity for pumping the laser material with a pump beam to generate a cavity laser beam;

d) optionally, a Q-switch for converting continuous laser light into pulsed laser light;

e) a Raman-active medium located in the resonator cavity for Raman-shifting the wavelength of the cavity laser beam;

f) a tunable non-linear medium disposed in the cavity for selectively frequency converting either one wavelength (in the case of SHG) of laser light or a pair of wavelengths (in the case of SFG or DFG) of laser light, said wavelength(s) of laser light being selected from the group consisting of the cavity laser beam and laser beams which have been produced through wavelength-shifting of the cavity laser beam by the Raman-active medium, to generate a single converted wavelength of laser light;

g) a tuner to tune the non-linear medium to frequency convert one wavelength or a pair of wavelengths of laser light to generate a single converted wavelength of the laser beam; and h) an output coupler to output the single converted wavelength of the laser beam which has been produced by frequency conversion by the non-linear medium from the resonator cavity.

The resonator cavity may comprise two, three or more than three reflectors. At least one of the reflectors may be partially reflective, or may be reflective towards some wavelengths and transmissive towards other wavelengths. The cavity may be a straight cavity, a bent cavity, a folded cavity, an L-cavity, a Z-cavity, or some other configuration of cavity. At least one of the reflectors may be at least partially reflective towards the wavelengths of laser light that resonate within the resonator cavity, and at least one of the reflectors may be at least partially transmissive towards a wavelength of output laser light. At least one of the reflectors may function as the output coupler or there may be a separate output coupler. In the case that there is a separate output coupler, none of the reflectors may be transmissive towards the wavelength of output laser light, or one or more reflectors may be transmissive towards the wavelength of output laser light. One or more of the laser material, the Raman-active medium and the non-linear medium may be solid. The frequency converting process may be sum frequency generating, difference frequency generating, frequency doubling or other parametric non-linear frequency conversion. The non-linear medium may be a second harmonic generator, a sum frequency generator, an optical parametric oscillator (OPO) or some other type of non-linear medium, and may comprise one or more individual non-linear media. The pump source may be a flashlamp, an arclamp or a diode laser and the pump source may be capable of end pumping or side pumping the laser material. The output coupler may comprise a mirror or a reflector or some other output coupler, and may comprise at least one of the at least two reflectors which define the resonator cavity, which is at least partially transmissive for the particular range of wavelengths that may be outputted from the cavity. The output coupler may alternatively be a polarisation coupling device for example an intracavity polarising beam splitter. The operation of the laser is not strongly dependent on the location of the Q-switch. The Q-switch, if present, may produce pulsed high power laser light. The single converted wavelength of laser beam that is outputted from the cavity by the output coupler may be a visible wavelength or may be some other wavelength. The Raman-active medium may be in a fixed location and/or orientation within the resonator cavity. The Raman-active medium may be aligned along the axis of the cavity at all times during operation of the laser system. The Raman-active medium in one embodiment may not be rotated during operation of the laser system.

In an embodiment, the tuner comprises an angle-tuner for angle-tuning the non-linear medium in order to select which wavelength or pair of wavelengths will be converted, and may comprise an angle-tuning device such as a motor or a piezo-electric or manually or mechanically or electrically or hydraulically alterable holder, clamp, or other device. The holder or clamp may be adapted to hold or clamp the non-linear medium and may be adapted to be manually or mechanically or electrically or hydraulically altered so as to change the angle of the non-linear medium in the cavity.

In another embodiment, the tuner comprises a temperature tuner for temperature-tuning the non-linear medium in order to select which wavelength or pair of wavelengths will be converted, and may comprise a temperature-tuning device, such as a heater and/or a cooler. When the non-linear medium is temperature tuned, the non-linear medium may be in a fixed location and/or orientation within the resonator cavity. The non-linear medium may be aligned along the axis of the cavity at all times during operation of the laser system. In another embodiment, the non-linear medium may not be rotated during operation of the laser system.

In yet another embodiment, the non-linear medium comprises two or more individual non-linear media, each of which is configured to convert a different wavelength or pair of wavelengths of incident laser beam. One or more of the individual non-linear media may be a second harmonic generator, a sum frequency generator or other parametric non-linear frequency generator such as an optical parametric oscillator. In this embodiment, the individual non-linear medium that corresponds to the particular incident wavelength or pair of wavelengths to be shifted may be tuned by maintaining the non-linear medium at an appropriate temperature or angle, while the other non-linear medium (media) may be detuned by maintaining at an appropriate temperature or angle. The appropriate temperature for tuning may be different to the appropriate temperature for detuning. The two or more individual non-linear media may be located so that each is at a position in the cavity where the diameter of the beam to be wavelength shifted is sufficiently small to achieve acceptable conversion efficiency. That position may be at or near the beam waist, or at a position of small beam size, of the particular incident beam wavelength to which the individual non-linear medium may be tuned. In this embodiment, the tuner may comprise two or more individual tuners, each corresponding to a single individual non-linear medium, and the individual tuners may be temperature-tuners or angle-tuners. Alternatively two or more individual non-linear media may be located and cut so that each is capable of converting a single frequency or pair of frequencies of those resonating in the cavity, whereby the temperatures at which the individual non-linear media are capable of converting are close, for example within about 20° C., or within about 15° C., about 10° C., about 5° C., about 4° C., about 3° C., about 2° C. or about 1° C. In this alternative embodiment, a single temperature-tuner may adjust the temperatures of all of the individual non-linear media simultaneously, whereby at any particular temperature, no more than one of the individual non-linear media is capable of converting the frequency of laser light to which it corresponds.

It is possible to operate a laser according to the present invention such that more than one of the individual non-linear media is capable of converting the frequency of laser light to which it corresponds. For example, in a situation in which one of the non-linear media is capable of doubling the fundamental frequency of the laser system, energy from the fundamental frequency may be removed from the cavity in the form of an output laser beam obtained by doubling the fundamental frequency. This may occur to an extent where the threshold for conversion of the fundamental frequency to the first Stokes frequency by the Raman-active medium is not reached. A second non-linear medium may then be capable of doubling the first Stokes frequency but may have zero output power, since the first Stokes frequency would not be generated. Another example is that of frequency tripling (third harmonic generation). In this case, for example, a fundamental beam at 1064 nm may be doubled by a first non-linear medium to provide a 532 nm laser beam. A second non-linear medium may be tuned to frequency sum the beams at 1064 and 532 nm to generate the frequency tripled beam at 355 nm, which may then be outputted from the laser cavity.

In still another embodiment, the non-linear medium comprises a single non-linear medium, in which the non-linear medium is cut such that it may be temperature tuned to select either the input laser beam or an internally reflected laser beam. The non-linear medium may be angled such that an incident laser beam is internally reflected within the non-linear medium. The non-linear medium may therefore be tuned to selectively convert either the incident laser beam or the internally reflected laser beam. In this embodiment, the tuner comprises a temperature tuner for temperature-tuning the non-linear medium in order to select which frequency of incident laser light is converted.

In a particular embodiment, the laser system comprises:

a) at least one resonator cavity comprising at least two reflectors;

b) a laser material located in the at least one resonator cavity;

c) a pump source located outside of the at least one resonator cavity for pumping the laser material with a pump beam to generate a cavity laser beam;

d) a Q-switch for converting the cavity laser beam into a pulsed cavity laser beam;

e) a Raman-active medium located in the at least one resonator cavity for shifting the wavelength of the pulsed cavity laser beam;

f) two or more individual non-linear media, each of which is configured to frequency convert a different wavelength (in the case of SHG) or pair of wavelengths (in the case of SFG or DFG) of incident laser beam, said individual non-linear media being disposed in the cavity for frequency converting one or more laser beams selected from the group consisting of the pulsed cavity laser beam and a laser beam(s) which has (have) been produced through wavelength-shifting of the pulsed cavity laser beam by the Raman-active medium;

g) two or more individual angle- or temperature-tuning devices, each corresponding to a single individual non-linear medium, to individually tune the individual non-linear medium to frequency convert a single wavelength of laser light (in the case of SHG) or a pair of wavelengths of laser light (in the case of SFG or DFG), said wavelength(s) being selected from the group consisting of the cavity laser beam and a laser beam(s) which has (have) been produced through wavelength-shifting of the cavity laser beam by the Raman-active medium; and h) an output coupler for outputting from the resonator cavity a laser beam which has been produced by frequency conversion by one of the individual nonlinear media.

One of the two reflectors may be at least partially transmissive at the wavelength of the laser beam which has been produced by frequency conversion by one of the individual nonlinear media, and may function as the output coupler. Each of the two or more individual temperature-tuning devices may be capable of detuning the individual non-linear medium to which it corresponds so that the non-linear medium is incapable of frequency converting a wavelength or a pair of wavelengths selected from the group consisting of the cavity laser beam and a laser beam(s) which has (have) been produced through wavelength-shifting of the cavity laser beam by the Raman-active medium.

The laser system may further comprise an intracavity etalon. The intracavity etalon may prevent generation of parasitic laser wavelengths. The oscillation of these parasitic wavelengths with the fundamental may be the cause of very high laser fields (spiking) that surpass the damage threshold of the laser optics. The use of an etalon in the laser system of the present invention is particularly relevant to flashlamp pumped cavities although the intracavity etalon may be used in all cavities.

In a second aspect of this invention there is provided a method for selectively providing an output laser beam from a laser system, said method comprising:

a) generating two laser light beams in a resonator cavity, each beam being of a different wavelength, and resonating in the cavity simultaneously;

b) selectively frequency converting at least one of the laser light beams to a frequency altered laser light beam comprising a single converted wavelength said frequency converting not comprising a Raman frequency shift; and c) outputting the frequency altered laser light beam from the cavity.

The method of may further comprise:

d) selectively frequency converting at least one of the laser light beams to a different frequency altered laser light beam comprising a different single converted wavelength said frequency converting not comprising a Raman frequency shift and said different single converted wavelength not being the same as the single converted wavelength of step (b); and e) outputting the different frequency altered laser light beam from the cavity.

The method may further comprise:

d) stopping the outputting of the frequency altered laser light beam from the cavity in step c);

e) selectively frequency converting at least one of the laser light beams to a different frequency altered laser light beam comprising a different single converted wavelength said frequency converting not comprising a Raman frequency shift and said different single converted wavelength not being the same as the single converted wavelength of step (b); and f) outputting the different frequency altered laser light beam from the cavity.

Step a) may comprise generating a cavity laser beam in a resonator cavity by pumping a laser material located in the resonator cavity with a pump beam from a pump source located outside the cavity, shifting the wavelength of a portion of the cavity laser beam by passing the laser beam through at least one Raman-active medium located in the resonator cavity to form a Raman shifted beam wherein the cavity laser beam and the Raman shifted beam resonate in the cavity simultaneously.

Step b) may comprise sum frequency generating, difference frequency generating or frequency doubling.

Step b) may comprise a step selected from the group consisting of selectively frequency converting at least one of the laser light beams to a frequency altered laser light beam comprising a single converted wavelength said frequency converting not comprising a Raman frequency shift by angle-tuning a non-linear medium in the resonator cavity and selectively frequency converting at least one of the laser light beams to a frequency altered laser light beam comprising a single converted wavelength said frequency converting not comprising a Raman frequency shift by temperature-tuning a non-linear medium in the resonator cavity.

Step b) may comprise selectively frequency converting at least one of the laser light beams to a frequency altered laser light beam comprising a single converted wavelength said frequency converting not comprising a Raman frequency shift by tuning a first non-linear medium in the resonator cavity and detuning a second non-linear medium whereby the second non-linear medium does not frequency convert at least one of the laser light beams.

Step b) may comprise selectively frequency converting at least one of the laser light beams to a frequency altered laser light beam comprising a single converted wavelength said frequency converting not comprising a Raman frequency shift by tuning a first non-linear medium in the resonator cavity and detuning a second non-linear medium whereby the second non-linear medium does not frequency convert at least one of the laser light beams; and step d) may comprise selectively frequency converting at least one of the laser light beams to a different frequency altered laser light beam comprising a different single converted wavelength said frequency converting not comprising a Raman frequency shift and said different single converted wavelength not being the same as the single converted wavelength of step (b) and detuning the first non-linear medium whereby the first non-linear medium does not frequency convert at least one of the laser light beams.

Step (b) may comprise selectively frequency converting at least one of the laser light beams to a frequency altered laser light beam comprising a single converted visible wavelength said frequency converting not comprising a Raman frequency shift.

Step (b) may comprise selectively frequency converting at least one of the laser light beams to a frequency altered laser light beam comprising a single converted visible wavelength in the range from 532 nm to 658 nm.

Step (b) may comprise selectively frequency converting at least one of the laser light beams to a frequency altered laser light beam comprising a single converted visible wavelength selected from the group consisting of 532 nm, 555 nm, 559 nm, 579 nm, 588 nm, 606 nm, 621 nm, 636 nm and 658 nm.

In another aspect of the invention there is provided a method for selectively providing an output laser beam from a laser system, said method comprising:

a) generating two laser beams comprising at least two different wavelengths in a resonator cavity;

b) selectively converting the frequency of at least one of the two different wavelengths to form converted laser light comprising at least one converted wavelength; and outputting the converted laser light.

The method may further comprise the steps of a) selectively converting the frequency of at least one of the two different wavelengths to form a different converted laser light comprising at least one different converted wavelength wherein the different converted wavelength is different from the converted wavelength; and b) outputting the different converted laser light.

In a particular embodiment there is provided a method for selectively providing an output laser beam from a laser system, said laser beam having a wavelength which may be selected from two or more different wavelengths, said method comprising:

a') generating a cavity laser beam within a resonator cavity by pumping a laser material located in the cavity with a pump beam from a pump source located outside the cavity;

b') passing the cavity laser beam through a Q-switch to produce a pulsed cavity laser beam;

c') shifting the wavelength of at least a portion of the pulsed cavity laser beam by passing the pulsed cavity laser beam through a Raman-active medium located in the resonator cavity;

d') selecting a single wavelength or pair of wavelengths of laser light to be frequency converted, said selecting comprising tuning a non-linear medium located within the cavity to be capable of frequency converting the wavelength or the pair of wavelengths, said wavelength(s) being selected from the group consisting of the pulsed cavity laser beam and laser beams which have been produced through wavelength-shifting of the pulsed cavity laser beam by the Raman-active medium, and detuning at least one other non-linear medium located within the cavity so that it is incapable of frequency converting the wavelengths of said group;

e') frequency converting the selected single wavelength or pair of wavelengths of laser light using the non-linear medium which has been tuned in step c), to generate a single converted wavelength of laser beam; and f') outputting from the laser system the single converted wavelength of laser beam which has been produced by frequency conversion by the non-linear medium.

Step a') may comprise focusing the pump beam on the laser material. The pumping may comprise end-pumping or side-pumping. The non-linear medium may be a second harmonic generator or a sum frequency generator or it may be some other type of non-linear medium. The frequency converting may be sum frequency generating, difference frequency generating or frequency doubling. The method may also comprise the step of passing a laser beam through a Q-switch in order to provide pulsed laser radiation, which may be pulsed high power laser radiation. The step of outputting may be by means of an output coupler, and may comprise passing the laser beam through a reflector which is at least partially transmissive for the wavelength of laser light that has been converted by the non-linear medium. In the method, the Raman-active medium, or Raman crystal, may Raman-shift the cavity laser beam generated by the laser material (i.e. a fundamental frequency laser beam) but may not frequency double a laser beam resonating in the cavity.

In an embodiment, the step of selecting comprises angle-tuning the non-linear medium so that it is capable of shifting a laser beam or a pair of laser beams resonating in the cavity, said beam or pair of beams being appropriate for generating the selected wavelength of output laser light.

In another embodiment, the step of selecting comprises temperature-tuning the non-linear medium so that it is capable of shifting a laser beam or a pair of laser beams resonating in the cavity, said beam or pair of beams being appropriate for generating the selected wavelength of output laser light.

In yet another embodiment, the step of selecting comprises tuning a non-linear medium which comprises two or more individual non-linear media, each of which is capable of shifting a different wavelength of incident laser beam. One or more of the individual non-linear media may be second harmonic generators. In this embodiment, one or more individual non-linear media that correspond to output laser beams at wavelengths that are not selected may be temperature-detuned or angle-detuned, and an individual non-linear medium that corresponds to an output laser beam of the selected wavelength may be temperature tuned or angle tuned. Alternatively, if two or more individual non-linear media are be located and cut so that each is capable of converting a single frequency of those resonating in the cavity, whereby the temperatures at which the individual non-linear media are capable of converting are close, the process of selecting may comprise adjusting the temperatures of all of the individual non-linear media simultaneously, whereby at any particular temperature, no more than one of the individual non-linear media is capable of converting the frequency of laser light to which it corresponds.

In still another embodiment, the non-linear medium comprises a single non-linear medium, in which the non-linear medium is cut such that it may be temperature tuned to convert a first frequency of incident laser light passing through the medium at a first angle (i.e. along a first axis of propagation), or a second frequency of incident laser light passing through the medium at a second angle (i.e. along a second axis of propagation). The non-linear medium may be angled such that an incident laser beam entering at the first angle is internally reflected within the non-linear medium so that it exits at the second angle. In this embodiment, the step of selecting a single wavelength or pair of wavelengths comprises temperature-tuning the non-linear medium in order to select which frequency of incident laser light is converted. The non-linear medium may be temperature tuned to convert one or more of the incoming wavelengths on either the first or the second axis of propagation.

The method may further comprise a step of providing an intracavity etalon. The intracavity etalon may prevent generation of parasitic laser wavelengths. The oscillation of these parasitic wavelengths with the fundamental may be the cause of very high laser fields (spiking) that surpass the damage threshold of the laser optics. The step of providing an intracavity etalon is particularly relevant to flashlamp pumped Q-switched cavities although an intracavity etalon may be used in all cavities.

The laser material may be for example a Nd doped laser material, and may generate a cavity laser beam of between about 1.0 and 1.1 microns, for example about 1.06 microns, and the Raman-active medium may be capable of wavelength shifting the cavity laser beam to wavelengths between about 1.1 and 1.4 microns. In this example the selectable output may occur at discrete wavelengths within the range comprising green, yellow, orange and red.

In a third aspect of the invention there is provided a method of using a laser system according to the invention for treating, detecting or diagnosing a selected area on or in a subject requiring such diagnosis or treatment, comprising illuminating the selected area with the output laser beam from the laser system of the invention. In one form there is provided a method of treatment, detection or diagnosis of a selected area on or in a subject requiring such diagnosis or treatment, comprising (a) generating two laser light beams in a resonator cavity, each beam being of a different wavelength, and resonating in the cavity simultaneously, (b) selectively frequency converting at least one of the laser light beams to a frequency altered laser light beam comprising a single converted wavelength said frequency converting not comprising a Raman frequency shift, (c) outputting the frequency altered laser light beam from the cavity, and (d) illuminating the selected area with the frequency altered laser light beam.

Step (b) may comprise selectively frequency converting at least one of the laser light beams to a frequency altered laser light beam comprising a single converted visible wavelength said frequency converting not comprising a Raman, frequency shift.

Step (b) may comprise selectively frequency converting at least one of the laser light beams to a frequency altered laser light beam comprising a single converted visible wavelength in the range from 532 nm to 658 nm.

Step (b) may comprise selectively frequency converting at least one of the laser light beams to a frequency altered laser light beam comprising a single converted visible wavelength selected from the group consisting of 532 nm, 555 nm, 559 nm, 579 nm, 588 nm, 606 nm, 621 nm, 636 nm and 658 nm.

The selected area may be illuminated with a laser beam having a wavelength, and for a time and at a power level, which is appropriate and effective for the diagnosis or therapeutically effective for the treatment. The subject may be a mammal or vertebrate or other animal or insect, or fish. The method of the invention may find particular application in treating the eyes and skin of a mammal or vertebrate. The laser system may be a solid-state laser system.

In a fourth aspect of the invention, there is provided a laser system according to the invention when used for treating, detecting or diagnosing a selected area requiring such diagnosis or treatment on or in a subject. The laser system may be a solid-state laser system. In a fifth aspect of the invention, there is provided a use of a laser system according to the invention in the treatment, detection, or diagnosis of a selected area on or in a subject requiring such diagnosis or treatment, wherein the use comprises the illumination of the selected area with the output laser beam from the laser system of the invention. In such a use, the laser system may be a solid-state laser system.

In a sixth aspect of the invention, there is provided an apparatus for selectively providing an output laser beam from a laser system comprising the laser system of the invention.

DETAILED DESCRIPTION OF THE INVENTION

In a laser system according to the present invention, a laser beam is generated in a cavity, and wavelength shifted using a Raman active medium, such that a plurality of frequencies of laser beam are resonating within the cavity simultaneously. The cavity may be a high-Q cavity for all of the frequencies of laser beam that are resonating therein. This may be accomplished by suitable choice of mirrors, or reflectors, and coatings thereon in order to achieve high reflectivity for the frequencies in the cavity. By passing these frequencies to a non-linear medium such as a frequency doubler, a sum frequency generator or an optical parametric oscillator that is capable of being tuned to convert a selected frequency or pair of frequencies of those laser beams resonating in the cavity, single frequencies of output laser light may be generated selectably. An output reflector capable of transmitting laser light within the range of output wavelengths which may be selected, but reflective to the unconverted wavelengths, allows output of a selected visible wavelength of laser light, while allowing the unconverted wavelengths to continue to resonate within the cavity. By tuning the non-linear medium to convert a different frequency or pair of frequencies, a different frequency of output laser light may be generated. Under certain conditions, described herein, it may be possible to tune the non-linear medium so as to generate more than one converted frequency or converted wavelength simultaneously. In this manner, the laser may output a single frequency at a time, or may output more than one frequency simultaneously. The output reflector may be an output coupler, for decoupling and outputting an output beam from the cavity. The output reflector may be highly reflective for those frequencies that resonate within the cavity and are not outputted therefrom (commonly the fundamental frequency and Stokes frequencies) and may be at least partially transmissive, possibly highly transmissive, for all frequencies that may be selected to be outputted from the cavity (commonly frequencies that have been shifted by the non-linear medium).

In a laser system according to the present invention, a cascading process, or cavity dumping, may occur. Thus initially a fundamental laser frequency is generated within the laser cavity. If a non-linear medium is provided that is tuned to convert the fundamental frequency, a converted frequency is generated by the non-linear medium, which may then be outputted from the cavity by means of the output coupler. If the non-linear medium is not tuned to convert the fundamental frequency, the fundamental frequency may be converted by an intra-cavity Raman-active medium to generate a first Stokes frequency (i.e. it may cascade to the first Stokes frequency). In turn, if a non-linear medium is provided that is tuned to convert the first Stokes frequency, a converted frequency is generated by the non-linear medium, which may then be outputted from the cavity by means of the output coupler. If the non-linear medium is not tuned to convert the first Stokes frequency, the first Stokes frequency may be converted by the intra-cavity Raman-active medium to generate a second Stokes frequency (i.e. it may cascade to the second Stokes frequency). In a similar fashion, the second Stokes frequency may either be converted by a non-linear medium tuned to that frequency or cascade further to the third Stokes frequency. It should be noted in relation to the cascading process that the coupling from the fundamental or Stokes frequency to the output frequency by the nonlinear medium may be larger, or more efficient, than the coupling between the fundamental frequency and first Stokes frequency and than the coupling between a Stokes frequency and a higher order Stokes frequency. (Also there is a low or zero threshold energy level for conversion by the non-linear medium, whereas there is a relatively high threshold energy level for cascading from the fundamental frequency to the first Stokes frequency and for cascading from a Stokes frequency to a higher order Stokes frequency.) Consequently, conversion of a frequency by a non-linear medium may inhibit or eliminate further cascading of that frequency. This may occur by depleting the energy of that frequency, thereby preventing the energy level reaching the threshold energy level. However provision of a non-linear medium configured for sum frequency or difference frequency generation may permit some generation of a higher order Stokes frequency, thereby allowing generation of summed or differenced frequencies derived from combinations of the fundamental with a Stokes frequency, or of two different Stokes frequencies. The growth in the fundamental and the Stokes fields may be rapid, and may have an efficiency approaching the Stokes quantum efficiency. This may be around 90%.

The relative conversion rate (or relative nonlinear coupling) may influence whether there is predominantly Raman cascading or predominantly nonlinear conversion to a visible frequency. If nonlinear coupling (to SHF/SFG) is not sufficient (e.g. if the crystal is too short or the waist size in the crystal is too large) then cascading to higher order Stokes frequencies may dominate over nonlinear conversion and the laser may be inefficient. Indeed, FIG. 8 shows there may be significant cascading beyond the cavity-dumped Stokes frequency and hence it may be possible to increase the efficiency of the laser of FIG. 8 by increasing the nonlinear coupling for SHG.

Another application of a non-linear medium in a laser system according to the invention is the summing of a first frequency, which may be the fundamental or a Stokes frequency, and a second frequency generated from conversion of the first frequency by a non-linear medium. This in effect constitutes a third harmonic generator. In this application, a second, or further, non-linear medium may be included in the cavity for summing the first and second frequencies. In an example, a fundamental at 1064 nm may be combined with a frequency doubled wavelength of 532 nm (derived from the fundamental by SHG) to provide a converted beam at 355 nm. Alternatively a first Stokes at 1176 nm may be combined with its frequency doubled wavelength of 588 nm to generate a converted beam at 392 nm. A further application of the non-linear medium in a laser system according to the invention is the use in a parametric non-linear frequency conversion process which may use an optical parametric oscillator (OPO) to provide frequency tunable light in the infrared.

In earlier laser systems for producing visible wavelength output, a single crystal provided both functions of stimulated Raman scattering and frequency conversion (in fact, frequency doubling). An advantage of such systems is that it reduces the insertion losses that are introduced into the system by inserting additional optical elements into the cavity. However, a disadvantage with the system is that it is severely restricted in the choice of materials that may be used for that single crystal: it must be a non-centrosymetric Raman-active medium. Lithium iodate is one such material which has been used, however this suffers from a low damage threshold, which limits the power obtainable from such a laser system. In addition, the system is then limited to generating the frequencies available from such materials. Further disadvantages with the use of lithium iodate also include the fact that the second shift of lithium iodate only has sufficient gains when cut for a different propagation direction through the crystal. Other Raman active media such as KGW are more versatile in that the second shift may be accessed using the same crystal cut, by using a different polarization.

A switchable Raman laser system according to the present invention may be constructed using separate Raman-active and non-linear media. In this manner, the properties of the individual media may be optimized independently. The inventors have found that in this manner a laser system may be constructed that provides acceptable power output despite the additional insertion loss due to the use of an additional optical component. In selectively providing an output laser beam from this laser system a cavity laser beam is generated within the resonator cavity by pumping a laser material located in the cavity with a pump beam from a pump source located outside the cavity. The wavelength of at least a portion of the laser beam is then shifted by passing the laser beam through a Raman-active medium located in the resonator cavity. A single wavelength (in the case of SHG) or pair of wavelengths (in the case of SFG or DFG) of laser light to be frequency converted is (are) then selected from the various wavelengths resonating in the cavity. The selected single wavelength or pair of wavelengths of laser light is (are) then frequency converted in a separate step, using a tunable non-linear medium to generate a single converted wavelength of laser beam, which may then be outputted from the laser system. The use of separate Raman-active and non-linear media enables the use of materials with higher damage thresholds than a single medium performing both functions, and enables independent optimization of parameters such as position in the cavity for each medium. It also provides access to a wide range of output frequencies, as described below.

The laser system of the present invention may be a diode-pumped laser system, and may be a solid-state laser system.

The laser material may be capable of emitting, in use, a cavity laser beam, when pumped by a pump laser beam. The pump laser beam may be generated by supplying current to a diode pump laser, such that a portion of the power of the pump laser beam is absorbed by the laser material. The power of the output laser beam from the laser system may be dependent on the frequency of the pump laser beam, and the system may have means (such as a frequency controller) for altering the frequency of the pump laser beam in order to alter the power of the output laser beam.

In a laser cavity according to the invention, there may potentially be a plurality of different wavelengths of laser light resonating in the cavity. Thus there may be one or more of a fundamental wavelength, a first Stokes wavelength and a second Stokes wavelength. Further, in cases in which the Raman active medium has more than one Raman shift, there may be a first and a second Stokes wavelengths from each of the two different Raman shifted beams generated by the Raman active medium. The laser cavity of the invention may also have a non-linear medium capable of frequency doubling or sum frequency generation. Thus each of the above wavelengths may be frequency doubled, or any two may be frequency summed, depending on the tuning of the non-linear medium. Therefore the present invention provides means to selectively output a wide variety of different wavelengths from the cavity.

The pump beam may be a beam from a diode laser, a fibre coupled diode laser or the pump beam may be light from an arclamp or flashlamp or from some other pump source. The pumping may be end pumping or side pumping. The power of the pump beam may depend on whether the laser is end pumped or side pumped, on the nature of the laser material and on other factors. The power may be between about 0.1 and about 100 W, or between about 0.5 and 100, 1 and 100, 10 and 100, 50 and 100, 0.1 and 50, 0.1 and 10, 0.1 and 5, 0.5 and 5, 0.5 and 2, 0.8 and 1.5, 10 and 90, 10 and 70, 10 and 60, 10 and 50, 10 and 30, 15 and 25 or 20 and 25, and may be about 0.1, 0.2, 0.3, 0.4, 0.5, 0.6, 0.7, 0.8, 0.9, 1, 1.5, 2, 2.5, 3, 3.5, 4, 4.5, 5, 6, 7, 8, 9, 10, 15, 16, 17, 18, 19, 20, 21, 22, 23, 24, 25, 26, 27, 28, 29, 30, 35, 40, 45, 50, 60, 70, 80, 90 or 100 W, or more than 100 W.

In the case of flashlamp pumping, the laser may be side pumped. A flashlamp pumped system may be constructed with or without a Q-switch. The flashlamp may have an average output power of up to about 50 W, or up to about 40, 30, 20 or 10 W, or of over about 0.5, 1, 2, 3, 4, 5, 6, 7, 8, 9, 10, 15, 20, 25 or 30 W, and may have an output power of about 0 to 10 W, about 10 to 20 W, about 20 to 30 W, about 30 to 40 W, about 40 to 50 W, about 10 to 50 W, about 10 to 30 W, about 20 to 30 W, about 20 to 50 W or about 20 to 40 W, and may have an output power of 1, 2, 3, 4, 5, 6, 7, 8, 9, 10, 15, 20, 21, 22, 23, 24, 25, 26, 27, 28, 29, 30, 35, 40, 45 or 50 W or more than about 50 W. The flashlamp may have an output energy of between about 5 and about 20 J in the visible range, or between about 5 and 15, 5 and 10, 10 and 20, 15 and 20, 10 and 15, 6 and 14, 7 and 13, 7 and 12, 7 and 11, 8 and 11 or 8 and 10 J, and may have an output energy of about 5, 6, 7, 8, 9, 10, 11, 12, 13, 14, or 15 J or more than about 15 J in the visible range. The flashlamp, and the corresponding output from the laser system, may have a pulse frequency of between about 0.5 and about 5 pulses per second, and may have a pulse frequency of between about 0.5 and 3, 0.5 and 1, 1 and 5, 2 and 5 or 1 and 3 pulses per second, for example about 0.5, 1, 1.5, 2, 2.5, 3, 3.5, 4, 4.5, 5 or more than 5 pulses per second. The pulse duration may be between about 0.1 and about 10 ms, or may be between about 0.1 and 5, 0.1 and 1, 0.1 and 0.5, 0.5 and 10, 1 and 10, 5 and 10, 0.5 and 5, 0.5 and 1, 0.2 and 0.8 or 0.3 and 0.7 ms, and may be about 0.1, 0.2, 0.3, 0.4, 0.5, 0.6, 0.7, 0.8, 0.9, 1, 1.5, 2, 2.5, 3, 3.5, 4, 4.5, 5, 6, 7, 8, 9 or 10 ms. Commonly only a proportion of the energy of a flashlamp is absorbed by the laser material, for example less than about 25%, or less than about 20, 15 or 10%. Pumping may use energies of up to about 10 kJ, 9 kJ, 8 kJ, 7 kJ, 6 kJ, 5 kJ, 4 kJ, 3 kJ, 2 kJ, 1 kJ, or 0.5 kJ per pulse. The energy may be between about 0.5 and about 5 kJ per pulse, or between about 1 and 5, 2 and 5, 3 and 5, 0.5 and 3, 1 and 4 or 2 and 3 kJ/pulse, and may be about 0.5, 1, 1.5, 2, 2.5, 3, 3.5, 4, 4.5 or 5 kJ per pulse, or may be more than about 5 kJ/pulse. The power of the pulse may be from about 1 to about 50 kW or more than 20 kW. The power of the pulse may be between about 1 and 10, 1 and 5, 1 and 2, 5 and 20, 10 and 20, 2 and 15 or 5 and 10 kW, and may be between about 1 and 50, between about 1 and 40, between about 1 and 30, between about 1 and 20, between about 1 and 10 kW or may be about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 kW.

The laser system of the present invention may operate with a low pulse repetition rate and a high pulse energy, or it may operate with a high pulse repetition rate and a low pulse energy. There may be one or more collimating lenses and one or more focusing lenses, for collimating and/or focusing the pump beam, and, if present, each lens may be either located intracavity or extracavity. The focusing lens may be located between the collimating lens and the laser material. The focusing lens may focus the pump beam on the laser material. The size of the focused beam on the laser material may be given by:

$$D_{min} = 2.44 * f * \lambda / D$$

where Dmin is the focal spot size (ie the size of the focused beam), f is the focal length of the focusing lens, λ is the wavelength of the pump beam and D is the beam diameter of the unfocussed beam.

It will be understood by one skilled in the art that the frequency and wavelength of a laser beam are connected by the equation:

Speed of light=wavelength*frequency

As a consequence, when reference is made to frequency shifting, frequency converting, different frequencies, and similar terms, these are interchangeable with the corresponding terms wavelength shifting, wavelength converting, different wavelengths, and the like in accordance with the above equation. Further, when the terms single frequency, single wavelength, single converted wavelength are used to describe the light propagating inside or outside the resonator, we are referring to the central frequency of the light beam and any band associated therewith.

In constructing a laser according to the present invention, it is crucial that components of the laser are correctly positioned in order to achieve acceptable conversion efficiency to output laser power. The laser according to the present invention may be a solid state laser.

Materials

The materials used for the laser material, the Raman-active medium and the non-linear medium are well known in the art. Commonly neodymium is used as the dopant in the laser material, and suitable laser materials include Nd:YLF, Nd:YAG, Nd:YALO, Nd:Glass, Nd:LSB, Nd:GdVO$_4$ and Nd:YVO$_4$, although other dopant metals may be used. Other dopant metals that may be used include ytterbium, erbium and thulium, and other host materials that may be used include YAB, YCOB, KGW and KYW. Examples of suitable Raman-active media include KGW (potassium gadolinium tungstate), KYW (potassium yttrium tungstate), barium nitrate, lithium iodate, barium tungstate, lead tungstate, calcium tungstate, gadolinium vanadate and yttrium vanadate. In use, the Raman crystal may be mounted on a copper heat sink via direct contact or via a thermoconductive compound. The Raman crystal may be water cooled in use. As noted earlier, lithium iodate may be used to combine the functions of Raman-active medium and non-linear medium. The disadvantages of doing so include a low damage threshold and limited accessible output wavelengths. Thus the laser system of the present invention may be constructed without the use of lithium iodate as either Raman-active or non-linear medium. An advantage of KGW is its excellent thermal properties. Also, KGW provides two high-gain Raman modes, which provides for additional flexibility of the laser system, i.e. additional accessible output frequencies. Each of the laser materials produces a characteristic output frequency, and each of the Raman-active media produces at least one characteristic Raman shift (to generate at least one characteristic Stokes wavelength). By combining the two types of media, therefore, it is possible to achieve a range of output laser wavelengths. Even with a single combination of media, for example Nd:YAG and KGW, several wavelengths may be selected as described in this invention. In this example, Nd:YAG produces an output at 1064 nm and KGW can generate first Stokes wavelengths of 1158 nm and 1176 nm and second Stokes wavelengths of 1272 nm and 1317 nm. Thus five discrete wavelengths may be produced from this combination. A second harmonic generator may then serve as a frequency doubler to convert these wavelengths to 532 nm (green), 579 nm (yellow), 588 nm (yellow/orange), 636 nm (red) or 660 nm (red). In addition a sum frequency generator may be used to generate additional wavelengths by combining any two of the wavelengths. For example by summing the 1064 nm and 1158 nm wavelengths, a wavelength of 555 nm is obtained. Thus a wide range of visible wavelengths are potentially available. As described in this invention, tuning the second harmonic or sum frequency generator may allow an operator the flexibility of being able to selectably switch between two or more of these wavelengths as required.

Table 1 shows the Raman shifts for a range of Raman-active media, and Table 2 shows the Raman shifts and corresponding Stokes wavelengths for several Raman-active media.

TABLE 1

Raman shifts for selected Raman-active media

| Raman-active Crystal | Raman shift (cm$^{-1}$) |
|---|---|
| CaCO$_3$ | 1085 |
| NaNO$_3$ | 1066 |
| Ba(NO$_3$)$_2$ | 1049 |
| YVO$_4$ | 890 |
| GdVO$_4$ | 882 |
| KDP | 915 |
| NaBrO$_3$ | 795 |
| LiIO$_3$ | 822 |
|  | 745 |
| BaWO$_4$ | 926 |
| PbWO$_4$ | 901 |
| CaWO$_4$ | 908 |
| ZnWO$_4$ | 907 |
| CdWO$_4$ | 890 |
| KY(WO$_4$)$_2$ | 765 |

TABLE 1-continued

Raman shifts for selected Raman-active media

| Raman-active Crystal | Raman shift (cm$^{-1}$) |
|---|---|
| KY(WO$_4$)$_2$ | 905 |
| KGd(WO$_4$)$_2$ | 768 |
| KGd(WO$_4$)$_2$ | 901 |
| NaY(WO$_4$)$_2$ | 914 |
| NaBi(WO$_4$)$_2$ | 910 |
| NaBi(MoO$_4$)$_2$ | 877 |

TABLE 2

Raman shifts and corresponding Stokes wavelengths for selected Raman-active media

| Crystal | Raman shift (cm$^{-1}$) | 1$^{st}$ Stokes (nm) | 2$^{nd}$ Stokes (nm) | 3$^{rd}$ Stokes (nm) |
|---|---|---|---|---|
| KGW | 768 | 1158 | 1272 | 1410 |
| KGW | 901 | 1176 | 1317 | 1500 |
| PbWO$_4$ | 911 | 1177 | 1316 | 1494 |
| Ba(NO$_3$)$_2$ | 1049 | 1198 | 1369 | 1599 |
| LiIO$_3$ | 745 | 1156 | 1264 | 1396 |

Each non-linear medium may be configured to select which wavelength will be converted by frequency doubling, sum frequency generation, difference frequency generation, or other parametric non-linear frequency generation.

Examples of materials used for frequency doubling or sum frequency generation include crystalline LBO, BBO, KTP, CLBO or periodically poled materials such as lithium niobate, KTP, KTA, RTA or other suitable materials. Periodically poled materials may generate frequency doubled or sum frequency outputs through quasi-phase matching. An advantage of LBO is that it may be easily configured for either temperature tuning or for angle tuning, and also provides efficient conversion to visible frequencies. Frequency doubling is most efficient when "phase-matching" is achieved between a wavelength and its second harmonic. A way to configure a non-linear crystal relates to the way the crystal is "cut" relative to its "crystal axes". These crystal axes are a fundamental property of the type of crystal. The crystal may be manufactured with a "cut" to approximately provide phase-matching between a selected wavelength and its second harmonic. Fine tuning of this phase-matching may be achieved by "angle-tuning" the medium. Alternatively the fine tuning may be achieved by temperature tuning the medium. The angle tolerance may be less than 0.1 degree, and temperature may be maintained within 0.1 degree. The tolerance may be up to about 10 degrees of angle or of temperature, or up to about 9, 8, 7, 6, 5, 4, 3, 2, 1, 0.5, 0.4, 0.3 or 0.2 degrees of angle or of temperature, and may be about 0.05, 0.1, 0.2, 0.3, 0.4, 0.5, 0.6, 0.7, 0.8, 0.9, 1, 2, 3, 4, 5, 6, 7, 8, 9 or 10 degrees of angle or of temperature. These tolerances vary depending on the nature of the crystal.

The non-linear crystal may be cut for Type I phase matching (o+o=e) or for Type II phase matching (o+e=e). In the case of Type I phase matching, the polarizations of the input frequencies are parallel to each other and to a defined plane of the crystal, and the polarization of the output is orthogonal to the input frequencies. In the case of Type II phase matching, the polarizations of the input frequencies are orthogonal to each other, and one of the input frequencies is parallel to a defined plane of the crystal. In this case the output is orthogonal to the defined plane and to the polarization of one of the input frequencies and parallel to the polarization of the other input frequency. Type I and type II depend on different crystal cuts. The following reference provides a description of type 1 and type 2 phase matching and is incorporated herein by cross reference:

Handbook of nonlinear optical crystals

V. G. Dmitriev, G. G. Gurzadyan, D. N. Nikogosyan

2nd edition, Springer Series in Optical Sciences, vol. 64,

New York, 1997

ISBN 3-540-61275-0

Location of Elements

It is important for the efficient operation of the laser system described herein that the component parts of the system be located correctly. In particular, the non-linear medium should be located at a position in the cavity where the diameter of the beam to be wavelength converted is sufficiently small to achieve acceptable conversion efficiency.

Thermal lensing arises from the inelastic nature of the stimulated Raman scattering processes. Thus for every scattering event, a small amount of the fundamental photon is deposited as heat in the Raman-active medium. This leads to a non-uniform temperature profile across the Raman-active medium. Commonly, the refractive index of a laser material increases with an increase in temperature, and consequently said laser material acts as a convex lens. Commonly the refractive index of a Raman-active medium decreases with an increase in temperature, and consequently said Raman-active medium acts as a concave (diverging) lens. The combination of these two effects may lead to a complex beam width profile along the resonator cavity. The laser system of the present invention may be operated under conditions in which thermal lensing arises. Achievement of increased output power necessitates a consideration of the resonator spatial-mode dynamics which will depend on the thermal lensing. Thermal lensing may in some laser systems according to the invention be controlled by cooling at least one of the Raman-active medium, the laser material and the non-linear medium. This may be achieved using for example a cooler, a heat sink, a water cooler, a copper heat sink, a water cooled heat sink, or some other device. The thermal lens may impact on the stability characteristics of the laser system. The laser material may have a positive thermal lensing effect and the Raman-active medium may have a negative thermal lensing effect, and the positive lensing effect may be comparable in size to the negative lensing effect. The thermal lensing effect of the components of the laser system may change with a change in pump power. The power of the thermal lens in the laser material is primarily dependant upon the output power of the pump source, the fraction of this power that is absorbed in the laser material, and the size of the pump laser beam inside the laser material. The power of the thermal lens in the Raman-active medium is primarily dependant upon the power of the Raman-shifted beam, the size of the Raman-shifted beam inside the Raman-active medium, the wavelength of the Raman-shifted beam and the Raman shift.

Due to thermal lensing within the different components of the laser system, in addition to curvature of the cavity mirrors and natural diffraction, the beam width of a laser beam within the resonator cavity of the laser system will vary along the length of the cavity as a result of heating effects within the various components. Since the efficiency of the processes occurring in the non-linear medium increases with an increase of the power of the incident laser beam, the location of the non-linear medium is critical to the efficient operation of the system. Furthermore, since the heating of components of the system is due to passage of a laser beam through those elements, the optimum location of the elements will vary both with time during warm-up of the system and with the power of the laser system. A laser system may be designed for a particular output power, and will be designed to operate at peak efficiency after reaching normal operating temperature.

The present inventors have discovered that the resonator stability problems associated with operation of Raman solid-state lasers can be solved by designing a solid-state Raman laser taking into account the thermal lensing power of the laser material and the Raman-active medium.

Thermal lenses are formed in the laser material in the following way. In the process of generating laser output at the fundamental wavelength in the laser material, heat is deposited in the laser material and a temperature distribution is established. Through the thermo-optic coefficient, a variation in refractive index develops across the laser material, which acts to focus light passing through the material, the laser material acting as a converging lens—this is a thermal lensing effect having a focal length $f_L$. The magnitude of $f_L$ decreases with increasing absorbed pump power and for maximum absorbed pump power $f_L=f_{L(min)}$ i.e. from initial start-up current to maximum operating current, there is a decrease in focal lengths of the laser material.

Thermal lenses are also generated in the Raman-active medium. With frequency conversion by SRS (stimulated Raman scattering) heat is generated inside the Raman-active medium leading to significant lensing effects and a focal length $f_R$. These effects arise from the inelastic nature of the nonlinear process and for every scattering event, a small fraction of the photon energy (7.9% in the case of $LiIO_3$) is deposited as heat in the Raman-active medium. The degree of heating increases with the power generated at the Stokes wavelengths, more specifically for every first or second Stokes photon generated inside the laser cavity, a small but fixed amount of heat is deposited inside the medium. The resulting temperature distribution which is affected by the thermal conductivity of the crystal and the size of the laser beam inside the resonator cavity causes a variation of refractive index across the medium. While the positive thermal lens in for example a Nd:YAG laser material scales approximately linearly with absorbed power from a diode laser, the thermal lens in for example $LiIO_3$ depends on the intracavity power density at the first-Stokes wavelength and any higher order Stokes wavelengths. For $LiIO_3$, the thermo-optic coefficient (dn/dT) is $-84.9 \times 10^{-6} K^{-1}$ at a wavelength of 1 micron (according to Optical Society of America Handbook of Optics, ed. Bass, 1995) is over ten times larger than in Nd:YAG and of opposite sign. This means that light passing through the Raman-active medium is caused to diverge as though passing through a conventional lens with focal length "$-f_R$". Based on measurement of the thermal lens by the inventors in an arclamp-pumped $LiIO_3$ Raman laser, the size of the negative thermal lens in $LiIO_3$ may be as short as $-10$ cm (comparable to that in the Nd:YAG medium).

Both the thermal lenses in the laser material and in the Raman-active medium impact substantially on the stability characteristics of the resonator in a dynamic way. Suitably the position of the laser material and the Raman-active medium in the cavity and/or reflector (mirror) curvatures is such that the laser is capable of stable operation over a sufficiently-wide range of combinations for $F_L$ and $F_R$ including the special case where $f_L=f_R=$infinite (so that laser action can be initiated) and also $f_R=$infinite, $f_L>f_L(min)$ (so that laser action desirably does not cease if SRS ceases). The laser systems of the present invention may be capable of stable operation. They may be capable of providing stable output power over at least 1 hour, or for at least 2, 3, 4, 5, 6, 7, 8, 9, 10, 15, 20, 25, 30, 35, 40, 45 or 50 hours. The stability may be such that the output power varies over the stated period by less than about 20%, or by less than about 15, 10, 9, 8, 7, 6, 5, 4, 3, 2 or 1%.

Suitably a curvature of at least one of the reflectors and/or the positions of the laser material and the Raman-active medium relative to the cavity configuration are such that the focal lengths of the laser material at pump input powers and the focal lengths of the Raman-active medium at the desired Raman laser output power range are maintained within a stable and preferably efficient operating region. In preferred embodiments this can be achieved by optimising the cavity configuration as a function of the focal lengths by in addition to positioning the laser material and Raman-active medium within the cavity and/or selecting a curvature of at least one of the reflectors, optimising one of more of:

a separation between one or more of the reflectors, the laser material and the Raman-active medium;
transmission characteristics of the output coupler; and
the pulse repetition frequency.

Additional effects such as gain focussing and self-focussing of the Raman and/or laser beams may affect the resonator stability but these are considered to be of lesser importance than the effects already discussed.

The transmission characteristics of the output coupler may be such that the output coupling at the desired wavelength is between about 1 and about 100%, or between about 1 and 80, 1 and 50, 1 and 30, 1 and 20, 1 and 10, 1 and 5, 5 and 100, 10 and 100, 50 and 100, 70 and 100, 5 and 50, 5 and 20, 80 and 100, 80 and 90, 90 and 100, 90 and 95 or 10 and 50%, and may be about 1, 2, 3, 4, 5, 6, 7, 8, 9, 10, 15, 20, 25, 30, 35, 40, 45, 50, 55, 60, 65, 70, 75, 80, 85, 90, 95, 96, 97, 98, 99, 99.5, 99.9 or 100%.

Thermal tensing may also be addressed by the inclusion of one or more additional components in the resonator cavity that themselves give rise to thermal lenses in such a manner as to at least partially counteract the thermal lenses of the other components. Thus for example if the non-linear medium provides a negative lens, an additional component may be located in the cavity that provides a positive lens of comparable magnitude to the negative lens. Alternatively, a means may be included to move the components of the laser system in order to compensate for the thermal lens. Thus one or more motors may be provided in order to move one or more components of the laser system to an optimum position. The motors may be controlled by a computer, which may be capable of receiving information from the cavity (e.g. temperature, intensity of laser radiation etc.), using the information for determining the optimum position of the components of the system, and providing one or more signals to the one or more motors in order to signal them to move the one or more components to the optimum position(s). The feedback system as described above may be continuous, in order to compensate for changes in the thermal tensing with temperature during operation of the laser system.

In another embodiment, the laser system may also comprise an intracavity etalon in order to prevent generation of the parasitic Nd:YAG laser wavelengths at 1060 and 1074 nm. The oscillation of these parasitic wavelengths with the fundamental may be the cause of very high laser fields (spiking) which surpass the damage threshold of the laser optic materials. The etalon in one example may be inserted in a resonator portion of the laser system and is tuned to allow passage of the 1064 nm radiation, but which has a free spectral range and finesse in an arrangement such that losses due to the parasitic radiation are sufficient to prevent lasing in use. The etalon may be an uncoated etalon and is thin in profile. In one example, the thickness of the etalon is in the range from about 60 to about 120 μm, about 70 to about 110 μm and may be about 100.0 μm.

In another embodiment, the output power of the laser system of the present invention may be increased above 30 W by taking the following steps to reduce the thermal lens in the arclamp pumped laser material. These steps may include using a close-coupled pump chamber design, using one or more laser rods, and filtering the arclamp emission to reduce parasitic heating of the one or more laser rods. In particular, these steps may scale average 532 nm output power of the laser system of the present invention beyond 30 W. The pumped laser material may be one or more arclamp pumped YAG rods or other suitable laser rod(s).

In preferred embodiments the laser is also optimised for given pump powers for optimum mode sizes in the laser gain material and in the Raman gain medium and the non-linear medium and optimum laser output power so as to obtain efficient energy extraction from the laser material as well as efficient conversion through stimulated Raman scattering (SRS) in the Raman-active crystal and the non-linear medium whilst maintaining cavity stability and avoiding optical damage of the laser components i.e., the various components are matched on the basis of their associated mode sizes. Since SRS may not require phase matching, the conversion efficiency of the process is not limited by such factors as angular acceptance, back-conversion and walkoff. Consequently, the photon conversion efficiency may approach 100%. The optimum spot size and power density in the Raman-active medium may be a compromise between maximising the conversion efficiency and avoiding optical damage. The cavity is suitably optimised so that the relative mode size in each of the materials present in the cavity is such so as to provide efficient stable output. Suitably conversion efficiencies from fundamental laser wavelengths to Raman wavelengths of greater than 40%, more preferably greater than 50% are obtainable (for example between about 50 and about 95%, or between about 50 and 90, 50 and 80, 50 and 70, 50 and 60, 60 and 95, 70 and 95, 60 and 90 or 60 and 80%, e.g. about 50, 55, 60, 65, 70, 75, 80, 85, 90 or 95%) and from Raman wavelengths to frequency doubled (visible) wavelengths of greater than 30%, more preferably greater than 50% (for example between about 50 and about 95%, or between about 50 and 90, 50 and 80, 50 and 70, 50 and 60, 60 and 95, 70 and 95, 60 and 90 or 60 and 80%, e.g. about 50, 55, 60, 65, 70, 75, 80, 85, 90 or 95%). Suitably, overall conversion efficiencies from optical pump power to visible output power of about 2, 3, 4, 5, 6, 7, 8, 9 or 10% or greater than 10% are obtainable.

In order for the laser to operate with suitable optimal efficiency the key design parameters (ie mirror curvatures, cavity length, positioning of the various components) are suitably chosen so that the resonator mode sizes in the laser material (A), the Raman-active medium (B) and the non-linear medium (frequency-doubling crystal) (C) are near-optimum at a desired operating point. One can denote the beam sizes (radii) in these media as $\omega_A$, $\omega_B$ and $\omega_C$ respectively. In cases where the laser beam is not circular, it is commonly elliptical, and the beam size may be considered along the long and short axes of the ellipse. The beam size is taken to be the distance from the beam axis to the point where the intensity of the beam falls to $1/(e^2)$ of the intensity of the beam axis. The beam size may vary along the length of a particular component. The beam size in a particular component may be taken as the average beam size within the component (commonly used for the Raman-active medium) or as the minimum beam size within that component (commonly used for the laser material and for the non-linear medium). $\omega_A$ is suitably mode-matched to the dimension of the pumped region of the laser material i.e., the pump spot size ($\omega_P$). $\omega_P$ can vary according to the power of the pump laser source (e.g., a diode laser) and the pumping configuration. For example a laser crystal end-pumped with a low power (~1 W) diode laser may have a cop of approximately 100 μm, for example between about 50 and about 200 μm, or between about 50 and 150, 50 and 120, 50 and 100, 50 and 70, 70 and 200, 100 and 200, 120 and 200, 150 and 200, 70 and 150, 80 and 130 or 90 and 110 μm, and may have a $\omega_P$ of about 50, 60, 70, 80, 90, 100, 110, 120, 130, 140, 150, 160, 170, 180, 190 or 200 μm. A laser crystal end-pumped with a 10-60 W diode laser may have a $\omega_P$ in the range of about 90 to about 700 μm, for example 100 to 700, 100 to 500, 100 to 300, 150 to 650, 150 to 250, 200 to 600, 300 to 400, 250 to 350, 200 to 375, 90 to 400, 200 to 700, 400 to 700, 500 to 700, 200 to 400 or 400 to 600 μm, and may have a $\omega_P$ about 90, 100, 150, 200, 250, 300, 350, 400, 450, 500, 550, 600, 650 or 700 μm. A laser crystal side-pumped by one or more diode lasers may have a cop in the range of about 500 to about 1500 μm, for example between about 500 and 1200, 500 and 1000, 500 and 700, 700 and 1500, 1000 and 1500, 1200 and 1500, 600 and 1400, 700 and 1300, 800 and 1200 or 900 and 1100 μm, and may have a $\omega_P$ about 500, 550, 600, 650, 700, 750, 800, 850, 900, 950, 1000, 1050, 1100, 1150, 1200, 1250, 1300, 1350, 1400, 1450 or 1500 μm. When flashlamp pumping is used, larger pump mode sizes may be used. In this case $\omega_P$ may be up to about 10 mm in the laser crystal, or up to about 9, 8, 7, 6, 5, 4, 3, 2 or 1 mm, or between about 0.5 to about 10 mm, or about 1 to 10, 2 to 10, 3 to 10, 4 to 10, 5 to 10, 0.5 to 10, 0.5 to 5, 0.5 to 2, 0.5 to 1, 1 to 5, 5 to 10 or 3 to 5 mm, and may be about 0.5, 1, 1.5, 2, 2.5, 3, 3.5, 4, 4.5, 5, 5.5, 6, 6.5, 7, 7.5, 8, 8.5, 9, 9.5 or 10 mm, or may be greater than about 10 mm. Flashlamp pumping provides a pump mode size which is the diameter of the laser material (or rod). This may be up to about 10 mm for YAG. For other materials it may be still larger, and may be up to about 20 mm, and may thus also be about 19, 18, 17, 16, 15, 14, 13, 12 or 11 mm. Flashlamp pumping may provide no control over the pump mode size. Optimal mode-matching of $\omega_P$ and $\omega_A$ is a suitable pre-requisite for enabling efficient extraction of the gain in the laser material. When $\omega_P$ and $\omega_A$ are mode matched, the pump laser beam spot overlaps with the cavity laser beam within the laser material. If $\omega_A$ is too small, then (i) laser gain may not be extracted efficiently into the $TEM_{00}$ resonator mode and (ii) the laser may oscillate on higher-order modes which are generally not desirable. If $\omega_A$ is too large, then diffraction losses can occur in the resonator due to aberrations in the thermal lens associated with the laser crystal. This effect is undesirable and deleterious for pumping powers approximately $\geq 3$ W.

$$\frac{\omega_A}{\omega_P}$$

may be in the range about 0.45 to about 1.55, 0.45 to 1.5, 0.45, to 1.3, 0.45 to 1, 0.45 to 0.8, 0.45 to 0.55, 0.5 to 1.55, 0.8 to 1.55, 1 to 1.55, 1.2 to 1.55, 0.5 to 1.5, 0.6 to 1.4, 0.7 to 1.3, or 0.75 to 1.25 or 0.7 to 1.25 or 0.75 to 1.3 or 0.8 to 1.2 or 0.9 to 1.1 or 0.95 to 1.05.

$$\frac{\omega_A}{\omega_P}$$

may be about 1.01. 1.02, 1.03, 1.04, 1.05, 1.06, 1.07, 1.08, 1.09, 1.1, 1.12, 1.14, 1.16, 1.18, 1.2, 1.25, 1.3, 1.35, 1.4, 1.45, 1.5, 1.55, 0.99, 0.98, 0.97, 0.96, 0.95, 0.94, 0.93, 0.92, 0.91, 0.9, 0.88, 0.86, 0.84, 0.82, 0.8, 0.75, 0.7, 0.65, 0.6, 0.55, 0.5 or 0.45, or may be equal to or about 1. $\omega_A$ may be greater than or equal to $\omega_P$. The pump spot size may overlap completely with the cavity laser beam within the laser material. When the pump spot size is mode matched to the mode of the cavity laser beam in the laser material in the resonator, the excitation of the fundamental Gaussian mode ($TEM_{00}$) may be the main mode in the resonator cavity, or there may be higher-order transverse modes present. $\omega_A$ may be in the range of about 70 to about 850 μm, for example about 100 to 850, 250 to 850, 400 to 850, 550 to 850, 70 to 500, 70 to 300, 70 to 150, 100 to 600, 200 to 500, 100 to 300, 300 to 500, 500 to 700 or 700 to 850 μm, and may be for example about 70, 100, 150, 200, 250, 300, 350, 400, 450, 500, 550, 600, 650, 700, 750, 800 or 850 μm. $\omega_B$ may optimised for high conversion through the SRS process, while at the same time optical damage to the Raman media is suitably avoided. The optimum value for $\omega_B$ varies from crystal to crystal because (i) different Raman-active crystals have different Raman gains and different thresholds for optical damage. If $\omega_B$ is too large, then the conversion efficiency of the SRS process will be lower than optimum. If $\omega_B$ is too small, then (i) the optical power density in the Raman-active crystal can approach the threshold for optical damage in that crystal and (ii) the thermal lens associated with the Raman-active crystal may become more aberrated, resulting in increased resonator losses (due to diffraction). Typical values for $\omega_B$ are in the range of about 90 to about 600 μm, and may be in the range of about 100 to 600, 200 to 600, 300 to 400, 250 to 350, 200 to 375, 90 to 400, 100 to 300, 400 to 600, 200 to 400 or 400 to 600 μm, and may be about 90, 100, 150, 200, 250, 300, 350, 400, 450; 500, 550 or 600 μm. $\omega_C$ is suitably optimised for efficient frequency conversion through the frequency doubling process. The optimum value for $\omega_C$ varies according to the type of crystal used. Different crystals have different non-linear coefficients, walk-off angles and damage thresholds. If $\omega_C$ is too large, then (i) conversion efficiency will be lower than optimum; (ii) the optical field at the Stokes frequency can be "under-coupled"—in this case, unwanted non-linear processes such as higher-order Stokes generation and self-focussing can occur. If $\omega_c$ is too small then (i) optical damage can occur to the crystal, (ii) the effective length of the non-linear interaction can become too short due to "walk-off" effects and (iii) the optical field at the Stokes wavelength can be "over-coupled" which can result in reduced conversion efficiency of the SRS process. Typical values for $\omega_C$ are in the range about 90 to about 600 μm, and may be in the range of about 100 to 600, 200 to 600, 300 to 400, 250 to 350, 200 to 375, 90 to 400, 100 to 300, 400 to 600, 200 to 400 or 400 to 600 μm, and may be about 90, 100, 150, 200, 250, 300, 350, 400, 450, 500, 550 or 600 μm. This discussion assumes that the mode size in A, B and C is the same for optical fields at different wavelengths. In practice $\omega_A$, $\omega_B$ and $\omega_C$ may be slightly different (by <10%) owing to effects such as gain-guiding and self-focussing.

Suitably the mode size (beam size) in the laser material is approximately equal to the pump spot size. Suitably in a Raman-active medium such as a KGW, $BaNO_3$ or $LiIO_3$ crystal the spot size $\omega_B$ is optimised for stable operation and efficient conversion such that $\omega_B$ is similar to or smaller than the beam size $\omega_A$ in the laser material. Suitably the beam size $\omega_C$ in the non-linear medium is similar to or smaller than the beam size $\omega_B$ in the Raman-active medium. A preferred situation therefore is when $\omega_A > \omega_B > \omega_C$. Stable arrangements may be achieved in which $\omega_A > \omega_B$ and/or $\omega_B > \omega_C$ and/or $\omega_A > \omega_C$, and/or $\omega_C > \omega_B$.

In coupled cavity resonators in which there are separate cavities for the cavity laser beam and the Raman-shifted laser beam, there is an additional mode matching requirement, that the cavity laser beam and the Raman-shifted laser beam have similar mode sizes in the Raman-active medium. The ratio of the mode size of the Raman-shifted laser beam in the Raman-active medium to the mode size of the cavity laser beam in the Raman-active medium may be between about 0.5 and about 2, or between about 0.5 and 1.5, 0.5 and 1, 0.5 and 0.8, 0.8 and 1.5, 1 and 1.5, 0.75 and 1.5, 0.8 and 1.25 or 0.9 and 1.1, and may be about 0.5, 0.6, 0.7, 0.8, 0.9, 1, 1.1, 1.2, 1.3, 1.4, 1.5, 1.6, 1.7, 1.8, 1.9 or 2.

In preferred embodiments the thermal lens focal lengths for the laser material at the laser input powers and the thermal lens focal lengths of the Raman-active medium at the laser output powers are determined and the position of the laser material and the Raman-active medium in the cavity are selected to ensure that during operation of the laser the resonator is stable. Suitably the thermal lenses for the laser material can be calculated and then confirmed by cavity stability measurement. Alternatively the thermal lenses can be determined by standard measurement techniques such as lateral shearing interferometry measurements which can also provide information on any aberrations. A suitable interferometric technique is described in M. Revermann, H. M. Pask, J. L. Blows, T. Omatsu "Thermal lensing measurements in an intracavity $LiIO_3$ Laser", *ASSL Conference Proceedings* February 2000; in J. L. Blows, J. M. Dawes and T. Omatsu, "Thermal lensing measurement in line-focus end-pumped neodymium yttrium aluminium garnet using holographic lateral shearing interferometry", *J. Applied Physics*, Vol. 83, No. 6, March 1998; and in H. M Pask, J. L. Blows, J. A. Piper, M. Revermann, T. Omatsu, "Thermal lensing in a barium nitrate Raman laser", *ASSL Conference Proceedings* February 2001.

Suitably at least the position of the laser material and the Raman-active medium in the cavity are selected such that the combination of the thermal lens powers for the laser and Raman media fall within a stable operating region of a stability plot.

A stability plot of a simple two mirror cavity is a plot of the parameters $g_1$ on the y-axis and $g_2$ on the x-axis of a graph. These parameters can be represented by the equations:

$$g_1 = 1 - L/R_1 \qquad (1)$$

$$g_2 = 1 - L/R_2 \qquad (2)$$

wherein L is the distance between the two mirrors, $R_1$ is the radius of curvature of one of the two mirrors and $R_2$ is the radius of curvature of the other.

It has been determined that, for a resonator cavity to be stable, $$0 \leq g_1 \times g_2 \leq 1 \qquad (3)$$

If either one of $g_1$ and $g_2$ is negative and the other one is positive, their product is negative and the resonator cavity will be unstable. If both are positive or if both are negative and if their product is less than 1, then the resonator cavity will be stable.

If the thermal lensing effect of the laser material is positive and the thermal lensing effect of the Raman-active medium is negative and if they are of similar magnitude under operating conditions, they can counteract one another to ensure that the resonator cavity remains stable under operating conditions.

In order to ensure that the cavity remains stable at elevated temperatures of the laser material and Raman-active medium, the laser material and the Raman-active medium advantageously have thermal lensing effects of opposite sign, and the length of the resonator cavity and the relative positions of the laser material and the Raman-active medium relative to the mirrors defining the resonator cavity are selected such that the laser modes do not expand to the extent that the radiation suffers large losses. Thus the position of the Raman active medium relative to the positions of the laser material and the at least two reflectors, the length of the cavity, the curvature of at least one of the reflectors that define the cavity, as well as the combination of the focal lengths of the thermal lenses formed in the laser material and the Raman active medium during operation of the laser may be such that the laser resonator (cavity) remains optically stable when the current to the pump laser is increased from zero to a desired operating power. The desired operating power may be such that the output power is greater than about 1 W. The laser system of the present invention may have an average output power of up to about 50 W, or up to about 40, 30, 20 or 10 W, and may have an output power of about 0 to about 10 W, about 10 to 20 W, about 20 to 30 W, about 30 to 40 W, about 40 to 50 W, about 10 to 50 W, about 10 to 30 W, about 20 to 30 W, about 20 to 50 W or about 20 to 40 W, and may have an output power of about 1, 2, 3, 4, 5, 6, 7, 8, 9, 10, 15, 20, 21, 22, 23, about 24, 25, 26, 27, 28, 29, 30, 35, 40, 45 or 50 W or more than about 50 W. Alternatively, it may be between about 10 mW and about 1 W, or between about 100 mW and 1 W, 500 mW and 1 W, 100 and 500 mW, 50 and 500 mW or 10 and 100 mW, and may be about 10, 20, 30, 40, 50, 60, 70, 80, 90, 100, 150, 200, 250, 300, 350, 400, 450, 500, 550, 600, 650, 700, 750, 800, 850, 900, 950 or 1000 mW.

A suitable stability plot for a two-mirror resonator can be determined as follows. The ray transfer matrix (M) is calculated for a transit of the optical resonator. The elements of this matrix $$M = \begin{bmatrix} A & B \\ C & D \end{bmatrix}$$

enable an equivalent (two-mirror) resonator to be defined with equivalent g-parameters $g_1^* = A$, $g_2^* = D$ and $L^* = B$. The optical system in the resonator cavity may be described by an ABCD matrix which is the product of one or more ABCD matrices, each of which corresponds to an optical element through which light passes. The ABCD law enables one to calculate the change in a Gaussian laser beam as the beam passes through a particular element. The determinant of the matrix M should be unity for a stable arrangement of the resonator cavity, i.e. AD−BC=1. The stability regime for the resonator cavity is where the cavity laser beam obeys the inequality $|S| \leq 1$, where $S = 0.5*(A-D)$. The predominant mode of the cavity laser beam may be a Gaussian beam. A Gaussian beam is one in which the cross-sectional power profile of the beam has a Gaussian distribution. The q parameter of a Gaussian laser beam at a particular position in a resonator needs to satisfy the ABCD law: $q = (Aq+B)/(Cq+D)$. The solutions to this are given by:

$$\frac{1}{q_\pm} = \frac{D-A}{2B} \mp \frac{1}{B}\sqrt{\left(\left(\frac{A+D}{2}\right)^2 - 1\right)}.$$

The allowed solution should have a negative imaginary component. The q parameter incorporates the mode size and the beam curvature, and is described in detail in the B. E. A. Saleh and M. C. Teich, *Fundamentals of Photonics*, John Wiley and Sons, New York, 1991, the contents of which are incorporated herein by cross-reference. The mode size of the cavity laser beam may be determined along the resonator cavity from the q parameter.

In particular, for a system having a lens of focal length f (i.e. refractive power 1/f) located a distance $d_1$ from a first mirror having radius of curvature $R_1$, and a distance $d_2$ from a second mirror having radius of curvature $R_2$, the elements of the matrix M are:

$A = g_1^*$ $B = L^*$ $C = (g_1^{**}g_2^* - 1)/L^*$, where $L^* = d_1 + d_2 - D^*d_1^*d_2$ $D = g_2^*$ where $g_i^* = g_i - D^*d_j(1-d_i/R_i)$; i, j=1, 2; i≠j Texts describing this method are N. Hodgson and A. Weber, "Optical Resonators", Springer-Verlag London Limited, 1997 and W. Koechner, "Solid-state Laser Engineering", Springer-Verlag, 1992.

The dynamic nature of the Raman laser resonator as the diode current is increased can be simulated by calculating $g_1^*$ and $g_2^*$ for suitable combinations of the thermal lenses in the laser and Raman-active crystals. When plotted on a stability plot, a curve can be defined. In a well-designed resonator, this curve will lie in a stable region of the stability plot (ie in the region where $0 \leq g_1^{**}g_2^* \leq 1$) from the point where laser action is initiated to the point corresponding to the desired operating power.

In preferred embodiments a computer model is used to determine suitable cavity configurations for a particular power regime using different combinations of media. In such an embodiment the thermal lensing power for a variety of Raman media crystals can be measured over a wide parameter space of Raman laser output powers and mode sizes and thermally modelled. A standard resonator design program using 2-mirror configurations to more complex folded resonators can then be used to determine the fundamental and Raman laser mode sizes as a function of pump power enabling stable resonators to be designed to produce output powers in specified regions from mWs to multiwatt outputs. The output power may be varied by varying the frequency of the pump laser beam.

In the present context, mode matching is the process of matching the pump laser beam waist in the laser material with the beam waist of the cavity laser beam in the laser material. In order to perform mode matching of the pump laser beam with the cavity laser beam, the ABCD law may be used to determine the mode size of the cavity laser beam in the laser material and the pump laser beam may be focussed onto or into the laser material such that the mode size of the pump laser beam matches or about matches the mode size of the cavity laser beam. An example of mode matching the pump laser beam with the cavity laser beam is provided in PCT/

AU01/00906, the contents of which are incorporated herein by cross-reference. Mode matching may be required in order to achieve optimal power from the laser system.

The laser material can be pumped/stimulated by a pulsed or continuous arclamp, flashlamp or diode (semiconductor) laser using a side-pumped, single end-pumped or double end-pumped geometry. End pumping of the laser crystal is a very efficient approach to generating Raman laser output or its second harmonic. For example the inventors have demonstrated optical to optical conversion efficiencies as high as about 10% for end pumping with an 18 W output from a fibre-coupled diode laser to produce 1.7 W frequency-doubled KGW Raman laser output at 579 nm. Compared to side-pumped laser crystals, end-pumped laser crystals generally have high gain and give rise to short Q-switched pulses, and the pump spot size in the laser crystal can be adjusted to match the resonator mode size. However end-pumped laser crystals can also give rise to strong (and abberated) thermal lensing, and this ultimately limits the scalability of end-pumped Raman lasers.

Side-pumping of the laser crystal may not result in such high optical-optical conversion efficiency, but it is a cheaper approach, is more easily scalable and enables greater flexibility in where the resonator components can be placed.

The laser beam may be Q-switched in order to obtain sufficiently high peak powers for efficient frequency conversion. The power of the laser beam at each element of the laser system should however be below the damage threshold of that element. Thus the energy of the laser beam in the laser material should be below the damage threshold for that particular laser material, the energy of the laser beam in the Raman active medium should be below the damage threshold for that particular Raman active medium and the energy of the laser beam in the non-linear medium should be below the damage threshold for that particular non-linear medium. The damage threshold of a particular element will depend, inter alia, on the nature of that element. The peak power of a laser pulse generated by a Q-switch may be calculated by dividing the energy by the pulse width. Thus for example if the laser pulse energy is 200 μJ and the pulse width of the Q-switched laser beam is 10 ns, then the laser power will be 200 μJ/10 ns, ie 20 kW. The power density of the laser beam at any particular location may be calculated by dividing the power of the laser beam at that location by the mode size (area) at that location. The power density of the laser beam at each element of the system maybe below the damage threshold for that particular element, that is the power densities for the laser material, the Raman active medium and the non-linear medium, should be below their respective damage thresholds. Thus for example for a $LiIO_3$ crystal with a 100 $MWcm^{-2}$ damage threshold, the above Q-switched laser beam with 20 kW peak power should have a mode size of greater than 80 μm. This will be the minimum mode size that may be used without damage to that element. Since the repetition rate of the Q-switch affects the power deposition in the elements of the laser system, it will affect the heating and hence the thermal lensing of those elements. Most importantly, and usefully in the design of the laser system, the choice of repetition rate affects the peak power of the cavity laser beam and therefore the conversion efficiency into the Raman laser beam. Because the power of the thermal lens in the Raman-active medium is dependent on the power of the Raman laser beam, the repetition rate may be used to vary the thermal lens power in the Raman-active crystal, without significantly changing the thermal lens power in the laser crystal. The repetition rate should therefore be chosen such that the system is stable and so that the damage thresholds of the elements are not exceeded. The repetition rate may be between about 1 Hz and about 50 kHz, and may be between about 1 Hz and 10 kHz or about 1 Hz and 1 kHz or about 1 and 100 Hz, about 1 and 10 Hz or about 1 and 5 Hz or about 5 and 200 Hz, 10 and 200 Hz, 50 and 200 Hz, 100 and 200 Hz, 5 and 100 Hz, 5 and 50 Hz, 5 and 20 Hz, 5 and 10 Hz, 10 and 100 Hz, 50 and 100 Hz or about 100 Hz and 50 kHz or about 1 and 50 kHz or about 10 and 50 kHz or about 20 and 50 kHz or about 1 and 15 kHz or about 15 and 50 kHz or about 10 and 30 kHz or about 5 and 10 kHz or about 5 and 15 kHz or about 5 and 20 kHz or about 5 and 25 kHz or about 7.5 and 10 kHz or about 7.5 and 15 kHz or about 7.5 and 20 kHz or about 7.5 and 25 kHz or about 7.5 and 30 kHz or about 10 and 15 kHz or about 10 and 20 kHz or about 10 and 25 kHz, and may be about 1, 1.5, 2, 2.5, 3, 3.5, 4, 4.5, 5, 6, 7, 8, 9, 10, 15, 20, 25, 30, 35, 40, 45, 50, 60, 70, 80, 90, 100, 200, 300, 400, 500, 600, 700, 800 or 900 Hz or about 1, 2, 3, 4, 5, 6, 7, 8, 9, 10, 15, 20, 25, 30, 35, 40, 45 or 50 kHz. The pulse duration of the Q-switched laser beam may be in the range of about 1 to about 100 ns, or about 1 to 50 ns, or about 1 to 20 ns or about 1 to 10 ns or about 5 to 80 ns or about 5 to 75 ns or about 10 to 50 ns or about 10 to 75 ns or about 20 to 75 ns or about 5 to 100 ns or about 10 to 100 ns or about 20 to 100 ns or about 50 to 100 ns or about 5 to 50 ns or about 10 to 50 ns, and may be about 1, 2, 3, 4, 5, 6, 7, 8, 9, 10, 15, 20, 25, 30, 35, 40, 45, 50, 55, 60, 65, 70, 75, 80, 85, 90, 95 or 100 ns. In general, a laser system according to the present invention may have a pulse duration that may range from picoseconds, for modelocked systems, to nanoseconds, for example for Q-switched systems, to hundreds of microseconds or several ms for example for pulse pumped systems. The system may in some circumstances be continuous wave (CW) systems. Thus the pulse duration (for pulsed systems) may therefore range between about 1 ps to about 1 ms and may be between about 1 ps and 1, 1 ps and 1 ns, 1 ns and 1 ms, 1 μs and 1 ms or 1 ns and 1 μs, and may be for example about 1, 5, 10, 50, 100 or 500 ps, about 1, 5, 10, 50, 100 or 500 ns, about 1, 5, 10, 50, 100 or 500 μs or about 1 ms. The resonator cavity may have a folded, bent or linear configuration or other suitable configuration. It may comprise a coupled cavity resonator. The position of the laser material and Raman-active medium in a chosen configuration are suitably chosen to provide cavity stability for a wide range of combinations of $f_L$ and $f_R$.

The laser material suitably generates laser beams at a fundamental wavelength (1064 nm for Nd:YAG) when stimulated by pump light of an appropriate wavelength, and the fundamental laser beam then propagates inside the laser resonator. Suitably the laser material is formed by one of the following crystals: Nd:YAG, Nd:YLF, Nd:glass, Ti-sapphire, Erbium:glass, Ruby, Erbium:YAG, Erbium:YAB, Nd:$YAlO_3$, Yb:$YAlO_3$, Nd:SFAP, Yb:YAG, Yb:YAB, Cobalt:$MgF_2$, Yb:$YVO_4$, Nd:YAB, Nd:$YVO_4$, Nd:YALO, Yb:YLF, Nd:YCOB, Nd:GdCOB, Yb:YCOB, Yb:GdCOB or other suitable laser material. The laser material may be broadband AR-coated for the 1-1.35 micron region to minimise resonator losses. Optionally the laser material is wavelength tunable and capable of generating high power output which can be mode-locked.

The Raman-active medium suitably enables the fundamental radiation to be converted to first (or higher) Stokes wavelength through the nonlinear process Stimulated Raman Scattering (SRS). Depending on application, the Raman-active medium suitably converts the fundamental wavelength to the first Stokes wavelength, to the second Stokes wavelength or to a higher Stokes wavelength. The Raman-active medium may be broadband AR-coated (antireflection coated) for the 1-1.35 micron region to minimise resonator losses. The Raman-active medium may be chosen on the basis of high transmission at the fundamental and Stokes wavelengths, useful Raman shift, fairly high Raman cross-section, high damage threshold and availability in lengths exceeding 1 cm and chosen such that the Raman gain is adequate. The Raman-active medium may be a crystal, and may be a single crystal. The length of the crystal may be between about 0.5 and about 9 cm long, for example 1 to 7 cm, 0.5 to 7 cm, 0.5 to 5 cm, 0.5 to 3 cm, 1 to 9 cm, 3 to 9 cm, 5 to 9 cm, 7 to 9 cm, 2 to 7 cm, 3 to 6 cm, or 4 to 6 cm long, for example about 0.5, 1, 1.5, 2, 2.5, 3, 3.5, 4, 4.5, 5, 5.5, about 6, 6.5, 7, 7.5, 8, 8.5 or 9 cm long. The dimension of the crystal may be 0.5×0.5×y cm where y is crystal length and is in the range about 0.5 to about 9 cm, for example about 1 to about 7 cm. Longer crystal lengths may be used where higher output powers are desired since the Raman gain coefficient is proportional to the length of the Raman gain medium. Alternatively a longer path through the Raman-active crystal can be achieved using a multipass of zigzag geometry such as described in U.S. Pat. No. 5,673,281 (Byer). Suitably the Raman-active medium is a single crystal of $LiIO_3$ or $Ba(NO_3)_2$ or other suitable Raman active material such as KDP (potassium dihydrogen phosphate), KD*P (deuterated), lithium niobate, and various tungstates (KGW, $CaWO_4$) and molybdate crystals. Other suitable Raman active crystals are described in the CRC Handbook of Laser or the text "Quantum Electronics" by Pantell and Puthoff. KGW, $LiIO_3$ and $Ba(NO_3)_2$ are preferred. KGW is a biaxial crystal with a high damage threshold, and is capable of providing Raman shifts of 768 and 901 $cm^{-1}$. $Ba(NO_3)_2$ is an isotropic crystal with a high gain coefficient (11 cm/GW with 1064 nm pump) leading to low threshold operation and can provide a Raman shift of 1048.6 $cm^{-1}$. $LiIO_3$ is a polar uniaxial crystal with a complex Raman spectrum which depends on the crystal cut and orientation with respect to the pump propagation direction and polarisation vectors and can provide Raman shifts of between 745 $cm^{-1}$ and 848 $cm^{-1}$ (which are useful when targeting wavelengths for specific applications for example 578 nm which is useful for medical applications including opthalmology and dermatology) but has a lower damage threshold (about 100 $MWcm^{-2}$) compared with $Ba(NO_3)_2$ (about 400 $MWcm^{-2}$). KGW has a far higher damage threshold of about 10 $GWcm^{-2}$. KGW, $Ba(NO_3)_2$ and $LiIO_3$ all have good slope efficiencies (determined by the ratio of Stokes to fundamental photon energies) with optical to optical conversion efficiencies of 70-80% being reported for all three. The laser system is preferably operated such that optical damage of the Raman active medium is avoided.

The following laser material/Raman-active medium combinations are particularly desirable: $Nd:YAG/LiIO_3$, $Nd:YAG/Ba(NO_3)_2$, Nd:YAG/KGW, $NdGdVO/LiIO_3$, $NdGdVO_4/Ba(NO_3)_2$, $NdGdVO_4/KGW$, $NdYVO_4/LiIO_3$, $NdYVO_4/Ba(NO_3)_2$, $NdYVO_4/KGW$ and $Nd:YLF/CaWO_4$. The non-linear medium may be configured for frequency doubling the Raman laser beam or the beam generated by the laser material to produce an output at its second harmonic or for sum or difference mixing of the fundamental and Raman laser frequencies.

A solid non-linear medium is used for frequency doubling the Raman laser beam or for sum frequency generation to produce an output at its second harmonic or other sum frequency or different frequency wavelength. The solid non-linear medium is located in the cavity (intra cavity doubled—doubling crystal located inside the resonator). Suitably a folded resonator is used. Suitable solid non-linear mediums include a second harmonic generator (SHG), a sum frequency generator (SFG), a difference frequency generator (DFG) or other parametric non-linear frequency generator. As examples of non-linear medium mention can be made of LBO, KTP, BBO, $LiIO_3$, KDP, KD*P, KBO, KTA, ADP, LN (lithium niobate) or periodically-poled LN or combinations thereof (e.g. to generate green and yellow lasers simultaneously). Suitably a LBO, BBO or KTP crystal is used. The light can be frequency doubled or frequency summed by angle-tuning and/or controlling the temperature of the solid non-linear medium. In preferred embodiments the light is frequency doubled so as to generate yellow light. Typical variations in the visible wavelength with a LBO crystal cut for type 1 non-critical phase-matching with temperature tuning to approximately 149° C., approximately 40° C. or approximately 0° C. include 532 nm (green), 578-580 nm (yellow) and 632-636 nm (red). By such frequency doubling it may be possible to generate wavelengths in the yellow or orange spectral region suitable for dermatological, ophthalmic and visual display applications, and by means of other processes such as sum frequency generation still further wavelengths may be generated. The resonator design may be such that the beam size in the doubling medium is sufficiently small to allow efficient conversion and high output powers but large enough to avoid optical damage. Suitably the solid non-linear medium is AR-coated to minimise losses in the 1-1.35 micron region and in the visible where possible. A suitable AR coated LBO crystal for intracavity use is 4×4×10 mm and for extra-cavity use is 4×4×10 mm although other sizes can be used.

Preferably the resonator cavity is defined by at least two reflectors which can be two mirrors at least one of which is preferably curved to provide a stable output laser beam (the other mirror may be flat). Other suitable reflectors that can be used in the present invention include prisms or gratings. More preferably at least two curved mirrors are used, although it is possible to use more than two mirrors, different sets of mirrors reflecting the propagating laser beam and the propagating Raman-shifted beam such as in a bow-tie resonator. When a solid non-linear medium is used, another mirror may be present such as in a dichroic cavity. Suitable reflectors defining the resonator cavity are well known in the art and can be coated to enable operation at lower Raman thresholds for the first Stokes order thereby helping to suppress higher-order Stokes generation and self-focussing. The mirrors may also be coated to have high transmission at the output wavelengths of interest. Reflectors can be provided with special dielectric coating for any desired frequency. The mirrors can provide for the laser output to be coupled out of the cavity such as by use of a broadband dichroic mirror transmissive at the frequency of the output beam but suitably highly reflective at other frequencies so as to cause build-up of the power intensities of the beams in the cavity. Alternatively a polarisation beam splitter can be used to outcouple the laser output. The radius of curvature and separation between the reflectors (cavity length) and transmission characteristics of the outcoupling mirror are suitably chosen to provide cavity stability for a sufficiently wide range of combinations of $f_L$ and $f_R$. The radius of curvature of the reflectors are appropriately selected on the basis of the Raman and laser crystal used (for some Raman-active crystals +ve effective lens powers of the reflector are desirable and for others −ve effective lens powers of the reflectors are desirable). Suitably the mirrors are chosen so as to be greater than 99% reflective at the laser wavelengths. The laser resonator cavity is suitably a stable resonator which supports the $TEM_{00}$ mode. For the intracavity-doubled laser, all mirrors/reflectors are suitably chosen to be >99% reflective at the fundamental wavelength and the Raman wavelength. The frequency-doubled laser beam is suitably coupled out of the resonator through a dichroic mirror—i.e., a mirror which has high transmission at the frequency-doubled wavelength but high reflectivity at the fundamental and Raman wavelengths. Preferably the resonator has three or more mirrors/reflectors and is configured so that the frequency-doubled or frequency summed beams which are generated in both directions in the non-linear medium can be extracted efficiently in a single beam. In such a configuration, the end mirror closest to the non-linear medium will have high reflectivity at the frequency-doubled wavelength. The reflectors and/or mirrors may, independently, be flat or may be non-flat. They may have a radius of curvature between about 5 and about 100 cm or more, depending on factors described above. The radius of curvature of each mirror and/or reflector may be between about 10 and 100, 20 and 100, 50 and 100, 5 and 50, 5 and 20, 5 and 10, 10 and 50, 10 and 30, 15 and 25 or 18 and 22 cm, and may be about 5, 10, 15, 16, 17, 18, 19, 20, 21, 22, 23, 24, 25, 30, 35, 40, 45, 50, 60, 70, 80, 90 or 100 cm, or may be some other value.

Suitably the transmission characteristics, radius of curvatures and separation of the reflectors are tailored to achieve efficient and stable operation of the Raman laser and to generate output at the visible wavelengths by frequency doubling or sum frequency generation in the non-linear medium. Suitably the curvature of the reflectors and cavity length are optimised to obtain the desired mode diameter such that near-optimum beam sizes are achieved simultaneously in the laser material, the Raman-active medium and the solid non-linear medium such that changes in the focal lengths of the laser material and the Raman-active medium as a result of thermal effects in the laser material and the Raman-active medium during operation of the laser do not cause the laser modes to expand to the extent that the radiation suffers large losses. The laser material, Raman-active medium and the non-linear medium can be positioned in the cavity as discrete elements. Alternatively one or more of the components can be non-discrete, one component performing the dual function of both the laser material and the non-linear medium (such as self-frequency doubling or self doubling materials such as Yb:YAB and Nd:YCOB) or performing the dual function of the laser material and the Raman-active medium (Nd:KGW) or the dual function of the Raman-active medium and the non-linear medium (such as by use of a non-centrosymmetric crystal such as $LiIO_3$). Triple function materials, which provide fundamental laser gain, Raman conversion and SHG/DFG/SFG may also be used. Examples of such materials include Nd:PPLN, Yb:PPLN, Nd:YAB, Yb:YAB. In this case, a single medium would replace the laser material, the Raman-active medium and the non-linear medium. Devices using such materials may provide low average power output. They may have the advantage of being extremely compact.

The pulse repetition frequency of the output can be varied by using a Q-switch such as an active Q-switch or a passive Q-switch. An acousto-optic Q-switch, an electro-optic Q-switch or passive Q-switches (Cr:YAG) can be used. Alternatively a cavity dumping configuration or other suitable means can be adopted (see 'The Laser Guidebook' by Jeff Hecht, $2^{nd}$ Edition, McGraw-Hill 1992, the whole content of which is incorporated by cross reference). The Q-switch causes fundamental laser output to occur in a pulsed format with high peak powers as required to achieve efficient Raman conversion. The Q-switch may be broadband AR-coated for the 1-1.35 micron region to minimise resonator losses. The selection and alignment of the Q-switch is tailored to achieve a high-Q resonator for the fundamental. The pulse frequency is suitably chosen to provide cavity stability for a wide range of combinations of $f_L$ and $f_{R^-}$. Selection of the pulse repetition frequency affects the conversion efficiency to the Stokes wavelength, and therefore the Stokes output power and therefore also the thermal lens in the Raman-active medium. It is a useful parameter to vary because (to first-order) it affects the thermal lens in the Raman-active crystal while having very little effect on the thermal lens in the laser crystal. The pulse repetition frequency may be selected so that the beam size in the laser material is greater than the beam size in the Raman-active medium.

Varying the prf has two effects:

(i) because the Raman gain varies in proportion to the peak power at the fundamental wavelength, an increase of the prf may result in a decrease of the average output power at the Stokes wavelength (or its second harmonic);

(ii) varying the prf has very little effect on the thermal lens power associated with the laser crystal (that power is determined by the power density of the diode laser pump light). However as stated in (i) above, varying the prf does impact on the output power at the Stokes wavelength. Because the thermal lens power in the Raman-active crystal is proportional to power density at the Stokes frequency, a variation in prf also changes the thermal lens power in the Raman-active crystal (independently of the thermal lens power in the laser crystal). This can be useful in optimising the region of the stability where the system is desired to operate, and also the "transit" through the stability diagram.

At least one polariser may be included in the cavity and may be one or two plates of glass at Brewsters angle and/or a cube or other polariser. Such polarisers cause the fundamental to lase on only one linear polarisation. Some polarisation discrimination can also be introduced through the use of mirrors at non-normal incidence.

Reflectors

The transmission properties of the dielectric coatings on the cavity reflectors may be optimized to suit the output wavelength(s) of the laser system. Thus for example one reflector of the cavity may be optimised to transmit the pump beam frequency and reflect other frequencies that resonate in the cavity. Another reflector, the output reflector, may be optimised to be transmissive at the frequencies that may be outputted from the cavity (for example green, red and yellow) and reflective at other frequencies that may resonate in the cavity (for example the laser material frequency and the Stokes wavelength(s)). Alternatively the output laser beam may be coupled out is of the cavity using a polarization selector. For example if a Type I phase matched crystal is used, the input frequencies are polarized parallel to each other and the output frequency is polarized orthogonally to the input frequencies. A polarization selector may thus be used to couple only the orthogonal output frequency out of the cavity, while reflecting the input frequencies to resonate in the cavity.

Resonator Configuration

The methods described for wavelength selection may be applied to Raman lasers constructed using a variety of resonator designs, including coupled cavity resonators, shared intracavity resonators and self-Raman resonators.

Q-Switching

The Q-switch can be any of the following types: acousto-optic, electro-optic, mechanical or passive. The Q-switch is typically operated with repetition frequency between 5 and 15 kHz, for example between 5 and 12, 5 and 10, 5 and 8, 7 and 15, 10 and 15, 12 and 15, 7 and 13 or 8 and 12 kHz, e.g. about 5, 6, 7, 8, 9, 10, 11, 12, 13, 14 or 15 kHz. Operation at repetition rates outside this range are also possible. Pulse durations at the fundamental and the first or higher order Stokes wavelengths are typically are generally between 5 ns and about 25 nsec. However they may also be in the range 1 to about 100 nsec, or 1 to 80, 1 to 50, 1 to 30, 1 to 20, 1 to 10, 1 to 5, 5 to 100, 10 to 100, 20 to 100, 50 to 100, 70 to 100, 10 to 80, 20 to 70 or 30 to 60 nsec, and may be about 1, 2, 3, 4, 5, 6, 7, 8, 9, 10, 15, 20, 25, 30, 35, 40, 45, 50, 55, 60, 65, 70, 75, 80, 85, 90, 95 or 100 nsec.

Wavelength Selection

This invention provides for several different methods for selecting the output wavelength of the laser systems described herein. Thus wavelength selection may be made on the basis of tuning a non-linear medium to a particular wavelength emanating from the Raman-active crystal, or it may be made by some other means.

Methods to tune the non-linear medium to a particular frequency include:

Angle tuning: A birefringent crystal may be responsive to different wavelengths of incident light at different angles. Thus if an incident beam comprises more than one wavelength of light, the wavelength that is shifted by the crystal may be selected by rotating the crystal. For example, a Nd:YAG laser material may produce a beam at 1064 nm wavelength. If this is directed to a KGW Raman-active crystal, the KGW crystal may produce both 1158 nm and 1272 nm Stokes wavelengths. If this output beam is directed to a second harmonic generator crystal, either the 1158 nm input wavelength or the 1272 nm wavelength may be selectively converted to its second harmonic. Consequently rotating the crystal can select between output wavelengths of either 579 nm or 636 nm (being the second harmonics of 1158 and 1272 nm respectively). A disadvantage of this method is that the beam waist for an 1158 nm beam will be in a different position to that for a 1272 nm beam due to thermal lensing effects. Thus the position of the crystal may be chosen to be a compromise between the two optimum positions, or to favour the beam whose output power is the most critical for the end application. Alternatively, a device may be provided to move the crystal to the optimum position when selecting a particular wavelength of output laser light. A further disadvantage of this method is that the reflectors may need to be retuned/realigned when selecting between wavelengths of output laser light. When angle tuning, it is preferable to use a small rotation angle, in order to minimize reflection losses, and avoid the use of a wide angle aperture crystal, which may be larger and hence more expensive.

Temperature tuning: It is possible to tune the wavelength to which a non-linear medium will respond by altering the temperature of the non-linear medium. Thus, in the example of a Nd:YAGNd:YAG laser material with a KGW Raman-active medium, a non-linear medium may receive an input beam comprising 1064, 1158 and 1272 nm wavelengths. At 150° C., the crystal may be responsive to 1064 nm laser light to produce a green output beam at 532 nm, at 40° C. it may be responsive to 1158 nm laser light to produce a yellow output beam at 579 nm, and at 0° C. it may be responsive to 1272 nm laser light to produce a red output beam at 636 nm. A disadvantage of this method is that the thermal mass of non-linear medium causes the changing between different output laser light wavelengths to be slower than for other methods. Switching times when using temperature tuning in the laser system of the present invention may be around 1 minute, and may be less than about 2 minutes, or less than about 1.5, 1 or 0.5 minutes, and may be about 30, 40, 50, 60, 70, 80, 90, 100, 110 or 120 seconds. In addition, there may be practical problems with resistance of materials of construction to high temperatures, and with condensation caused by sub-ambient temperatures. As with angle-tuning, the location of the non-linear medium must be a compromise between the optimum positions for the different wavelengths. An advantage of temperature tuning is the fact that, when changing wavelengths, it is not necessary to realign the non-linear medium, and the medium may be aligned for both wavelengths normal to the axis of the cavity, where insertion losses may be low.

In a variation of temperature tuning, the non-linear medium comprises a single non-linear medium, in which the non-linear medium is cut such that it may be temperature tuned to convert a first frequency of incident laser light passing through the medium at a first angle, or a second frequency of incident laser light passing through the medium at a second angle (non-linear bounce geometry). The tuner may comprise a temperature tuner for temperature-tuning the non-linear medium in order to select which frequency of incident laser light is converted. Thus for example, the non-linear medium may comprise a crystal cut so that it is capable of doubling the fundamental frequency at the unreflected (incident) angle when held at a first temperature, and is capable of doubling the first Stokes frequency at the reflected angle when held at a second temperature. In this case, when the crystal is maintained at the first temperature, the fundamental will be doubled to form a visible frequency which may be outputted from the cavity. When the crystal is maintained at the second temperature, the fundamental frequency will resonate in the cavity and be converted by the Raman-active medium into the first Stokes wavelength, which may then be doubled by the crystal to generate a visible output frequency. This variation is similar to the multiple crystal method described below, whereby the multiple crystals are represented by two different propagation angles within the same crystal. The bounce angle may be between about 1 and about 45°, or between about 1 and 30, 1 and 20, 1 and 20, 1 and 10, 1 and 5, 5 and 45, 20 and 45, 30 and 45, 2 and 10, 3 and 8, 4 and 7 or 4 and 6°, and may be about 1, 2, 3, 4, 5, 6, 7, 8, 9, 10, 15, 20, 25, 30, 35, 40 or 45°. In this case the bounce angle is defined as the angle between the incident beam and the surface from which it reflects. The angle between the incident beam and the angle of the crystal may be less than about 10°, or less than about 8, 6, 4 or 2°, and may be about 0, 1, 2, 3, 4, 5, 6, 7, 8, 9 or 10°. The angle by which the beam is deflected by reflection within the crystal may be between about 1 and 90°, or between about 1 and 60, 1 and 40, 1 and 20, 1 and 10, 10 and 90, 40 and 90, 60 and 90, 4 and 20, 6 and 16, 8 and 14 or 8 and 12°, and may be about 2, 4, 6, 8, 10, 12, 14, 16, 18, 20, 30, 40, 50, 60, 70, 80 or 90°. The temperature difference between the two temperatures to which the crystal may be tuned may be less than about 50° C., or less than about 40, 30, 20, 10 or 5° C., and may be between about 5 and 50, 10 and 50, 20 and 50, 5 and 40, 5 and 20, 5 and 10, 10 and 40, 10 and 20, 20 and 40, 15 and 30 or 15 and 25°, and may be about 5, 10, 15, 20, 25, 30, 35, 40, 45 or 50°. For example the crystal may be set to phase match yellow at 45° (from frequency doubling the first Stokes wavelength) and green at 25° (from frequency doubling the fundamental).

In essence, in non-linear crystal bounce geometry, the grazing incidence bounce geometry allows multiple crystal axes to be accessed (much like a dual crystal arrangement) in a single crystal. The benefits of this geometry are essentially the same as for a dual crystal arrangement, except the bounce geometry has the added advantage of having two less optical interfaces, which substantially reduces insertion losses. Insertion losses have been outlined as a significant issue in a multiple crystal system.

Non-linear bounce geometry provides the following benefits and alternatives:

The bounce angle may be chosen to bisect a wide variety of angle differentials. In Example 5 the differential is 11.3°, but it may be 5°, or 20°, as shown in FIG. 17, or any other angle provided that it is less than the critical angle of the refractive index change between the crystal and air (according to Snell's law for total internal reflection). It should be noted that in FIG. 17, the two non-linear interaction lengths are not equal.

The incident angle may be altered to change the two interaction angles.

In Example 5, the bounce does not affect the theta angle, and only affects the phi plane. This may not necessarily always be the case. The bounce may alternatively affect the theta angle, or both phi and theta angles.

The two interaction lengths do not have to be equal as shown in FIG. 17.

The crystal of example 5 aims to access one non-linear interaction at each particular temperature setting. In other examples, the two interactions may be set to occur simultaneously.

The interactions may both be type I or type II, or one of each type I and II.

Alternatively, the material may be periodically poled for quasi-phase matching. In this case, the poling angle may be chosen such that the period length experienced by the two interactions is different, effectively producing multiple non-linear interactions. This is illustrated in FIG. 18. In FIG. 18, period poling is performed on an angle such that the internal bounce causes the beam to experience two different poling periods, which is the quasi-phase matching analogy for two non-linear crystal cuts. In this figure, the difference in the two periods is illustrated by the red and green lines along the two interactions.

The crystal input and output faces may be angled so the input beam enters the crystal perpendicularly, which reduces losses, as shown in FIG. 19.

There may potentially be multiple bounces off both a side and roof of the crystal.

The cut of the crystal and the bounce angle (or the angular difference between the incident and reflected propagation axes) may affect the magnitude of the temperature difference between the two temperatures to which the crystal may be tuned. It will be understood that for a particular crystal axis, the wavelength of output will be a function of temperature. By choice of appropriate crystal cut, the curves of wavelength vs temperature for the different crystal axes may overlap. As a result, it may be possible to obtain two different frequencies of converted (e.g. visible) laser light at a single temperature, and consequently the laser system may be capable of producing multiple output frequencies simultaneously.

Hence there is disclosed:

(A) A single crystal of a non linear medium in which the propagating laser beams in the crystal are totally internally reflected at an internal surface in the crystal, said crystal being cut with respect to the crystallographic axes of the crystal whereby:

(i) said crystal is capable of frequency converting a first laser light beam comprising a first frequency propagating through the crystal when said crystal is at a first temperature up to a temperature less than said second temperature, said frequency converting of said first laser light beam at said first temperature up to a temperature less than said second temperature, the second temperature being higher than the first temperature, not being frequency converted subsequent to undergoing total internal reflection in the material; and wherein (ii) said crystal is capable of frequency converting a second laser light beam comprising a second frequency when reflected in said crystal at a totally internally reflected angle when said crystal is held at a temperature higher than the first temperature up to at least a second temperature said frequency converting of said second laser light beam at said temperature higher than the first temperature up to at least a second temperature not being frequency converted prior to undergoing total internal reflection in the crystal.

(B) A single crystal of a non linear medium in which the propagating laser beams in the crystal are totally internally reflected at an internal surface in the crystal, said crystal being cut with respect to the crystallographic axes of the crystal whereby:

(i) said crystal is capable of frequency converting a first laser light beam comprising a first frequency propagating through the crystal when said crystal is at a first temperature up to a temperature less than said second temperature, said frequency converting of said first laser light beam at said first temperature up to a temperature less than said second temperature, the second temperature being higher than the first temperature, not being frequency converted prior to undergoing total internal reflection in the material; and wherein (ii) said crystal is capable of frequency converting a second laser light beam comprising a second frequency when reflected in said crystal at a totally internally reflected angle when said crystal is held at a temperature higher than the first temperature up to at least a second temperature said frequency converting of said second laser light beam at said temperature higher than the first temperature up to at least a second temperature not being frequency converted subsequent to undergoing total internal reflection in the crystal.

The first temperature and the second temperature may be such that said first laser beam is not frequency converted at said second temperature and said second laser beam is not frequency converted at said first temperature.

The first temperature is different from the second temperature and is dependent on the temperature dependence of frequency converting characteristics of the non linear material and the crystal cut. The frequency converting may comprise frequency doubling (SHG), frequency summing, frequency differencing or some other non linear frequency converting.

(C) A method of frequency converting a first laser light beam comprising a first frequency and a second laser light beam comprising a second frequency comprising passing the first laser light beam through a single crystal of a non linear medium such that the first laser beam is totally internally reflected at an internal surface of the crystal said crystal being at a temperature in the range of from a first temperature up to but less than a second temperature, said second temperature being higher than said first temperature, to frequency convert said first laser light beam and passing the second laser light beam through the crystal such that the first laser beam is totally internally reflected at an internal surface of the crystal said crystal being at a temperature higher than said first temperature up to a second temperature to frequency convert said second light beam said single crystal being cut with respect to the crystallographic axes of the crystal whereby:

(i) said crystal is capable of frequency converting a first laser light beam comprising a first frequency propagating through the crystal when said crystal is at a first temperature, said frequency converting of said first laser light beam at said first temperature not being frequency converted subsequent to undergoing total internal reflection in the material, and wherein:

(ii) said crystal is capable of frequency converting a second laser light beam comprising a second frequency when reflected in said crystal at a totally internally reflected angle when said crystal is held at a second temperature said frequency converting of said second laser light beam at said second temperature not being frequency converted prior to undergoing total internal reflection in the crystal.

(D) A method of frequency converting a first laser light beam comprising a first frequency and a second laser light beam comprising a second frequency comprising passing the first laser light beam through a single crystal of a non linear medium such that the first laser beam is totally internally reflected at an internal surface of the crystal said crystal being at a temperature in the range of from a first temperature up to but less than a second temperature, said second temperature being higher than said first temperature, to frequency convert said first laser light beam and passing the second laser light beam through the crystal such that the first laser beam is totally internally reflected at an internal surface of the crystal said crystal being at a temperature higher than said first temperature up to a second temperature to frequency convert said second light beam said single crystal being cut with respect to the crystallographic axes of the crystal whereby:

(i) said crystal is capable of frequency converting a first laser light beam comprising a first frequency propagating through the crystal when said crystal is at a first temperature, said frequency converting of said first laser light beam at said first temperature not being frequency converted prior to undergoing total internal reflection in the material, and wherein:

(ii) said crystal is capable of frequency converting a second laser light beam comprising a second frequency when reflected in said crystal at a totally internally reflected angle when said crystal is held at a second temperature said frequency converting of said second laser light beam at said second temperature not being frequency converted subsequent to undergoing total internal reflection in the crystal.

The frequency converting may comprise frequency doubling (SHG) frequency summing, frequency differencing or some other non linear frequency converting.

SHG (E) A non linear medium in which the propagating laser beams are totally internally reflected within the crystal, comprising:

a single crystal of a non linear material which is cut with respect to the crystallographic axes of the crystal whereby:

(i) said crystal is capable of frequency converting a first laser light beam comprising a first frequency propagating through the material when said crystal is at a first temperature, said first laser light beam not being converted subsequent to undergoing total internal reflection and wherein:

(ii) said non linear medium is capable of frequency converting a second laser light beam comprising a second frequency after being reflected in said crystal at a totally internally reflected angle when said crystal is held at a second temperature said first laser light beam not being converted prior to undergoing total internal reflection and wherein the first temperature is different from the second temperature.

The first and second temperatures are dependent on the non linear material and the cut. The frequency converting may comprise frequency doubling or some other non linear frequency converting.

SFG/DFG (F) A non linear medium in which the propagating laser beams are totally internally reflected within the crystal, comprising:

a single crystal of a non linear material which is cut with respect to the crystallographic axes of the crystal whereby:

(i) said crystal is capable of frequency converting a first pair of propagating laser light beams comprising two frequencies propagating through the material when said crystal is at a first temperature, the said laser light beams not being converted subsequent to undergoing total internal reflection and wherein:

(ii) said non linear medium is capable of frequency converting a second, different pair of propagating laser light beams comprising two frequencies propagating through the material after being reflected in said crystal at a totally internally reflected angle when said crystal is held at a second temperature said second pair of laser light beams not being converted prior to undergoing total internal reflection and wherein the first temperature is different from the second temperature and is dependent on the non linear material and the cut. The frequency converting may comprise sum frequency mixing or difference frequency mixing or some other non linear frequency converting.

The SFG/DFG case can be generalised to include the SHG case by making the pair of laser beams have the identical frequencies.

The resonating light beams may be reflected off an interior face of a non-linear medium, such that a single non-linear media exhibits two simultaneous angular phase-matching conditions for a given said temperature for the incident and reflected beams. The non-linear medium may be selected from the group consisting of a temperature tunable non-linear medium, an angle tunable non-linear medium. The non-linear medium may selectively frequency convert at least one of the laser light beams to a frequency altered laser light beam comprising a single converted wavelength said frequency converting not comprising a Raman frequency shift by temperature tuning the incident beam and detuning the reflected beam simultaneously inside the non-linear media whereby the reflected beam inside the non-linear medium does not frequency convert at least one of the laser light beams. The non-linear medium may selectively frequency convert at least one of the laser light beams to a frequency altered laser light beam comprising a single converted wavelength said frequency converting not comprising a Raman frequency shift by temperature tuning the reflected beam and detuning the incident beam simultaneously inside the non-linear media whereby the incident beam inside the non-linear medium does not frequency convert at least one of the laser light beams. The non-linear medium may simultaneously selectively frequency convert a) at least one of the laser light beams to a frequency altered laser light beam comprising a single converted wavelength said frequency converting not comprising a Raman frequency shift by temperature tuning the incident beam inside the non-linear medium and b) a second frequency altered laser light beam comprising a single converted wavelength said frequency converting not comprising a Raman frequency shift by temperature tuning the reflected beam inside the non-linear medium. The said second frequency conversion may involve both one of the original light beams and the frequency altered laser beam from the incident beam conversion inside the non-linear medium.

Non-Critical Phase Matching (NCPM) in LBO

FIG. 14 shows the phase matching temperature for a crystal cut at (theta=90°, phi=0°), Increasing the phi angle slightly effectively shifts these curves downwards. This provides an explanation for the fact that the crystal cut at (theta=90°, phi=11.3°) critically phase-matches for 1064+1064 nm at close to room temperature. In FIG. 15, three curves are shown for three separate phi cuts of 0, 5 and 10° (theta=90° in all cases), indicating the flexibility for phase matching different wavelengths at different temperatures. This figure shows how multiple non-linear interactions can increase the flexibility for wavelength switching. The three stokes wavelengths using KGW are shown on the diagram for reference. It may be observed that phase-matching around room temperature is desirable, as low temperatures may create condensation problems and high temperatures may damage crystal coatings. Temperatures far from ambient may also be more difficult to achieve and maintain. It should be noted that theta and phi are angles relative to crystal axes defined by the lattice structure. Variation of these angles changes the phase-matching condition for the given direction of propagation.

Critical Phase Matching (CPM) in LBO

Critical phase matching occurs when the crystal angle is changed to achieve phase-matching, so the crystal cut is no longer at 0° or 90°. The example shown in FIG. 16 is for temperatures around room temperature. Notation expresses theta=q and phi=f.

Multiple crystals: a method to overcome at least some of the disadvantages of angle-tuning and of temperature-tuning comprises the use of a plurality of individual non-linear media. Each of the individual non-linear media may be composed of the same material as each of the others, or they may be composed of different materials or some may be composed of the same material and others may be composed of a different material. In this method, an individual non-linear medium may be located at or near the beam waist, or at a position of small beam size, of each wavelength of output from the Raman-active medium. In the example of a Nd:YAG laser material with a KGW Raman-active medium, this output comprises two Stokes wavelengths (1158 nm and 1272 nm) as well as the laser material wavelength (1064 nm). Since non-linear media need to be maintained at the correct temperature to be active (as described above), it is possible to detune an individual non-linear medium by altering its temperature. The change in temperature required to do so is quite small, and consequently the problems described above, associated with large temperature changes, may be avoided. The temperature change to detune a crystal may be less than about 30 Celsius degrees. It may be between about 0.1 and 30 Celsius degrees, or between about 0.1 and 10, 0.1 and 5, 0.5 and 20 or between about 0.5 and 10 or between about 1 and 30 or between about 10 and 30 or between about 1 and 10 or between about 2 and 10 or between about 5 and 10 Celsius degrees, and may be about 0.1, 0.2, 0.5, 1, 2, 3, 4, 5, 6, 7, 8, 9, 10, 12, 14, 16, 18, 20, 25 or 30 Celsius degrees or it may be greater than about 30 Celsius degrees. Thus the single converted wavelength of output laser light may be selected by tuning only the individual non-linear medium that corresponds to that single converted wavelength. For example a single converted wavelength of yellow output light at 579 nm may be selected by maintaining the individual non-linear medium responsive to 1158 nm at the correct temperature for tuning, and optionally detuning the other individual non-linear media. Alternatively the two or more non-linear media may be cut such that they are sequentially tuned to double or frequency sum different wavelengths whilst the temperature of the non-linear media is varied, that temperature being the same temperature for both or all of the non-linear media. In a further alternative two non-linear media may be aligned to convert the Raman frequencies of different polarizations. For example one non-linear medium may be aligned for frequency doubling the first Stokes wavelength of KGW at 1158 nm to generate a single converted wavelength of 579 nm, or for sum frequency generation with the fundamental frequency to generate a single converted wavelength of 555 nm, at one polarization. A second non-linear medium may be aligned for frequency doubling or frequency summing of the other first Stokes wavelength at 1176 nm to generate a single converted 588 nm (frequency doubling) or 559 nm (frequency sum with the fundamental at 1064 nm) at the orthogonal polarization. In another alternative, three separate non-linear media may be used: one may be aligned for frequency doubling the fundamental (1064 nm) to generate a single converted beam at 532 nm (green); another may be aligned for frequency doubling the first Stokes wavelength of 1158 nm to generate a single converted beam at 579 nm (yellow) and the third may be aligned for frequency doubling the alternative Stokes wavelength of 1176 nm to generate a single converted beam at 588 nm (orange), being polarized orthogonally to the beam at 579 nm.

The non-linear media may be positioned to optimize the output at important or desirable wavelengths. The effect of their relative positioning may be due to the transmission of their antireflection coatings and to the average beam size in each crystal. For example to design a laser which enabled an operator to select green or yellow output, and where as much yellow as possible was desired, the nonlinear medium which produced yellow output may be positioned where the beam width was smallest and so that the yellow photons were subject to low as possible transmission losses. A folded resonator may be appropriate, and the yellow doubling crystal may be placed next to the folding mirror.

Introduction of additional optical elements into the cavity may give rise to optical losses (insertion losses) due to the introduction of additional interfaces. This may be at least partially combated by bonding the plurality of individual non-linear media, e.g. by diffusion bonding. At least two of the non-linear media may be bonded together. Since the individual non-linear media may be chemically similar or identical, although with different cuts, such bonding may be effective and may reduce the number of interfaces compared to a situation in which they were not bonded.

Bonded Non-Linear Crystal Geometry

Bonded crystal geometry is very similar to the dual crystal arrangement, except that the crystals are bonded (e.g. diffusion bonded) together. This eliminates two optical interfaces, thereby reducing insertion losses. Diffusion bonding information may be obtained at, for example http://www.onyxoptics.com, the contents of which are incorporated herein by cross reference. This arrangement has the multiple non-linear interactions advantages of multiple crystals without the added insertion losses. Additionally it is easier to align the components of the system than when using bounce geometry described above. This can thus be an extension of the multiple crystal geometry where the crystals are bonded together. FIG.

20 shows three crystals cut at different angles, bonded together. The incident laser beam then experiences three different non-linear interactions as it passes through the combination. In FIG. 20, the three non-linear crystals are bonded together, giving three interaction lengths with different non-linear phase matching characteristics.

The use of bonded non-linear crystal geometry offers the following flexibility and advantages:

There may be any number of crystals

The crystals may all be the same material, such as LBO, or they may be different materials.

Quasi-Phasematching

There is a class of SHG/SFG materials, such as periodically-poled lithium niobate (PPLN), that use quasi-phasematching rather than the birefringence properties of the medium to achieve efficient conversion. Quasi-phasematching relies on the use of a periodic structure which forms a grating within the crystal, with alternating crystal domain direction (and hence sign of the nonlinear coefficient) so that the phase mismatch introduced in each domain is compensated in the next domain. As well as angle and temperature tuning, quasi-phasematched materials may also be tuned by altering the period of the grating. This may be achieved by using a medium with multiple gratings or a medium with a fan-shaped grating structure, and then tuning by translating the medium laterally to the laser beam in the plane of the grating. Thus in this case the wavelength may be selected by translating the laser beam laterally to the laser beam so that the laser beam is exposed to a grating structure in the non-linear medium corresponding to the desired wavelength of output laser light. In this case the tuner may comprise a mechanical translator, for translating the non-linear medium laterally to the laser beam. The wavelength shifted laser light beam generated by the non-linear medium may then be outputted from the cavity using the output coupler.

Use of the Laser

The invention includes a use or method of using laser light for treating, detecting or diagnosing a selected area requiring such diagnosis or treatment on or in a subject comprising illuminating the selected area with the output laser beam of the invention. The selected area may be illuminated with a laser beam having a wavelength for a time and at a power level which is appropriate and effective for the diagnosis or therapeutically effective for the treatment. The subject may be a mammal or vertebrate or other animal or insect, or fish. The subject may be a mammal or vertebrate which is a bovine, human, ovine, equine, caprine, leporine, feline or canine vertebrate. Advantageously the vertebrate is a bovine, human, ovine, equine, caprine, leporine, domestic fowl, feline or canine vertebrate. The use or method of the invention finds particular application in treating the eyes and skin of a mammal or vertebrate. A yellow/green laser beam produced by the system or method of the invention has the advantage of having selectable wavelengths of 532 and 579 nm which are particularly advantageous in treating, detecting or diagnosing certain disorders especially certain disorders in opthalmology and dermatology. The use or method of the invention also finds particular application in treating soft tissue and in particular, the laser treatment of the prostate. A yellow/green laser beam produced by the system or method of the invention has the advantage of having selectable wavelengths of 532 and 579 nm which are particularly advantageous in treating, detecting or diagnosing benign prostatic hyperplasia (BPH). In another embodiment of the use or method of the invention, the laser output is fibre delivered and allows switchability between green and yellow light which may be beneficial in the treatment of soft tissue and in particular the prostate.

The laser of the present invention may also be used in connection with holograms, in diagnostic applications (for example in displays, fluorescence detection, cell separation, cell counting, imaging applications), military systems (e.g. for military countermeasures, underwater systems, communication, illumination, ranging, depth sounding, mapping contours such as a sea floor), opthalmology, urology, surgery (e.g. vascular surgery) for purposes including cutting, coagulation, vaporization, destruction of tissue etc., stimulation, photodynamic therapy etc., gas detection, treatment of skin disorders e.g. psoriasis. It may be used in dermatological applications such as treatment of spider veins, or treatment of acne, skin rejuvenation or treatment of hypopigmentation due to sun damage. The laser may be used in combination with other therapies, for example treatment with drugs, creams, lotions, ointments etc. (e.g. steroids), optically clearing agents, other device based therapies etc.

The invention includes a use or method for displaying laser light on a selected area comprising illuminating the selected area with the output laser beam of the invention. The invention may also comprise use of an aim beam in order to aim the output laser beam towards the selected area. The aim beam may have a wavelength in the visible range. Accordingly, the laser system may also comprise a source of the aim beam, which may be a diode laser, an LED or some other suitable source. A mirror, which may be a dichroic mirror, may also be provided in order to direct the aim beam in the same direction as the output laser beam.

It is well-known that visible light, in particular green/yellow and red light can be used to target a variety of chromophores present in human or animal tissue. These chromophores include melanin, haemoglobin, collagen-related constituents and also porphyrin, which is present for example at bacteria sites associated with acne.

As a consequence, green, yellow and red light can be used to treat a wide variety of medical conditions and to perform a variety of cosmetic procedures. Many of these treatments involve eye and skin, and examples include retinal procedures, treatment of vascular and pigmented lesions, collagen rejuvenation, wound and scar healing and acne treatment.

In addition to the natural chromophores listed above, special dyes may be incorporated into body tissues, which react with certain components of body tissue when activated by particular wavelengths of light. This process is called photodynamic therapy, and is being used increasingly to treat a range of medical disorders ranging from cancer to skin and eye disorders.

In using a laser to provide any of the treatments above, there is an optimum wavelength of the laser light which provides the best clinical effectiveness with fewest side effects. This is optimum wavelength depends on the condition being treated, the chromophore being targeted and the characteristics of the surrounding tissues (eg. skin type).

The laser systems described in this specification offer a particular advantage to clinicians, in that several wavelengths can be output from a single solid-state laser device. The ability to switch between wavelengths is an important benefit to clinicians (for example doctors, dermatologists, opthalmologists, cosmetic physicians) because it enables them to treat patients with a wider range of skin types and a wider range of medical or cosmetic complaints. The laser described herein has the ability to be made compact and portable.

To achieve a similar range of wavelengths using conventional laser sources, a clinician would need to use multiple laser sources, which is a costly and space-consuming option.

The table below summarises the applications to which the laser of the present invention may be applied, together with the wavelengths suitable for those applications.

| Conditions treated | Laser output wavelength | | | | | | |
|---|---|---|---|---|---|---|---|
| | UV (nom. 310-311 nm) | Green (nom. 532 nm) | Yellow (nom. 579 or 588) | Red (nom. 621 or 636 nm) | IR (nom. 1064 nm) | IR (nom. 1156/1177 Nm) | IR (nom. 1319/1320 nm) |
| Tattoo removal | | ✓ | ✓ | ✓ | ✓ | | ✓ (?) |
| Hair removal | | | | | ✓ | | ✓ |
| Skin rejuvenation/tightening | | ✓ | ✓ | ✓(?) | ✓ | | ✓ |
| Vascular lesions/rosacea/Port wine stains | | ✓ | ✓ | ✓(?) | ✓ | | ✓ |
| Leg vein (varicose) removal | | ✓ | ✓ | ✓(?) | ✓ | | ✓ |
| Pigmented lesions | | ✓ | ✓ | ✓(?) | ✓ | | ✓(?) |
| Scars/keloids | | | ✓ | ✓(?) | ✓(?) | | ✓ |
| Cellulite removal | ✓ | ✓ | ✓ | ✓ | ✓ | ✓(?) | ✓(?) |
| Psoriasis/Vitilago Autoimmune disease/eczema | ✓ | | ✓ | | | | |
| Acne | | ✓ | ✓ | ✓ | ✓ | | ✓ |
| Actinic Keratoses/Skin cancer | | | | | ✓(?) | | ✓ |
| Photodynamic therapy | ✓ | ✓ | ✓ | ✓ | | | |
| Other medical procedures, e.g. benign prostate hyperplasia, atrial fibrillation, ophthalmology, clot removal, removal (vaporization) of tissue | ✓ | ✓ | ✓ | ✓ | ✓ | | ✓(?) |

The symbol (?) in the above table indicates that the indication is likely but not certain. For tattoo removal applications it is preferable that the laser system be Q switched. Likewise a number of pigmented lesion applications may require a Q switched laser.

The present invention provides a laser system and/or methods to treat any of the above conditions by using a single wavelength or multiple wavelengths in the order and spaced by time that is matched to a patient's clinical status. Alternatively, multiple wavelengths may be applied to a patient concurrently e.g. as the IR and visible lasers may come from separate rods it is possible to apply IR and visible together or spaced by a time factor selected by the clinician from a range offered by the apparatus. Thus it may be possible to house more than one, e.g. 2, 3 or more than 3, laser systems according to the present invention in the one housing or box in order to provide the concurrent multiple wavelengths. Using the technology described in this specification, a laser system may also be constructed that provides more than one, e.g. 2, 3 or more than 3, visible output frequency simultaneously.

The invention may also comprise a software control system. Such a system may comprise a computer or other data processing/control device, having software therein. The software control system may be connected by for example electrical connections, to one or more components of the laser system, for example the pump beam source, the tuner etc. The software system, if present, may allow the laser system of the invention to be configured for a particular treatment condition. The software system may have a user interface, for example a keyboard, control panel and/or visual display unit (e.g. monitor). The user interface may allow a user to select a particular condition to be treated, whereby the software contains parameters (times of irradiation, intensity, wavelength, pulse width, pulse number etc.) appropriate for that condition, thus allowing automatic or semiautomatic control of the laser system by the software control system to provide the appropriate treatment to a patient. Alternatively or additionally, the user interface may enable a user to program the software control system with the parameters (times of irradiation, intensity, wavelength, pulse width, pulse number etc.) appropriate for a particular condition so that those parameters may be subsequently selected for treatment of a patient.

The software control systems may allow the laser system to be configured for a particular treatment condition, by having a control panel selected with the optimal wavelengths and temporal characteristics (i.e. pulse width, pulse number and the like). For example, selection by a user of an acne program may provide parameters appropriate for treatment in one or separate treatment session with yellow to target bacteria followed (or concurrent or spaced by a selectable time interval) by infrared (most likely 1320 nm to target sebaceous gland), and in another treatment for severe cases apply photodynamic therapy using red wavelength. Similarly, venous lesions can present in different sizes of blood vessels and be located at different depths (e.g. within one lesion such as a port wine stain, or multiple lesions such as spider veins and varicose veins on legs). Similarly to the acne example, a vascular lesion "treatment program" may be constructed to include green, yellow and infrared wavelengths. It should be also noted that photodynamic therapy may be used alone or in conjunction with other laser treatments using photoactive bio-molecules (such as conventional pharmaceuticals and/or biotech products or combinations with photoactive groups activated at one or more wavelength, e.g. 5-aminolaevulinic acid (ALA)) can be used in conjunction with a number of treatments, such as acne, skin rejuvenation, psoriasis. The chromophores for different bio-molecules vary and there may be absorption peaks at one or more wavelengths. The laser system of the present invention has the advantage that one device is capable of activating multiple chromophores of the same bio-molecule, thereby allowing the selection of the wavelength that is best absorbed by a patient (for example, based on their skin type) or alternately the laser system may be used by activating a "cocktail" of multiple bio-molecules having different chromophores.

BRIEF DESCRIPTION OF THE DRAWINGS

A preferred form of the present invention will now be described, by way of example only, with reference to the accompanying drawings wherein.

DETAILED DESCRIPTION OF THE PREFERRED EMBODIMENTS

Figure 1:
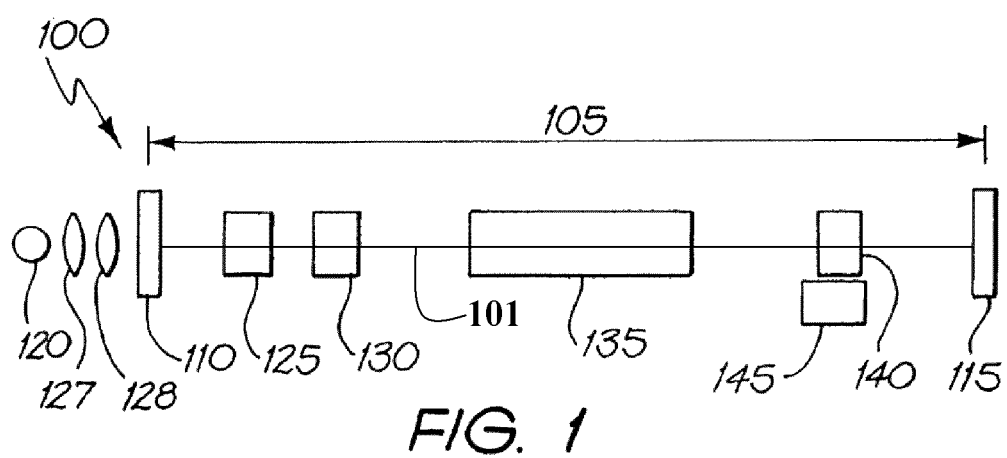
FIG. 1 is a diagrammatic representation of a laser system according to the invention wherein wavelength selection is by means of either angle tuning or by means of temperature tuning.

Referring to FIG. 1, a laser system 100 comprises a resonator cavity 105 defined by reflectors 110 and 115. The reflector 110 is highly reflective at all wavelengths generated within the resonator cavity 105, although the reflector 110 should be capable of allowing a pump beam from a pump source 120 to pass to a laser material 125. The laser system 100 may have at least one collimating lens 127 and at least one focusing lens 128, located between the pump source 120 and the laser material 125, for collimating and focusing the pump beam. The pump source 120 may be for example a diode laser, and is capable of exciting the laser material 125. The laser material 125 may be for example Nd:YAG, which is capable of generating laser light at 1064 nm. A Q-switch 130 is capable of converting the output from the laser material 125 into pulsed high power laser light capable of interacting with a Raman-active crystal 135 to generate one or more Stokes wavelengths of laser light. The Raman-active crystal 135 may for example be KGW, which can produce a first Stokes wavelength of 1158 nm and a second Stokes wavelength of 1272 nm when excited by a 1064 nm laser. A non-linear crystal 140 is provided to double the frequency of a selected wavelength of laser light, and may be for example lithium borate (LBO). A tuning device 145 is capable of selecting which wavelength of laser light can be frequency doubled by the non-linear crystal 140. The tuning device 145 may be for example a device to adjust the angle of the non-linear crystal 140 so as to angle tune the non-linear crystal 140 to the desired frequency, or the tuning device 145 may be a heating/cooling unit for temperature tuning the non-linear crystal 140. The reflector 115 is highly reflective at the wavelengths of the laser material and of the Raman-active crystal (in this example 1064 nm, 1158 nm and 1272 nm) and at least partly transmissive at the frequency doubled wavelengths (532 nm, 579 nm and 636 nm).

The laser system 100 may comprise at least one polariser (not shown) which may be included in the resonator cavity 105. The polariser may be one, two or more plates of glass at Brewsters angle and/or a cube, one or more angle rods/crystals or other polariser known in the art. The polarisers are believed to cause the fundamental to lase on only one linear polarisation. The polariser may be positioned in a location in the resonator cavity 105 where there is no significant visible field.

In operation, the pump source 120 generates a pump beam which excites the laser material 125. The pump beam may be focused on and/or in the laser material 125 using the collimating lens 127 and the focusing lens 128 in order to mode match the pump beam and the cavity laser beam within the laser material 125. In the example that the laser material 125 is Nd:YAG, this generates a laser beam at 1064 nm, which is converted by the Q-switch 130 to a high power pulsed laser beam. Excitation of the Raman-active crystal 135 by this high power pulsed laser beam leads to generation of a Stokes-shifted beam at 1158 nm, and may also generate a second Stokes-shifted beam at 1272 nm. These beams, together with the unshifted beam at 1064 nm pass to the frequency doubling crystal 140. The non-linear crystal 140 may be tuned by the tuning device 145. The tuning device 145 may be a heating/cooling unit, whereby the non-linear crystal 140 is adjusted to a temperature where it is capable of frequency doubling the selected wavelength of input laser light. For example an LBO crystal would be tuned to the unshifted beam (1064 nm) at about 150° C. to generate an output laser beam at 532 nm (green), to the first Stokes wavelength (1158 nm) at about 40° C. to generate an output laser beam at 579 nm (yellow), and to the second Stokes wavelength (1272 nm) at about 0° C. to generate a laser beam at 636 nm (red). Alternatively, the tuning device 145 may be a device to adjust the angle of the non-linear crystal 140 whereby tuning would be accomplished by orienting the non-linear crystal 140 at the precise angle at which the non-linear crystal 140 is capable of frequency doubling the desired wavelength of input laser light. The reflector 115 reflects the unshifted beam at 1064 nm, and the Stokes wavelengths of 1158 nm and 1272 nm, and permits at least part of the selected frequency doubled laser beam (532 nm, 579 nm or 636 nm) to exit the resonator cavity 105. Those wavelengths that are reflected by the reflector 115 continue to resonate within the resonator cavity 105 (along the optical axis 101) until they are converted to the desired wavelength for output, or else leak away elsewhere.

Figure 2:
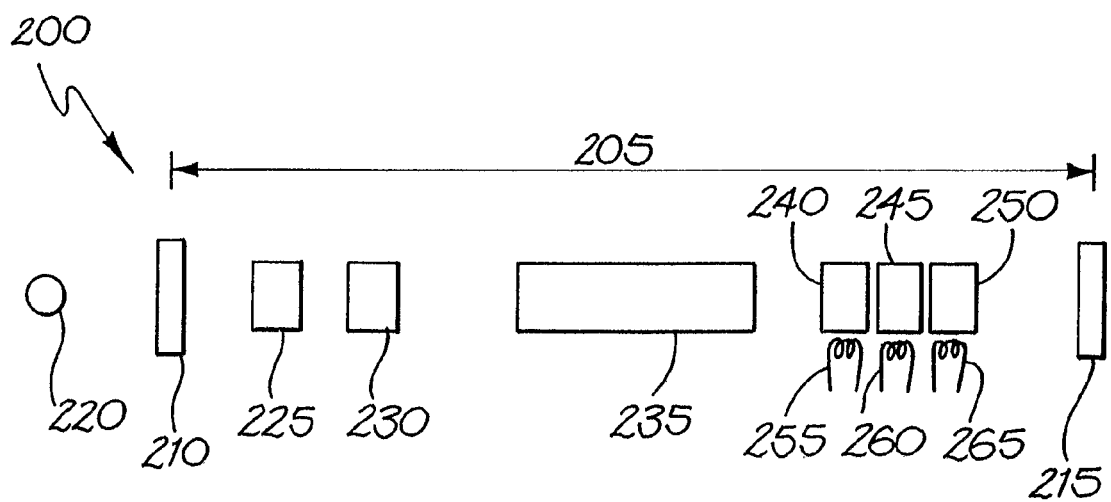
FIG. 2 is a diagrammatic representation of a laser system according to the invention wherein wavelength selection uses three individual non-linear media.

Referring to FIG. 2, a laser system 200 comprises a resonator cavity 205 defined by reflectors 210 and 215. The reflector 210 is highly reflective at all wavelengths generated within the resonator cavity 205, although the reflector 210 should be capable of allowing a pump beam from the pump source 220 to pass to a laser material 225. The laser system 200 may have at least one collimating lens and at least one focusing lens (not shown), located between the pump source 220 and the laser material 225, for collimating and focusing the pump beam. The pump source 220 may be for example a diode laser, and is capable of exciting the laser material 225. The laser material 225 may be for example Nd:YAG, which is capable of generating laser light at 1064 nm. A Q-switch 230 is capable of converting the output from the laser material 225 into pulsed high power laser light capable of interacting with a Raman-active crystal 235 to generate one or more Stokes wavelengths of laser light. The Raman-active crystal 235 may for example be KGW, which can produce a first Stokes wavelength of 1158 nm and a second Stokes wavelength of 1272 nm when excited by a 1064 nm laser. Each of the non-linear crystals 240, 245 and 250 is provided to double the frequency of a selected wavelength of laser light, and may be for example lithium borate (LBO). Each of the non-linear crystals 240, 245 and 250 may be tuned to double a particular wavelength of laser light using temperature tuning devices 255, 260 and 265 respectively. The non-linear crystals 240, 245 and 250 are located at positions of small beam size for the particular wavelength of laser light to which they may be tuned. The reflector 215 is highly reflective at the wavelengths of the laser material 225 and of the Raman-active crystal 235 (in this example 1064 nm, 1158 nm and 1272 nm) and at least partly transmissive at the frequency doubled wavelengths (532 nm, 579 nm and 636 nm).

The laser system 200 may comprise at least one polariser (not shown) which may be included in the resonator cavity 205. The polariser may be one or two plates of glass at Brewsters angle and/or a cube, one or more angle rods/crystals or other polariser known in the art. The polarisers are believed to cause the fundamental to lase on only one linear polarisation. The polariser may be positioned in a location in the resonator cavity 205 where there is no significant visible field.

In operation, the pump source 220 generates a pump beam which excites the laser material 225. The pump beam may be focused on and/or in the laser material 225 using the collimating and focusing lenses in order to mode match the pump beam and the cavity laser beam within the laser material 225. In the example that the laser material 225 is Nd:YAG, this generates a laser beam at 1064 nm, which is converted by the Q-switch 230 to a high power pulsed laser beam. Excitation of the Raman-active crystal 235 by this beam leads to generation of a Stokes-shifted beam at 1158 nm, and may also generate a second Stokes-shifted beam at 1272 nm. These beams, together with the unshifted beam at 1064 nm pass to the non-linear crystals 240, 245 and 250. In order to generate green laser light from the laser system 200, for example, the non-linear crystal 240, located at a position of small beam size for laser light at 1064 nm, would be temperature tuned using the temperature tuning device 255, whereas the non-linear crystals 245 and 250 would be detuned using the temperature tuning devices 260 and 265 respectively. The non-linear crystal 240 would then convert the laser output from the Raman-active crystal 235 at 1064 nm to laser light of wavelength 532 nm (green). The reflector 215 reflects the unshifted beam at 1064 nm, and the Stokes wavelengths of 1158 nm and 1272 nm, and permits at least part of the selected frequency doubled laser beam at 532 nm, to exit the resonator cavity 205. Those wavelengths that are reflected by the reflector 215 continue to resonate within the resonator cavity 205 until they are converted to the desired wavelength for output, or else leak away elsewhere. In order to change the output laser beam to, for example, yellow, the non-linear crystal 240 would be detuned using the temperature tuning device 255 and the non-linear crystal 245 would be tuned using the temperature tuning device 260, located at a position of small beam size for laser light at 1158 nm. Thus only laser light at 1158 nm would be frequency doubled to generate laser output light at 579 nm (yellow), capable of exiting the resonator cavity 205 through the reflector 215. As described above, other wavelengths would continue to resonate within the resonator cavity 205. In a similar manner, red laser light may be selected for output from system 200 by tuning crystal 250, located at a position of small beam size for laser light at 1272 nm, using device 265, and detuning crystals 240 and 245 using devices 255 and 260 respectively.

Figure 3:
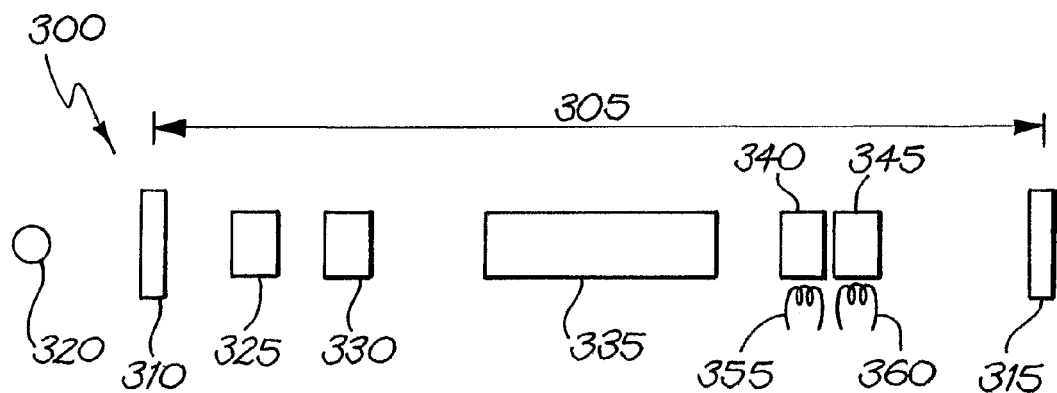
FIG. 3 is a diagrammatic representation of a laser system according to the invention wherein wavelength selection uses two individual non-linear media.

With reference to FIG. 3, a laser system 300 comprises a resonator cavity 305 defined by reflectors 310 and 315. The reflector 310 is highly reflective at all wavelengths generated within the resonator cavity 305, although the reflector 310 should be capable of allowing a pump beam from pump source 320 to pass to a laser material 325. The laser system 300 may have at least one collimating lens and at least one focusing lens (not shown), located between the pump source 320 and the laser material 325, for collimating and focusing the pump beam. The pump source 320 may be for example a diode laser, and is capable of exciting the laser material 325. The laser material 325 may be for example Nd:YAG, which is capable of generating laser light at 1064 nm. A Q-switch 330 is capable of converting the output from the laser material 325 into pulsed high power laser light capable of interacting with a Raman-active crystal 335 to generate one or more Stokes wavelengths of laser light. The Raman-active crystal 335 may for example be KGW, which can produce first Stokes wavelengths of 1158 nm and 1176 nm and second Stokes wavelengths of 1272 nm and 1317 nm when excited by a 1064 nm laser. Both of the non-linear media 340 and 345 are provided to convert the frequency of a selected wavelength, or pair of wavelengths of laser light, and may be for example lithium borate (LBO). The non-linear crystals 340 and 345 may be tuned to double a particular wavelength of laser light or to sum the frequencies of a pair of wavelengths using temperature tuning devices 355 and 360. The non-linear crystals 340 and 345 are located at positions of small beam size for the particular wavelength of laser light to which they may be tuned. The reflector 315 is highly reflective at the wavelengths of the laser material 325 and of the Raman-active crystal 335 (in this example 1064 nm, 1158 nm, 1176 nm, 1272 nm and 1317 nm) and at least partly transmissive at the frequency doubled wavelengths and the frequency summed wavelengths.

The laser system 300 may comprise at least one polariser (not shown) which may be included in the resonator cavity 305. The polariser may be one or two plates of glass at Brewsters angle and/or a cube, one or more angle rods/crystals or other polariser known in the art. The polarisers are believed to cause the fundamental to lase on only one linear polarisation. The polariser may be positioned in a location in the resonator cavity 305 where there is no significant visible field.

In operation, the pump source 320 generates a pump beam which excites the laser material 325. The pump beam may be focused on and/or in the laser material 325 using the collimating and focusing lenses in order to mode match the pump beam and the cavity laser beam within the laser material 325. In the example that the laser material 325 is Nd:YAG, this generates a laser beam at 1064 nm, which is converted by the Q-switch 330 to a high power pulsed laser beam. Excitation of the Raman-active crystal 335 by this beam leads to generation of Stokes-shifted beams at 1158 nm and 1176 nm, and may also generate second Stokes-shifted beams at 1272 nm and 1317 nm. These beams, together with the unshifted beam at 1064 nm pass to non-linear media 340 and 345. In order to generate 532 nm laser light from the system, for example, a crystal 340, located at a position of small beam size for laser light at 1064 nm, would be temperature tuned using device 355, whereas a crystal 345 would be detuned using device 360. The crystal 340 would then convert the laser output from the Raman-active crystal 335 at 1064 nm to laser light of wavelength 532 nm (green). The reflector 315 reflects the unshifted beam at 1064 nm, and the unconverted Stokes wavelengths, and permits at least part of the selected frequency doubled laser beam at 532 nm, to exit the resonator cavity 305. Those wavelengths that are reflected by the reflector 315 continue to resonate within the resonator cavity 305 until they are converted to the desired wavelength for output, or else leak away elsewhere. In order to change the output laser beam to, for example, 555 nm, the crystal 340 would be detuned using the device 355 and crystal 345 would be tuned using device 360 such that the crystal 345 is capable of frequency summing the fundamental at 1064 nm and the first Stokes wavelength of 1158 nm. This process causes conversion to a single frequency summed wavelength of 555 nm, which is capable of exiting the resonator cavity 305 through the reflector 315. As described above, other wavelengths would continue to resonate within the resonator cavity 305. Other wavelengths of output laser light may be generated by tuning the crystal 345 to frequency double a first Stokes wavelength at 1158 nm to generate 579 nm visible output, or to frequency double a second Stokes wavelength at 1272 nm to generate 636 nm visible output. Alternatively the tuning crystal 345 may be tuned to generate a visible output at 559 nm by summing the first Stokes wavelength of 1176 nm with the fundamental frequency of 1064 nm, or to produce a wavelength of 558 nm by frequency doubling the first Stokes wavelength of 1176 nm, or to produce a wavelength of 660 nm by frequency doubling the second Stokes wavelength of 1317 nm.

Figure 4:
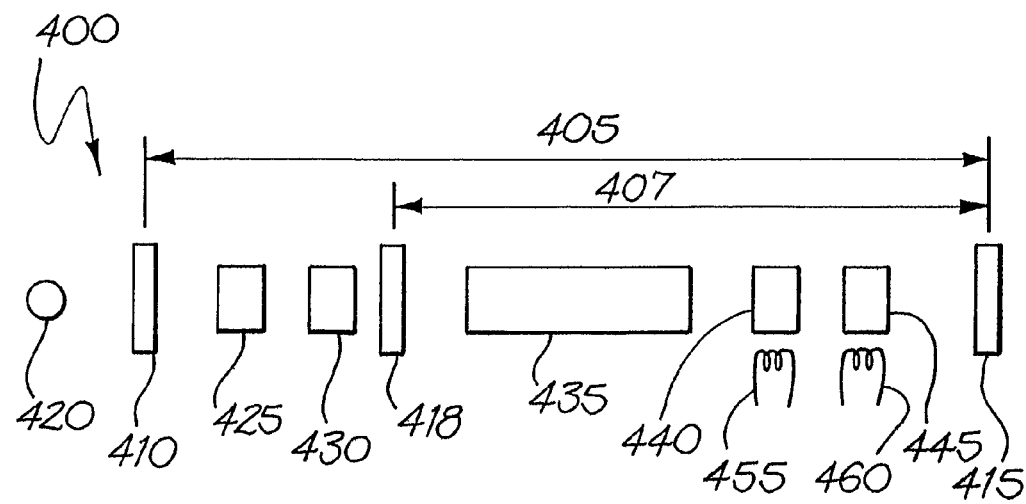
FIG. 4 is a diagrammatic representation of a laser system according to the invention wherein the laser cavity comprises a secondary cavity.

With reference to FIG. 4, a laser system 400 comprises a resonator cavity 405 defined by reflectors 410 and 415. The resonator cavity 405 comprises a secondary cavity 407 defined by reflectors 415 and 418. The reflector 410 is highly reflective at all wavelengths resonating within the resonator cavity 405, although the reflector 410 should be capable of allowing a pump beam from the pump source 420 to pass to the laser material 425. The laser system 400 may have at least one collimating lens and at least one focusing lens (not shown), located between the pump source 420 and the laser material 425, for collimating and focusing the pump beam. The laser material 425 and Q-switch 430 are located in the resonator cavity 405 but outside the secondary cavity 407. The pump source 420 may be for example a diode laser, and is capable of exciting the laser material 425. The laser material 425 may be for example Nd:YAG, which is capable of generating laser light at 1064 nm, in which case the reflector 410 would be highly reflective at 1064 nm. The Q-switch 430 is capable of converting the output from the laser material 425 into pulsed high power laser light capable of interacting with a Raman-active crystal 435 to generate one or more Stokes wavelengths of laser light. The secondary cavity 407 has the Raman-active crystal 435 and two frequency doubling crystals 440 and 445 therein, as well as the temperature tuning devices 455 and 460 associated with the frequency doubling crystals 440 and 445. The crystal 435 may for example be KGW, which can produce a first Stokes wavelength of 1158 nm when excited by a 1064 nm laser. Each of frequency doubling crystals 440 and 445 is provided to double the frequency of a selected wavelength of laser light, and may be for example lithium borate (LBO). Each of crystals 440 and 445 may be tuned to double a particular wavelength of laser light using the temperature tuning devices 455 and 460 respectively. The crystals 440 and 445 are located at positions of small beam size for the particular wavelength of laser light to which they may be tuned. The reflector 415 is highly reflective at the wavelengths of the laser material 425 and of the Raman-active crystal 435 (in this example 1064 nm and 1158 nm) and at least partly transmissive at the frequency doubled wavelengths (532 nm and 579 nm). The reflector 418 is highly transmissive at the wavelength of the laser material 425 and at least partially reflective at the frequency doubled wavelengths and at the wavelengths of the Raman-active crystal. The laser system 400 may be considered to comprise a coupled resonator cavity defined by reflectors 410, 418 and 415, having the resonator cavity 405 coupled with the secondary resonator cavity 407.

The laser system 400 may comprise at least one polariser (not shown) which may be included in the resonator cavity 405 and the secondary resonator cavity 407. The polariser may be one or two plates of glass at Brewsters angle and/or a cube, one or more angle rods/crystals or other polariser known in the art. The polarisers are believed to cause the fundamental to lase on only one linear polarisation. The polariser may be positioned in a location in the resonator cavity 405 or the secondary resonator cavity 407 where there is no significant visible field.

In operation, the pump source 420 generates a pump beam which excites the laser material 425. The pump beam may be focused on and/or in the laser material 425 using the collimating and focusing lenses in order to mode match the pump beam and the cavity laser beam within the laser material 425. In the example that the laser material 425 is Nd:YAG, this generates a laser beam at 1064 nm, which is converted by the Q-switch 430 to a high power pulsed laser beam. This beam enters the secondary cavity 407, passing through the reflector 418 to the Raman-active crystal 435, and resonates within the resonator cavity 405. The excitation of Raman-active crystal 435 by this beam leads to generation of a Stokes-shifted beam at 1158 nm. This Stokes shifted beam, together with the unshifted beam at 1064 nm, may resonate within the secondary cavity 407, and co-propagate with the unshifted beam at 1064 nm in the overlapping region of cavities 405 and 407. Within the secondary cavity 407, copropagating beams at the unshifted wavelength and at the Stokes shifted wavelength pass through the frequency doubling crystals 440 and 445. In order to generate green laser light from the system, for example, the crystal 440, located at a position of small beam size for laser light at 1064 nm, would be temperature tuned using the device 455, whereas the crystal 445 would be detuned using device 460. The crystal 440 would then convert the laser output from the laser material 425 at 1064 nm to laser light of wavelength 532 nm (green), which would exit the laser system 400 through the reflector 415. The reflector 415 reflects the unshifted beam at 1064 nm, and the Stokes wavelength of 1158 nm, causing them to resonate within cavities 405 and 407 until they are converted to the desired wavelength for output, or else leak away elsewhere. In order to change the output laser beam to yellow, the crystal 440 would be detuned using the device 455 and the crystal 445 would be tuned using the device 460, located at a position of small beam size for laser light at 1158 nm. Thus only laser light at 1158 nm would be frequency doubled to generate laser output light at 579 nm (yellow), capable of exiting the secondary cavity 407 through the reflector 415. As described above, other wavelengths would continue to resonate within the resonator cavities 405 and 407.

Example 1

Figure 5:
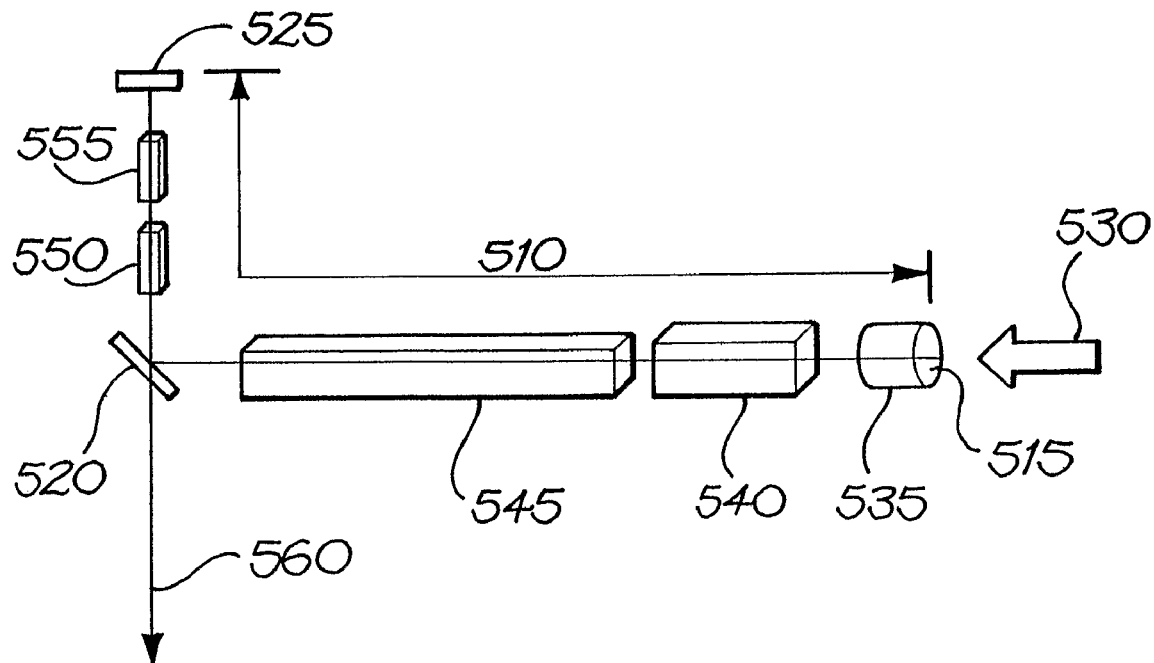
FIG. 5 is a diagrammatic representation of a laser system according to the invention, wherein the laser is capable of selectively outputting either green, lime or yellow laser light.

FIG. 5 shows an experimental setup for a selectable laser system 500 according to the present invention. In FIG. 5, a bent cavity 510 is defined by a reflective face 515 on a laser material 535 and reflectors 520 and 525. The reflective face 515 is transmissive at 808 nm, and reflective at all cavity wavelengths (ie 532 nm, 555 nm, 579 nm, 1064 nm and 1158 nm). The reflector 525 is a 20 cm radius of curvature dielectric mirror which is reflective at all cavity wavelengths, and the reflector 520 is a flat dichroic mirror which is transmissive between the visible wavelengths of 532 nm (green) and 579 nm (yellow), and reflective at other cavity wavelengths (between 1064 nm and 1158 nm). With the exception of the reflective face 515, all faces of components 535, 540, 545, 550 and 555 are antireflection coated between 1064 nm and at 1158 nm. Arrow 530 represents a pump beam with a wavelength of 808 nm, which can cast a 0.2 mm spot on the laser material 535 with a power of about 22 W. The laser material 535, located in the bent cavity 510, is a cylindrical Nd:YAG crystal 5 mm in length and having an outside diameter of 5 mm, and having a reflective face 515 thereon. The Raman active medium 540 is located 20 mm from the laser material 535, and is a $KGd(WO_4)_2$ crystal cut for propagation along the crystal b axis, and has dimensions 5 mm*5 mm*50 mm. The Raman active medium 540 is oriented such that only Raman gain is generated at the Stokes shift 767 cm-1. The Q-switch 545 is located 2 mm from the Raman active medium 540 and 5 mm from the reflector 520, and is a NEOS model 33027, 30 mm long, operating at a repetition rate of 16 kHz. Non-linear media 550 and 555 are both LBO crystals. The non-linear medium 550 is a 3 mm*3 mm*8 mm crystal, with $\theta=90°$ and $\phi=00$, and the non-linear medium 555 is a 3*3*10 mm crystal with $\theta=90°$ and $\phi=5°$. The distance between the reflector 520 and the non-linear medium 550 is 20 mm, the distance between non-linear media 550 and 555 is 10 mm and the distance between non-linear medium 555 and reflector 525 is 10 mm. Arrow 560 represents the visible output laser beam.

In operation of the laser system of FIG. 5, non-linear medium 550 was maintained at either 48° C. or 95° C., and non-linear medium 555 was held at either 25° C. or 52° C. Results are shown in the table below.

| Temperature of medium 550 | Temperature of medium 555 | Green (532 nm) Output Power | Green-Yellow (555 nm) Output Power | Yellow (579 nm) Output Power |
|---|---|---|---|---|
| 48° C. | 25° C. | 1.5 W | 0 W | 0 W |
| 48° C. | 52° C. | 0 W | 0 W | 0.57 W |
| 95° C. | 52° C. | 0 W | 0.52 W | 0 W |

In addition to the above, when the non-linear medium 550 was maintained at 19° C. and the non-linear medium 555 at 52° C., an output of 0.25 W was obtained at 606 nm.

The mode sizes for the interfaces in the optical chain, as determined from theoretical modeling of the laser system of FIG. 5 were:

| | |
|---|---|
| laser material 535: | 300 microns on both faces of the crystal |
| Raman-active medium 540: | 290 microns on the face nearest laser material 535; 280 microns on the face nearest Q-switch 545 |
| Q-switch 545: | 205 microns on the face nearest Raman-active medium 540; 180 microns on the face nearest reflector 520 |
| non-linear media 550 and 555: | 105 microns on both faces of each crystal |
| reflector 520: | 105 microns. |

The mode sizes were determined as the distance from the beam axis to the point at which the intensity of the beam falls to $1/e^2$ of the intensity at the beam axis.

Thus pump beam 530 causes the laser material 535 to generate a laser beam at 1064 nm, which resonates in the bent cavity 510 and is converted by the Q-switch 545 to a pulsed high powered beam capable of stimulating the Raman active medium 540 to generate a first Stokes beam at 1158 nm. This 1158 nm beam also resonates within the bent cavity 510. Thus when the non-linear medium 555 is at 25° C., it is capable of doubling the cavity laser beam at 1064 nm to generate green laser light at 532 nm, which then can exit the system through the reflector 520. At 52° C., the non-linear medium 555 is detuned and is incapable of frequency doubling, whereas at 48° C., the non-linear medium 550 is capable of doubling the Raman-shifted beam at 1158 nm to generate a yellow laser beam at 579 nm, which then exits the laser system 500 through the reflector 520. When the non-linear medium 550 is held at 95° C., it is capable of frequency summing the cavity laser beam at 1064 nm and the Raman-shifted beam at 1158 nm, to generate a green-yellow (or green lime) coloured laser beam at 555 nm, which then exits the system through the reflector 520. Thus by appropriate temperature control of non-linear media 550 and 555, output laser beams at 532, 555 and 579 nm can be selected.

The laser system 500 may comprise at least one polariser (not shown) which may be included in the bent cavity 510. The polariser may be one or two plates of glass at Brewsters angle and/or a cube, one or more angle rods/crystals or other polariser known in the art. The polarisers are believed to cause the fundamental to lase on only one linear polarisation. The polariser may be positioned in a location in the bent cavity 510 where there is no significant visible field.

Example 2

Figure 6:
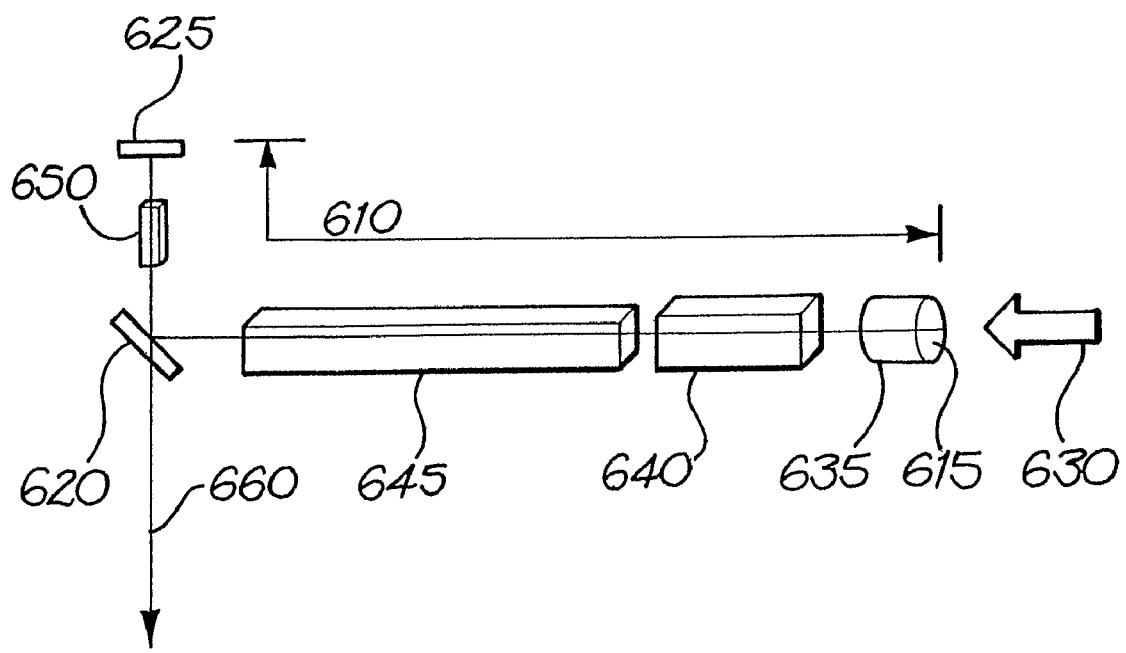
FIG. 6 a diagrammatic representation of a laser system according to the invention, wherein the laser is capable of selectively outputting either green, lime or yellow laser light, wherein wavelength selection is by angle tuning.

FIG. 6 shows an experimental setup for a selectable laser system 600 according to the present invention. In FIG. 6, a bent cavity 610 is defined by a reflective face 615 on a laser material 635 and reflectors 620 and 625. The reflective face 615 is transmissive at 808 nm, and reflective at all cavity wavelengths (ie 532 nm, 555 nm, 579 nm, 1064 nm and 1158 nm). The reflector 625 is a 20 cm radius of curvature dielectric mirror which is reflective at all cavity wavelengths, and the reflector 620 is a flat dichroic mirror which is transmissive at the visible wavelengths of 532 nm (green), 555 nm (lime) and 579 nm (yellow), and reflective at other cavity wavelengths (1064 nm and 1158 nm). With the exception of the reflective face 615, all faces of components 635, 640, 645 and 650 are antireflection coated at 1064 nm and at 1158 nm. Arrow 630 represents a pump beam with a wavelength of 808 nm, which can cast a 0.2 mm spot on the laser material 635 with power of about 22 W. The laser material 635, located in the cavity 610, is a cylindrical Nd:YAG crystal 5 mm in length and having an outside diameter of 5 mm, and having a reflective face 615 thereon. The Raman active medium 640 is located 20 mm from the laser material 635, and is a KGd(WO$_4$)$_2$ crystal cut for propagation along the crystal b axis, and has dimensions 5 mm*5 mm*50 mm. The Raman active medium 640 is oriented such that only Raman gain is generated with a Stokes shift of 767 cm$^{-1}$. The O-switch 645 is located 2 mm from the Raman active medium 640 and 5 mm from the reflector 620, and is a NEOS model 33027, 30 mm long, operating at a repetition rate of 16 kHz. The non-linear medium 650 is an LBO crystal of dimensions 3 mm*3 mm*8 mm, with θ=90° and φ=0°. The distance between the reflector 620 and the non-linear medium 650 is 20 mm and the distance between the non-linear medium 650 and reflector 625 is 10 mm. Arrow 660 represents the visible output laser beam.

The laser system 600 may comprise at least one polariser (not shown) which may be included in the bent cavity 610. The polariser may be one or two plates of glass at Brewsters angle and/or a cube, one or more angle rods/crystals or other polariser known in the art. The polarisers are believed to cause the fundamental to lase on only one linear polarisation. The polariser may be positioned in a location in the bent cavity 610 where there is no significant visible field.

In operation of the laser system 600 of FIG. 6, the angle of the non-linear medium 650 was varied in order to tune the system to different wavelengths of output laser light. Results are shown in the table below.

| Angle of non-linear medium 650 | Green (532 nm) Output Power | Lime (555 nm) Output Power | Yellow (579 nm) Output Power |
|---|---|---|---|
| 0° | 0 W | 0 W | 1.8 W |
| 11° | 0 W | 0.95 W | 0 W |
| 17° | 1.7 W | 0 W | 0 W |

The mode sizes for the interfaces in the optical chain, as determined from theoretical modeling of the laser system of FIG. 6 were:

| | |
|---|---|
| Laser material 635: | 300 microns on both faces of the crystal |
| Raman-active medium 640: | 290 microns on the face nearest laser material 635 280 microns on the face nearest Q-switch 645 |
| Q-switch 645: | 205 microns on the face nearest Raman-active medium 640; 180 microns on the face nearest reflector 620 |
| Non-linear medium 650: | 105 microns on both faces |
| Reflector 620: | 105 microns. |

The LBO crystal was maintained at 54° C. The angle stated in the above table refers to the rotational angle in the azimuthal plane.

The mode sizes were determined as the distance from the beam axis to the point at which the intensity of the beam falls to $1/e^2$ of the intensity at the beam axis.

Thus pump beam 630 causes the laser material 635 to generate a laser beam at 1064 nm, which resonates in the bent cavity 610 and is converted by the Q-switch 645 to a pulsed high powered beam capable of stimulating the Raman active medium 640 to generate a first Stokes beam at 1158 nm. This 1158 nm beam also resonates within the bent cavity 610. When the non-linear medium 650 is held at an angle of 0°, it frequency doubles 1158 nm wavelength to generate yellow laser light at 579 nm, which exits the cavity 610 through the reflector 620. When the non-linear medium 650 is held at 17°, the non-linear medium 650 frequency doubles the cavity laser beam at 1064 nm to generate green laser light at 532 nm, which exits the cavity 610 through the reflector 620. When the non-linear medium 650 is held at 11°, it sums the frequencies of the cavity laser beam and the Raman-shifted beam to generate green-yellow coloured laser light at 555 nm, which exits the cavity 610 through the reflector 620. Thus by changing the angle of the non-linear medium 650, different output wavelengths may be selected.

Example 3

Design of the Wavelength-Versatile Raman Laser

Figure 7:
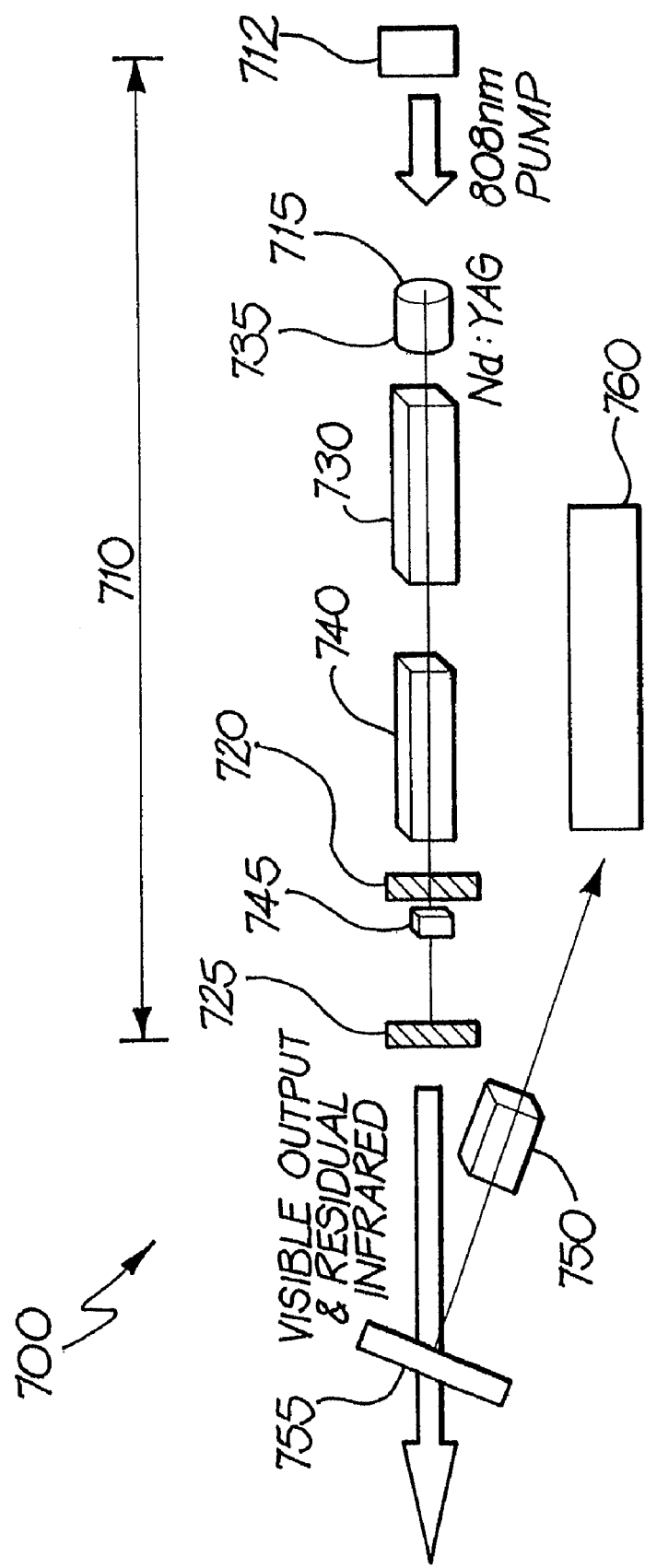
FIG. 7 is a diagrammatic representation of a wavelength-selective intracavity Raman laser according to example 3.

Referring to FIG. 7, there is shown a selectable laser system 700 comprising a resonator cavity 710 which is defined by a coated plane face 715 of a laser material 735, a reflector 720 and a reflector/output coupler 725. The laser system 700 provides an output wavelength which may be selected from two or more different wavelengths of output laser light as shown in Table A below. The resonator cavity 710 has a linear configuration and further comprises the laser material 735 located in the cavity 710 and a pump source 712 located outside the cavity 710. A Q-switch 730 and a Raman-active medium 740 are also located in the cavity 710 between the laser material 735 and the reflector 720. A tunable non-linear medium 745 is located between the reflector 720 and the reflector 725. The tunable non-linear medium 745 is in one example a frequency doubling crystal BBO which was chosen as the frequency doubling crystal as BBO can be angle-tuned over a large wavelength range.

The pump source 712 in this example is a fibre-coupled (400 μm, 0.22 NA), 808 nm diode laser delivering around 20 W to the laser material 735 (in this example, a Nd:YAG laser crystal of 5 mm diameter×5 mm long, 1% doping) with a pump spot size (beam radius) of approximately 250 microns. The pumped coated plane face 715 of the laser material 735 (in this example, a Nd:YAG crystal) has a high reflectivity at around 1064 nm to 1200 nm and the rear surface is AR coated. The fundamental output (1064 nm) was acousto-optically-switched at around 10-20 kHz. The resonator cavity 710 is approximately 15 cm long, and is defined by the coated plane face 715 of the Nd:YAG laser crystal 735 and an output coupler 725 with a radius of curvature 200 mm. The output coupler 725 was coated to provide high transmission in the visible and high reflectivity in the infrared (1064 nm-1200 nm). The resonator cavity 710 further includes a plane intracavity mirror 720, with one side coated for high transmission (>95%) at wavelengths greater than 1064 nm, and high reflectivity for wavelengths shorter than 750 nm. The other side of the intracavity mirror 720 was AR-coated.

KGd(WO$_4$)$_2$ (5×5×25 mm, cut along the optical N$_p$ axis) was chosen as the Raman-active medium 740 for this example, as KGd(WO$_4$)$_2$ (KGW) offers a high damage threshold, good thermal properties, and the Raman gain is polarization-dependent, so that a Raman shift of either 768 cm$^{-1}$ or 901 cm$^{-1}$ can be accessed. The laser system 700 was operated without a polariser because it was found that even two Brewster plates were insufficient to constrain laser oscillation to a single polarisation, probably because of the high-Q resonator. However, if a polariser was to be used then a polarizer 750, a mirror 755 and a spectrometer may be used in order to contrain laser oscillation. Frequency doubling was achieved using the angle tunable non-linear crystal 745 which in this example is BBO (4×4×4 mm), cut for type 1 non-critical phase-matching and placed next to the intracavity mirror 720. When the angle tunable non-linear crystal 745 (BBO) was oriented for phase-matching in the horizontal plane, which contained the optical N$_g$-axis of KGW, the 768 cm$^{-1}$ Raman shift determined the output wavelengths. When oriented for phase matching in the vertical plane, which contained the KGW N$_m$-axis, the 901 cm$^{-1}$ shift determined the output wavelength. The tunable non-linear medium 745 of the laser system 700 may also be LBO which is temperature tunable so as to select one of at least two desired output wavelengths from the laser system 700.

In operation, a cavity laser beam is generated within the resonator cavity 710 by pumping the laser material 735 located in the resonator cavity 710 with a 808 nm pump beam from the pump source 712 which is located outside the cavity 710. In this example, the laser material is a Nd:YAG laser crystal and the pump source is a fibre-coupled (400 μm, 0.22 NA), 808 nm diode laser delivering around 20 W to the laser material 735. The cavity laser beam is then passed through the Q-switch 730 to produce a pulsed cavity laser beam before shifting the wavelength of at least a portion of the pulsed cavity laser beam through the Raman-active medium 740 located in the resonator cavity 710. In this example, the Raman-active medium 740 is KGW.

A single wavelength or pair of wavelengths of laser light to be frequency converted is then selected, wherein said selection comprises angle tuning or temperature tuning the tunable non-linear medium 745 located within the cavity 710 to be capable of frequency converting the selected wavelength or the pair of wavelengths. The selected wavelength(s) are selected from the group consisting of the pulsed cavity laser beam and laser beams which have been produced through wavelength-shifting of the pulsed cavity laser beam by the Raman-active medium 740. The selected single wavelength or pair of wavelengths of laser light is then frequency converted using the tuned non-linear medium 740 to generate a desired single converted wavelength of laser beam which is then outputted from the laser system 700.

The laser system 700 may include an intracavity etalon. The intracavity etalon may prevent generation of parasitic laser wavelengths in the cavity 710. The oscillation of these parasitic wavelengths with the fundamental beam may be the cause of very high laser fields (spiking) that surpass the damage threshold of the laser optics. The inclusion of an intracavity etalon is particularly relevant to flashlamp pumped Q-switched cavities although an intracavity etalon may be used in all cavities.

Energy Dynamics and Laser Performance

In operation, the laser performance was investigated for both orientations of the BBO nonlinear crystal 745 in the laser system 700, and the main results are shown in the Table A below, for phase matching in the vertical plane, and in Table B below, for phase matching in the horizontal plane. The phase-matching angles were calculated using SNLO. Relatively low output powers at wavelengths greater than 600 nm are a result of large resonator mirror losses for wavelengths longer than 1200 nm. Optical to optical conversion efficiencies were up to 9%.

Output Wavelengths, Output Power Achieved for Phase-Matching in the Horizontal Plane

TABLE A

| Output wavelength | 532 nm | 555 nm | 579 nm | 606 nm | 636 nm |
|---|---|---|---|---|---|
| Output power | 1.3 W | 0.45 W | 1.0 W | 0.25 W | 0.04 W |
| BBO angle [4] | 22.8 | 22.2 | 21.7 | 21.1 | 20.7 |

Output Wavelengths, Output Power Achieved for Phase-Matching in the Vertical Plane

TABLE B

| Output wavelength | 532 nm | 559 nm | 588 nm | 621 nm | 658 nm |
|---|---|---|---|---|---|
| Output power | 1.85 W | 0.75 W | 1.2 W | 0.06 | — |
| BBO angle [4] | 22.8 | 22.1 | 21.5 | 20.9 | 20.4 |

Figure 8:
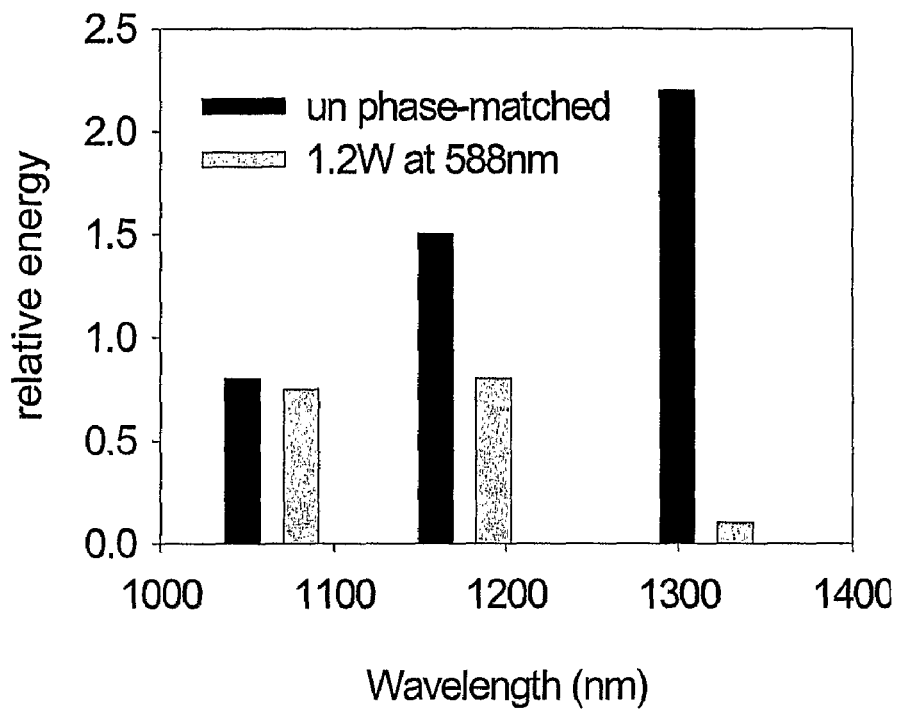
FIG. 8 shows a graph of optical field energies under different phase-matching conditions in Example 3.

Relative measurements of fundamental and Stokes optical field energies were made using a fibre-optic spectrometer (Ocean Optics). As an example, it can be seen in FIG. 8, that when the tunable non-linear crystal BBO 745 in the laser system 700 is not phase-matched for SHG or SFG, the energy is distributed (cascaded) between the fundamental, first and second Stokes optical fields. When the non-linear crystal BBO 745 in the laser system 700 is phase-matched, such that the laser produces 1.2 W at 588 m, the measurements show around 50% depletion of first Stokes optical field, with very low conversion to the second Stokes.

Monitoring the optical field energies for different configurations of the nonlinear crystal 745 (and therefore different visible output wavelengths) enabled the inventors to design the laser such that is SHG/SFG processes are effective in suppressing higher-order Stokes wavelengths. The balance between the SRS and SHG/SFG processes is affected by numerous factors including resonator mode-sizes in the various crystals, choice of non-linear crystal, Raman crystal length and the pulse repetition frequency.

Example 3

A Raman laser, comprising a fibre-coupled diode, Nd:YAG laser crystal and KGd(WO$_4$)$_2$ crystal, and in addition an AO Q-switch and non-linear crystal, was constructed to demonstrate wavelength selectability. Wavelength selectability has been demonstrated using angle-tuning of LBO, angle-tuning of BBO, and temperature tuning of LBO. For temperature tuning LBO, two crystals, LBO1 (=0, =0) and LBO2 (=0, =5), were used because the range of temperatures required for a single LBO crystal was too high. The key results are summarised below.

TABLE C

| | Phase-matching | | | | |
|---|---|---|---|---|---|
| | 532 nm | 555 nm | 579 nm | 606 nm | 636 nm |
| LBO angle-tune | 1.7 W | 0.95 W | 1.8 W | — | — |
| LBO temp-tune | 1.5 W | 0.52 W | 0.57 W | 0.2 W | — |
| BBO angle-tune | 1.3 W | 0.45 W | 1.0 W | 0.25 W | 0.04 W |

The highest output powers were obtained by angle tuning of LBO, however the relatively large tuning range limited the number of output wavelengths. Temperature tuning of LBO has an advantage that cavity mirror re-alignment is not required and wavelength selection is easily controlled electronically. However overall conversion efficiencies were reduced due to increased insertion losses of the second crystal. Using BBO resulted in the maximum number of output wavelengths, however output powers were limited because of the lower nonlinear coefficient.

Example 4

Raman Laser without Q-Switch or Long Pulse Raman Lasing

Figure 9:
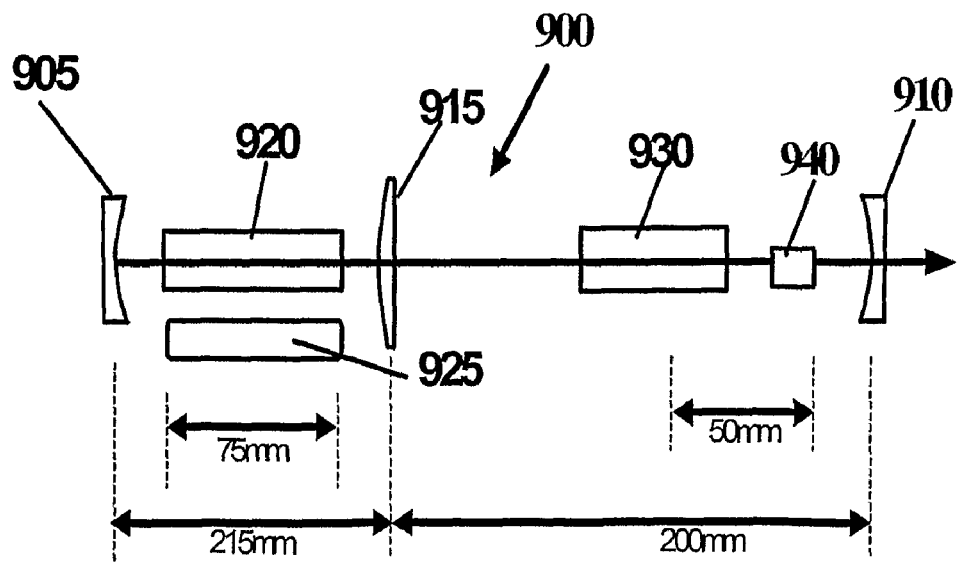
FIG. 9 is a diagrammatic representation of a laser system as described in Example 4.

With reference to FIG. 9, a cavity 900 is defined by concave mirrors 905 (high reflectivity at 1064 to 1317 nm, radius of curvature 2 m) and 910 (high reflectivity at 1064 nm, 6% transmissive at 1176 nm, radius of curvature 75 mm). The mirror 910, being partially transmissive, is also capable of functioning as an output coupler. A plano-convex lens 915 is located within the cavity 900, and is a 200 mm focal length lens. A laser material 920 in this example is a 4 mm diameter, 75 mm length cylindrical Nd:YAG rod, located between the mirror 905 and the lens 915. A flashlamp 925 is located outside the cavity 900, and is capable of side-pumping the laser material 920. The pulse duration is of the order of about 0.5 ms. A Raman-active medium 930 is in this example KGW and is located in the cavity 900 between the lens 915 and the mirror 910. A tunable non-linear medium 940 as described above in Example 3 is located between the Raman-active medium 930 and the concave mirror 910.

In operation, the flashlamp 925 provides incoherent pump radiation to side pump the laser material 920. This causes the laser material 920 to generate a fundamental laser beam at 1064 nm in the cavity 900 (when the laser material is Nd:YAG) which resonates between the mirrors 905 and 910 respectively. As the fundamental laser beam shifts through the Raman-active medium 930, the fundamental laser beam is Stokes shifted to produce a first Stokes laser beam at 1176 nm, which resonates within the cavity 900 and is frequency converted by the tunable non-linear medium 940. For example, the tunable non-linear medium 940 may be a temperature tunable non-linear medium as described in Example 1 or may be an angle tunable non-linear medium 940 as described in Example 3. Thus, in an example of when the temperature tunable non-linear medium 940 is at 25° C. (as described in Example 1), the tunable non-linear medium 940 is capable of doubling the fundamental laser beam at 1064 nm to generate green light at 532 nm, or at 48° C. the non-linear medium 940 is capable of doubling the shifted wavelength of 1176 nm to generate yellow light at 588 nm. The selected frequency converted wavelength is then transmitted out of the cavity 900 by means of the output coupler/mirror 910.

Thus, a single wavelength or pair of wavelengths of laser light to be frequency converted is then selected, wherein said selection step may comprise angle tuning or temperature tuning the non-linear medium 940 as described previously in the specification.

Figure 10:
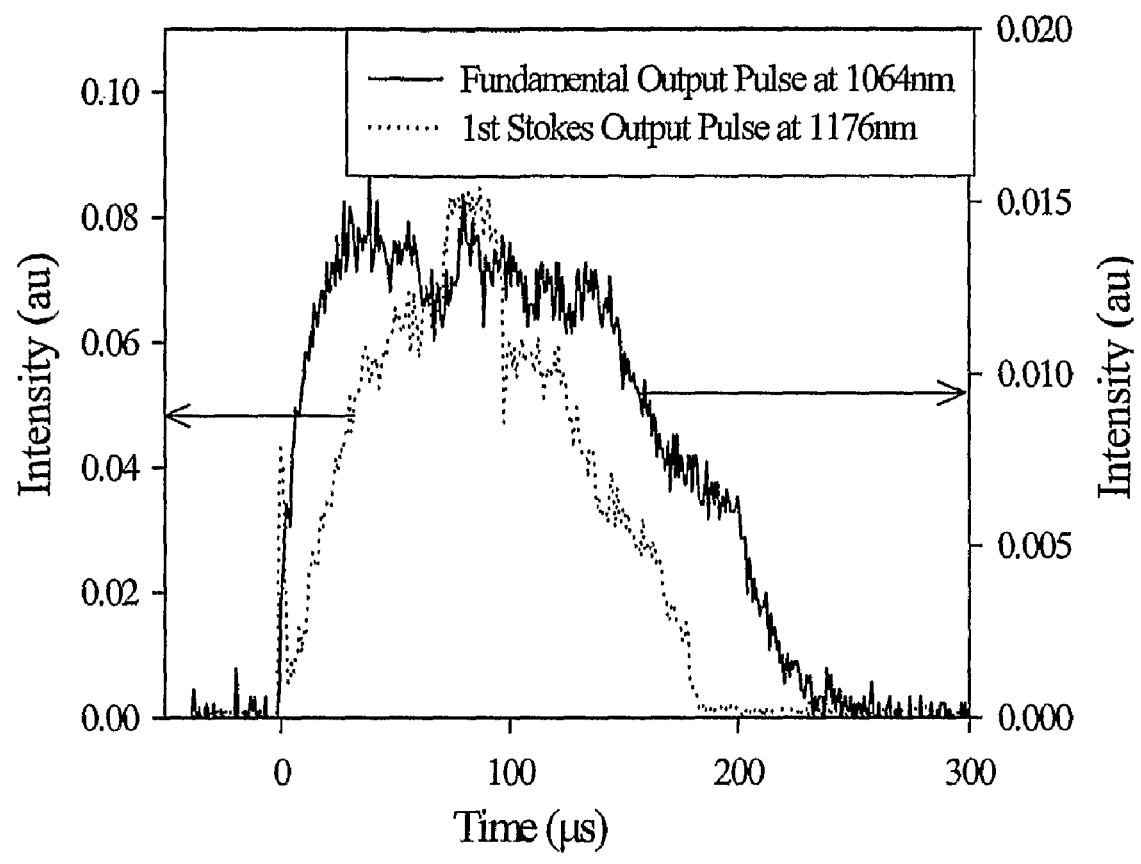
FIG. 10 is a graph showing laser pulse lengths obtained from the laser system in Example 4.

The laser of this example may be suitable for scaling to high pulse energies. Using the cavity 900 as shown in FIG. 9, the inventors have obtained Raman lasing at 1176 nm with up to 100 mJ of 1st Stokes output (with 500V on the flashlamp). The pulse length of the 1176 nm output was ~190 μs (base length) from a fundamental pulse of ~200 μs (base length), as shown in FIG. 10.

Figure 11:
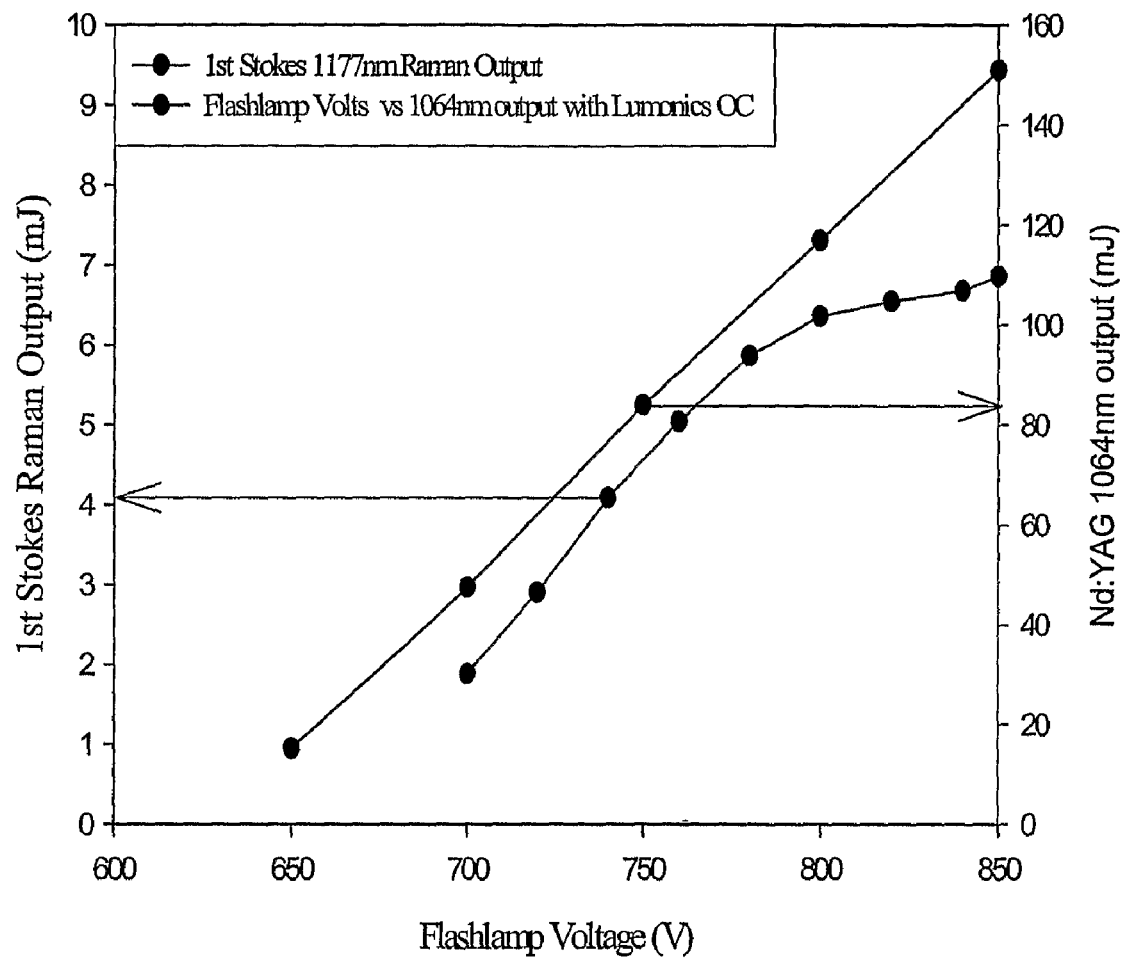
FIG. 11 is a graph showing a comparison of Nd:YAG and Raman laser lasing characteristics using identical flashlamp/Nd:YAG combination, as obtained in Example 4.

The same Nd:YAG laser rod with an optimised simple hemispherical cavity (high reflector with a radius of curvature of 5 m and a flat output coupler with 50% reflectivity at 1064 nm) was run to obtain information regarding the optimal lasing characteristics for this Nd:YAG-flashlamp combination, thereby enabling determination of the efficiency of the Raman conversion. The maximum 1064 nm output obtained from this laser was 370 mJ (with 500 V on the flashlamp). Thus the Raman conversion efficiency is shown in FIG. 11 to be about 30%. The results shown in FIG. 11 were based on using the laser system of FIG. 9.

Figure 11A:
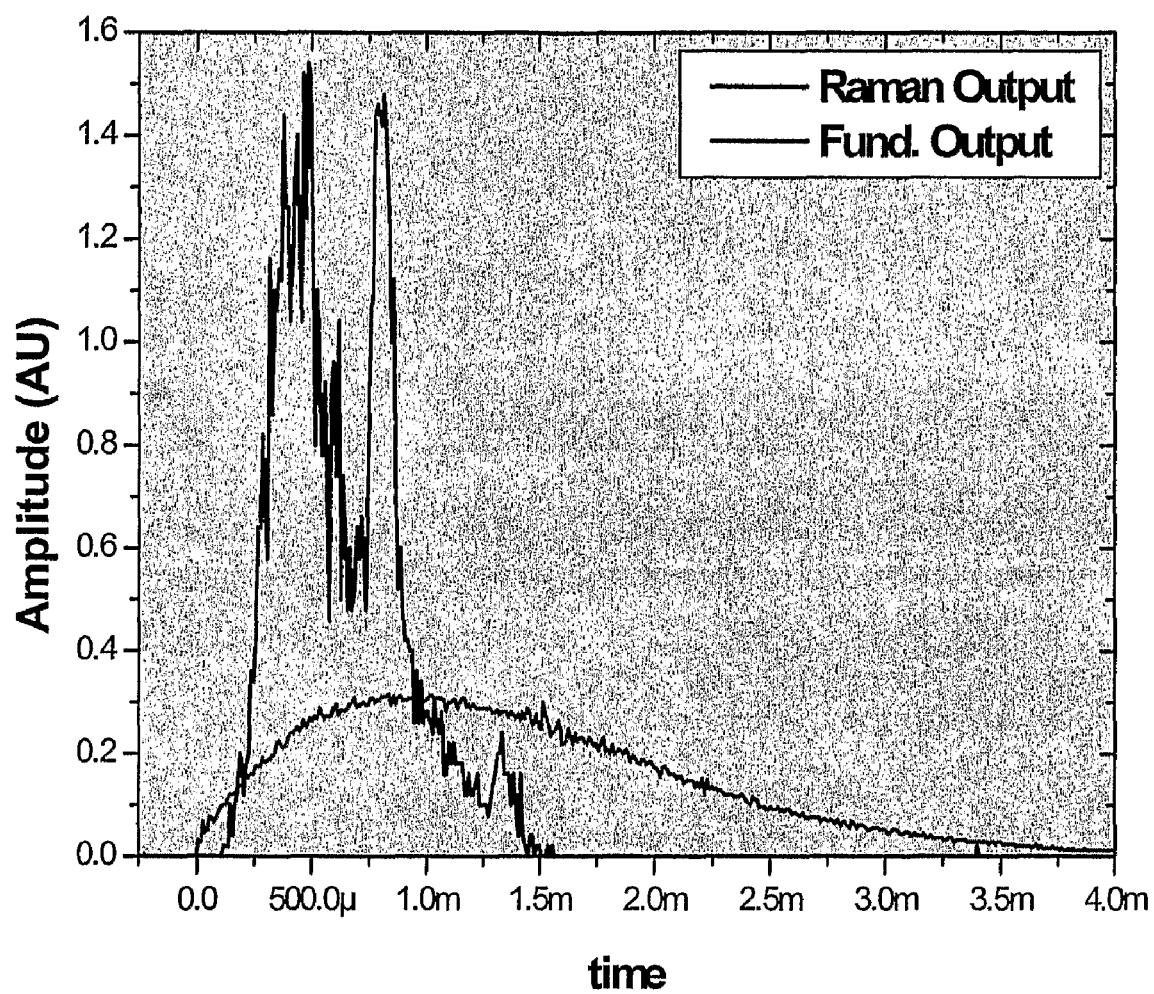
FIG. 11a is a graph showing temporal output taken at 1550 DV from a laser system similar to Example 4.
Figure 11B:
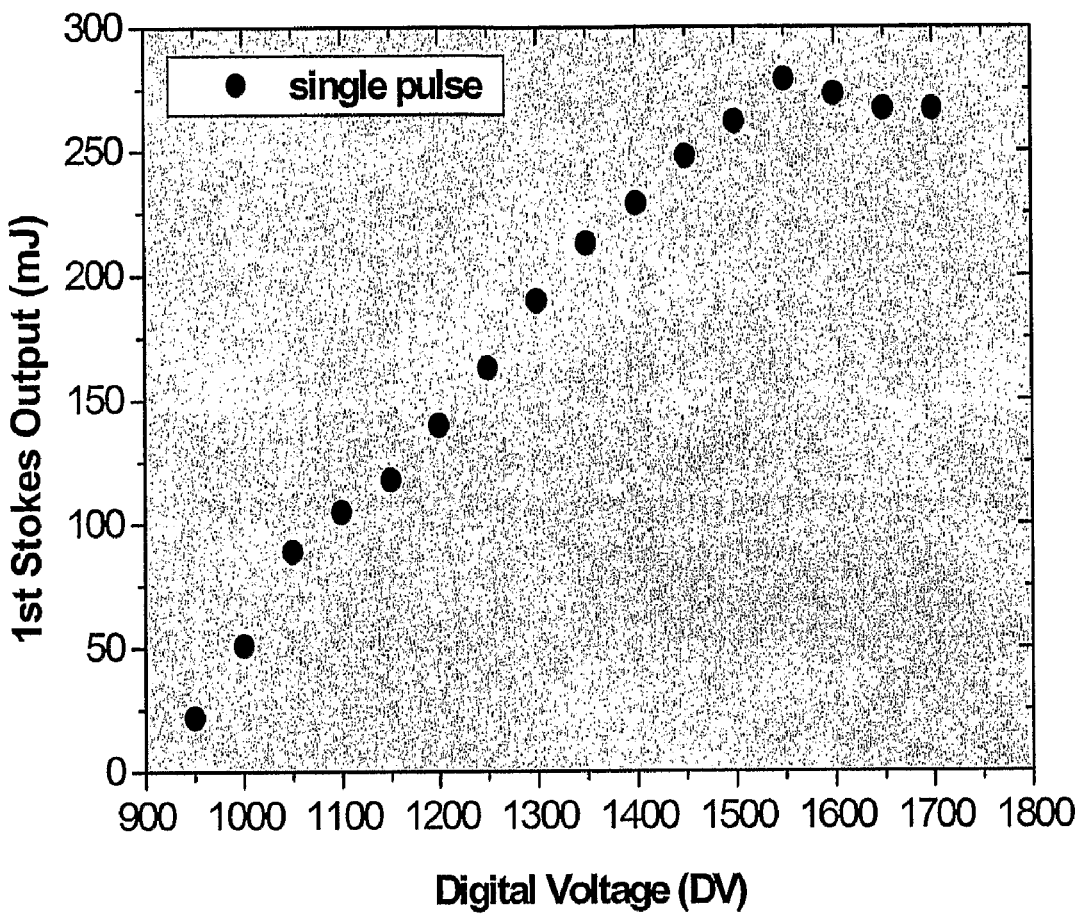
FIG. 11b is a graph of input (DV) versus 1$^{st}$ Stokes output characteristic from a laser system similar to Example 4.

FIG. 11a and FIG. 11b depict further data taken for a cavity arrangement which is the same as cavity 900 as shown in FIG. 9, except that some of the components are slightly different, or placed at different distances as detailed below. FIG. 11a is a temporal output taken at 1550 DV and FIG. 11b is an input versus output characteristic representation.

The overall slope efficiency was ~10%. This was calculated by comparison to the optimal 1064 nm arrangement, which utilised a flat HR mirror and a flat 30% T output coupler.

Output coupler is a 7.5 cm concave mirror.

Output coupler is placed 50 mm from the KGW crystal

KGW crystal is 50 mm in length

KGW crystal is placed 250 mm from the intracavity lens

Intracavity lens is a 250 mm lens

Nd:YAG laser rod has 6 mm diameter, 100 mm length

Other high reflector is a flat HR mirror.

It should be noted that the graphical representations as shown in FIG. 10, and FIG. 11 were achieved with the tunable non-linear medium 940 removed from the cavity 900. The inventors also believe that when the tunable non-linear medium 940 is a frequency doubling crystal the visible output can be expected to be about 50% of the infrared output.

The cavity 900 shown in FIG. 9 may comprise two or more tunable non linear media 940, such as tunable frequency doublers for example, disposed therein to frequency convert the Raman shifted beam.

Figure 12:
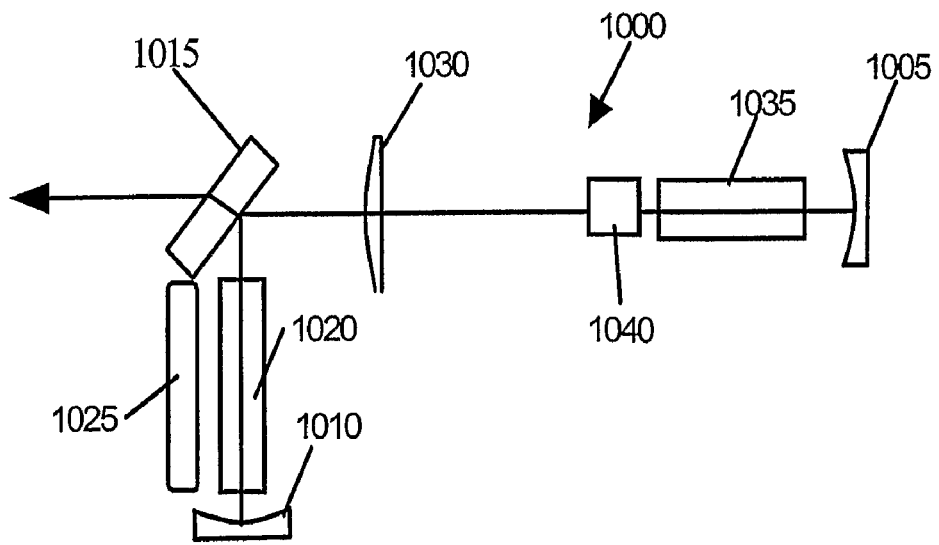
FIG. 12 is a diagrammatic representation of a laser system according to the present invention, where the laser material is pumped by a flashlamp, and no Q-switch is present.
Figure 13:
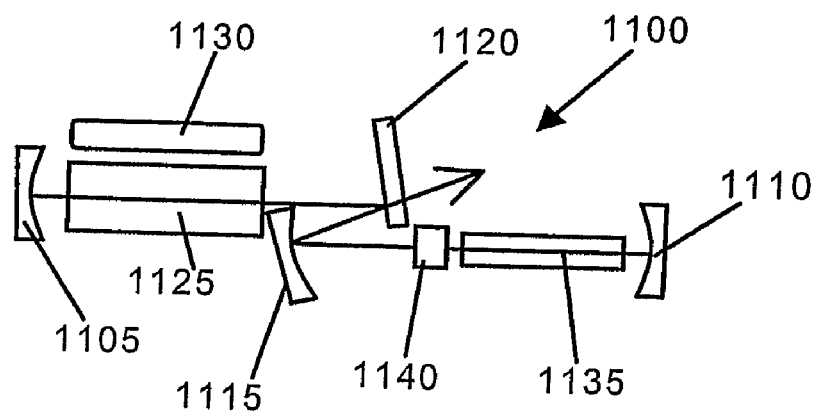
FIG. 13 is a diagrammatic representation of a laser system, having a Z-shaped cavity, according to the present invention, where the laser material is pumped by a flashlamp, and no Q-switch is present

The laser shown in FIG. 9 represents a design for scaling to high pulse energy output and achieving visible switchable output. The following resonator designs, shown in FIGS. 12 and 13, are intended to achieve switchable visible output. As for the laser of FIG. 9, the lasers of FIGS. 12 and 13 are not Q-switched and the flashlamp pulse has a duration the order of 0.5 ms (base duration) and a frequency of up to a few Hz e.g. in the range of 0.1-25 Hz or 0.1 to 20 hz, or 0.1 to 17.5 Hz, or 0.1 to 15 Hz, or 1 to 15 Hz, or 5 to 15 Hz, or 5 to 10 Hz, or 1 to 5 Hz, or 1 to 2 Hz. In a specific example, the frequency was 1, 2, 3, 4, 5, 6, 7, 8, 9, 10, 11, 12, 13, 14, and 15 Hz.

The laser shown in FIG. 9 may comprise at least one polariser (not shown) which may be included in the cavity 900. The polariser may be one or two plates of glass at Brewsters angle and/or a cube, one or more angle rods/crystals or other polariser known in the art. The polarisers are believed to cause the fundamental to lase on only one linear polarisation. The polariser may be positioned in a location in the cavity 900 where there is no significant visible field.

With reference to FIG. 12, there is shown a bent cavity 1000 defined by mirrors 1005 and 1010. The mirrors 1005 and 1010 are highly reflective at 1064-1272 nm and at 532-636 nm, respectively. A dichroic mirror 1015 is highly reflective at 1064-1272 nm and partially transmissive in the visible range (particularly at 532-636 nm). The dichroic mirror 1015 is therefore capable of functioning as an output coupler for visible wavelengths generated in the bent cavity 1000. A laser material 1020 is located between mirrors 1010 and 1015, and may be the same material as described above for Example 4 (i.e. a 4 mm diameter, 75 mm length cylindrical Nd:YAG rod). The Flashlamp 1025 is provided extracavity for side pumping the laser material 1020, as described in Example 4. The lens 1030 and the Raman-active medium 1035 are located in the cavity 1000 between the mirrors 1005 and 1015, and are as described as above for Example 4. A tunable non-linear medium 1040 is located in the cavity 1000 between the Raman-active medium 1035 and the lens 1030. The tunable non-linear medium 1040 may be capable of SHG or SFG. Although not shown in FIG. 12 for reasons of simplicity, the tunable non-linear medium 1040 may be provided with means for tuning according to any one of the possibilities described in the present specification. Thus, for example, the tunable non-linear medium 1040 may be provided with an angle tuner, or a temperature tuner, or may comprise a plurality of individual non-linear media and may be provided with a plurality of temperature and/or angle tuners. Alternatively the tunable non-linear medium 1040 may comprise a periodic structure which forms a grating within the medium, and the means for tuning may be a motor or similar means for translating the tunable non-linear medium 1040 relative to the laser beam resonating in cavity 1000. Thus pump radiation from the flashlamp 1025 causes the laser material 1020 to produce a fundamental laser beam in the cavity 1000. The first Stokes wavelength, and optionally higher Stokes wavelengths, in the IR range, is (are) shifted from the fundamental wavelength by the Raman-active medium 1035. The fundamental and Stokes wavelengths resonate in the cavity 1000. When the tunable non-linear medium 1040 is tuned to frequency convert the selected wavelength of laser light, a visible beam is produced by the non-linear medium 1040, which is coupled out of the cavity 1000 by mirror 1015, acting as an output coupler.

In operation, the flashlamp 1025 provides incoherent pump radiation to side pump the laser material 1020. This causes the laser material 1020 to generate a fundamental laser beam at 1064 nm in the bent cavity 1000 (when the laser material is Nd:YAG) which resonates between the mirrors 1005 and 1010, respectively, since the dichroic mirror 1015 is highly reflective at 1064 to 1272 nm. The Raman-active medium 1035 then shifts the fundamental laser beam at 1064 nm to either the first Stokes wavelength at 1158 nm or to the second Stokes wavelength at 1272 nm. The fundamental laser beam and shifted Stokes wavelengths resonate within the bent cavity 1000 and is frequency converted by the tunable non-linear medium 1040, for example by SHG or SFG. The frequency doubled or summed wavelengths are then transmitted through the dichroic mirror 1015 which is transmissive in the visible range (particularly at 532-636 nm) and acts as an output coupler.

The laser shown in FIG. 12 may comprise at least one polariser (not shown) which may be included in the bent cavity 1000. The polariser may be one or two plates of glass at Brewsters angle and/or a cube, one or more angle rods/crystals or other polariser known in the art. The polarisers are believed to cause the fundamental to lase on only one linear polarisation. The polariser may be positioned in a location in the bent cavity 1000 where there is no significant visible field.

Referring to FIG. 13, the laser system operates similarly to the laser shown in FIG. 12. Thus in FIG. 13, a Z-cavity 1100 is defined by mirrors 1105, 1110 and 1115, which are convex mirrors highly reflective at the fundamental wavelength, the Stokes shifted wavelength and at the output wavelengths of the Z cavity 1100 (in the case of a KGW Raman-active medium, this would be 1064-1272 nm and 532-636 nm). There is also shown a mirror 1120, which is highly reflective at the fundamental wavelength and the Stokes shifted wavelengths and highly transmissive at the desired output wavelengths (in the case of a KGW Raman-active medium, this would be reflective at 1064-1272 nm and transmissive at 532-636 nm). The mirror 1120 is therefore capable of functioning as an output coupler for the Z cavity 1100 at visible wavelengths of output laser light. A laser material 1125 is provided between the mirrors 1105 and 1120, and may be as described above for Example 4 which is a 4 mm diameter, 75 mm length cylindrical Nd:YAG rod. A flashlamp 1130 is provided extracavity for side pumping the laser material 1125, as described in Example 4. The Raman-active medium 1135 is located in the Z cavity 1100 between the mirrors 1110 and 1115, and is as described as for Example 4. A tunable non-linear medium 1140 is located in the cavity 1100 between the Raman-active medium 1135 and the mirror 1115. The tunable non-linear medium 1140 may be capable of SHG or SFG or other parametric frequency conversion. Although not shown in FIG. 13 for reasons of simplicity, the tunable non-linear medium 1140 may be provided with means for tuning according to any one of the possibilities described in the present specification. Thus for example the tunable non-linear medium 1140 may be provided with an angle tuner, or a temperature tuner, or may comprise a plurality of individual non-linear media and may be provided with a plurality of temperature and/or angle tuners. Alternatively, the tunable non-linear medium 1140 may comprise a periodic structure which forms a grating within the medium, and the means for tuning may be a motor or similar means for translating the tunable non-linear medium 1140 relative to the laser beam resonating in the cavity 1100.

In operation, the pump radiation from the flashlamp 1130 causes the laser material 1125 to produce a fundamental laser beam in the Z cavity 1100 at 1064 nm for a Nd:YAG laser material. The first Stokes wavelength at 1158 nm, and optionally higher Stokes wavelengths, in the IR range, is (are) shifted from the fundamental wavelength by the Raman-active medium 1135. The fundamental and Stokes wavelengths resonate in the Z cavity 1100. When the tunable non-linear medium 1140 is tuned to frequency convert the selected wavelength of laser light, (e.g SHG or SFG), the fundamental and Stokes wavelengths are selectively frequency converted by the tunable non-linear medium 1140 to output a visible beam, which is coupled out of the cavity 1100 by the mirror 1120, acting as an output coupler for the selected visible wavelength.

The laser shown in FIG. 13 may comprise at least one polariser (not shown) which may be included in the Z cavity 1100. The polariser may be one or two plates of glass at Brewsters angle and/or a cube, one or more angle rods/crystals or other polariser known in the art. The polarisers are believed to cause the fundamental to lase on only one linear polarisation. The polariser may be positioned in a location in the Z cavity 1100 where there is no significant visible field.

The advantages of the laser system of FIG. 13 relative to that of FIG. 12 include:

Astigmatism introduced by the angle on the curved turning mirror may be used to compensate for the astigmatic thermal lensing in Raman crystals like KGW/KYW (which have off-diagonal photo-elastic tensor and anistropic thermal conductivity).

Removes the need for an intracavity lens which has the disadvantage of having a lower damage threshold compared to reflective components, and introducing "ghost" reflections.

Key features of the long pulse pumping scheme:

A key feature of the laser systems of both FIG. 12 and FIG. 13 is that the Raman active medium may alleviate the spiking behaviour and limit any damage that spiking would normally cause. Spiking is the occurrence of very high intracavity peak powers caused by multiple Nd laser lines operating (and beating) simultaneously within the resonator. In an appropriate resonator design, the Raman crystal prevents damage by causing Raman conversion, and hence ultimately energy loss in the resonator, at peak powers less than the damage threshold of intracavity optics.

Relaxation oscillations in the fundamental field assist in lowering the threshold pump energy otherwise required for Raman conversion.

Relevant to continuous wave arc lamp pumping and continuous wave or quasi-continuous wave diode pumping as well as flashlamp pumping.

Figure 13A:
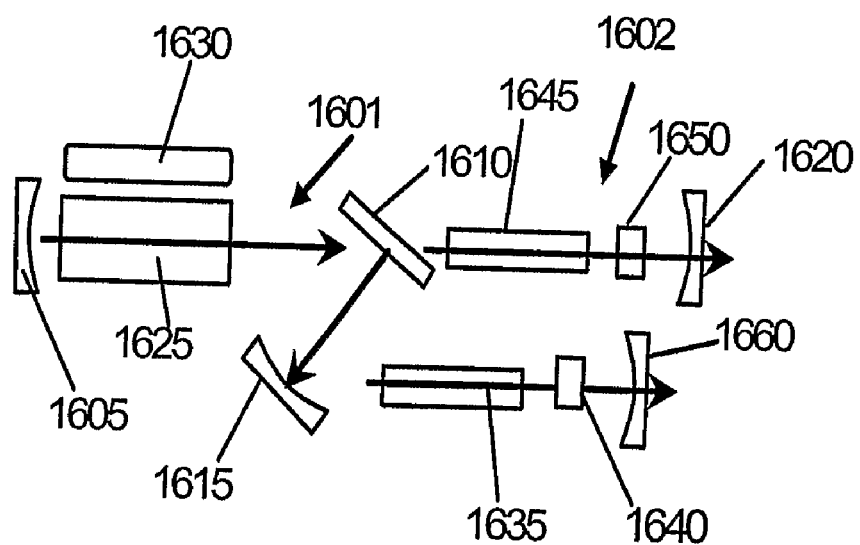
Figure 14:
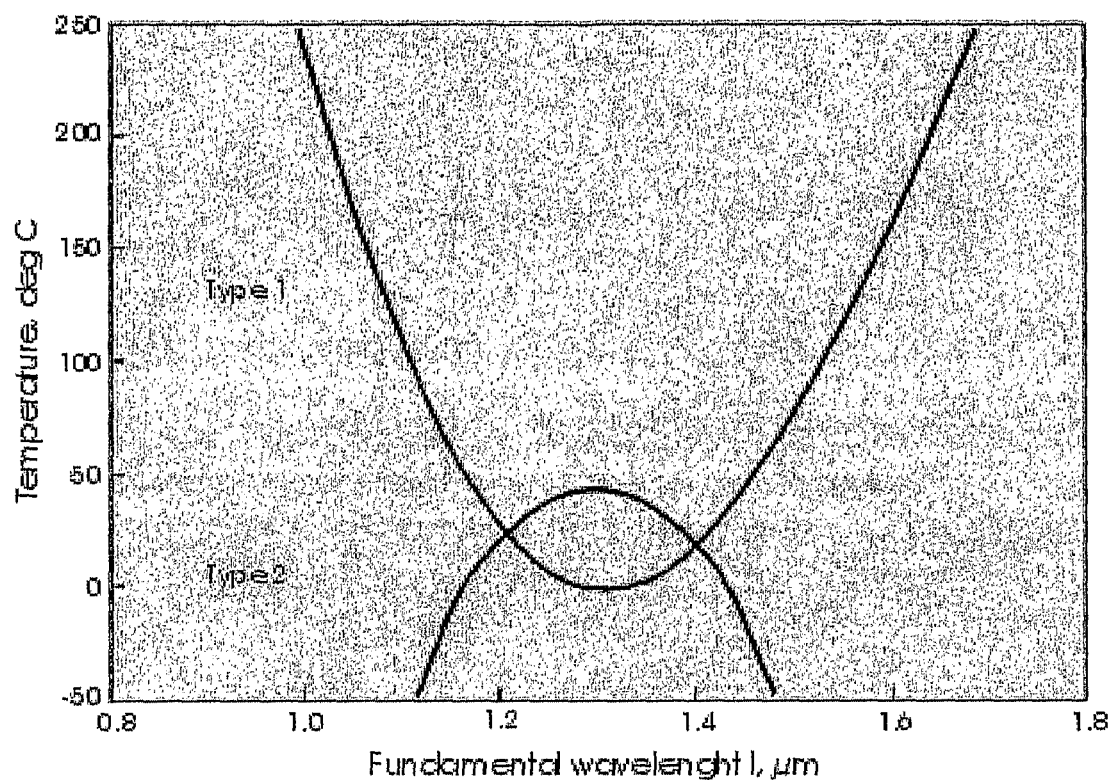
FIG. 14 is a graph illustrating non-critical phase matching in LBO.
Figure 15:
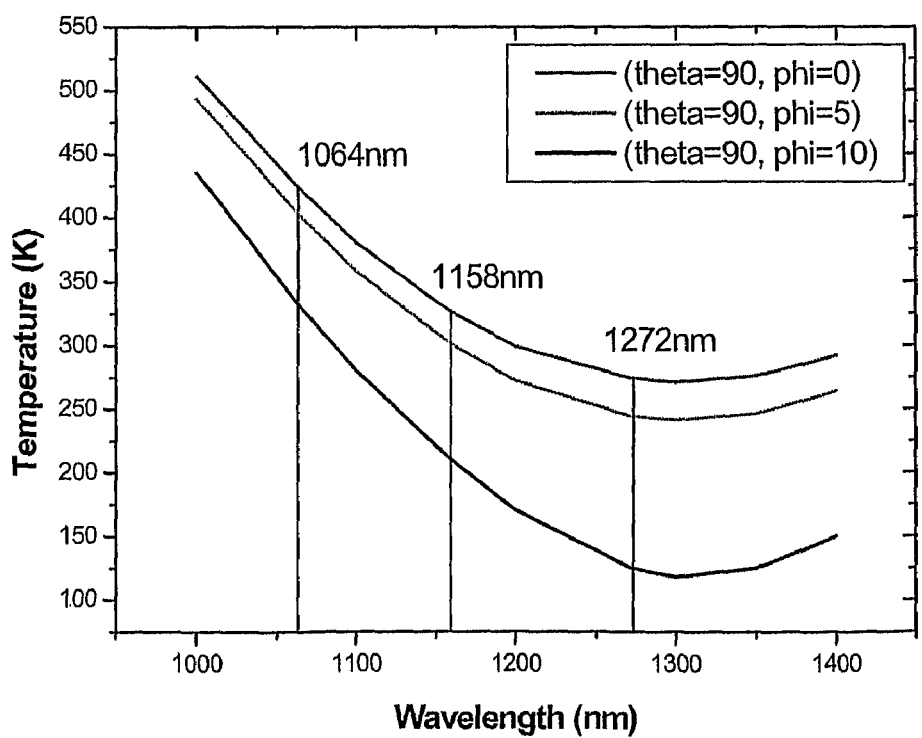
FIG. 15 is a graph illustrating phase matching temperature variation in LBO for varying phi crystal cuts of 0, 5 and 10°.
Figure 16:
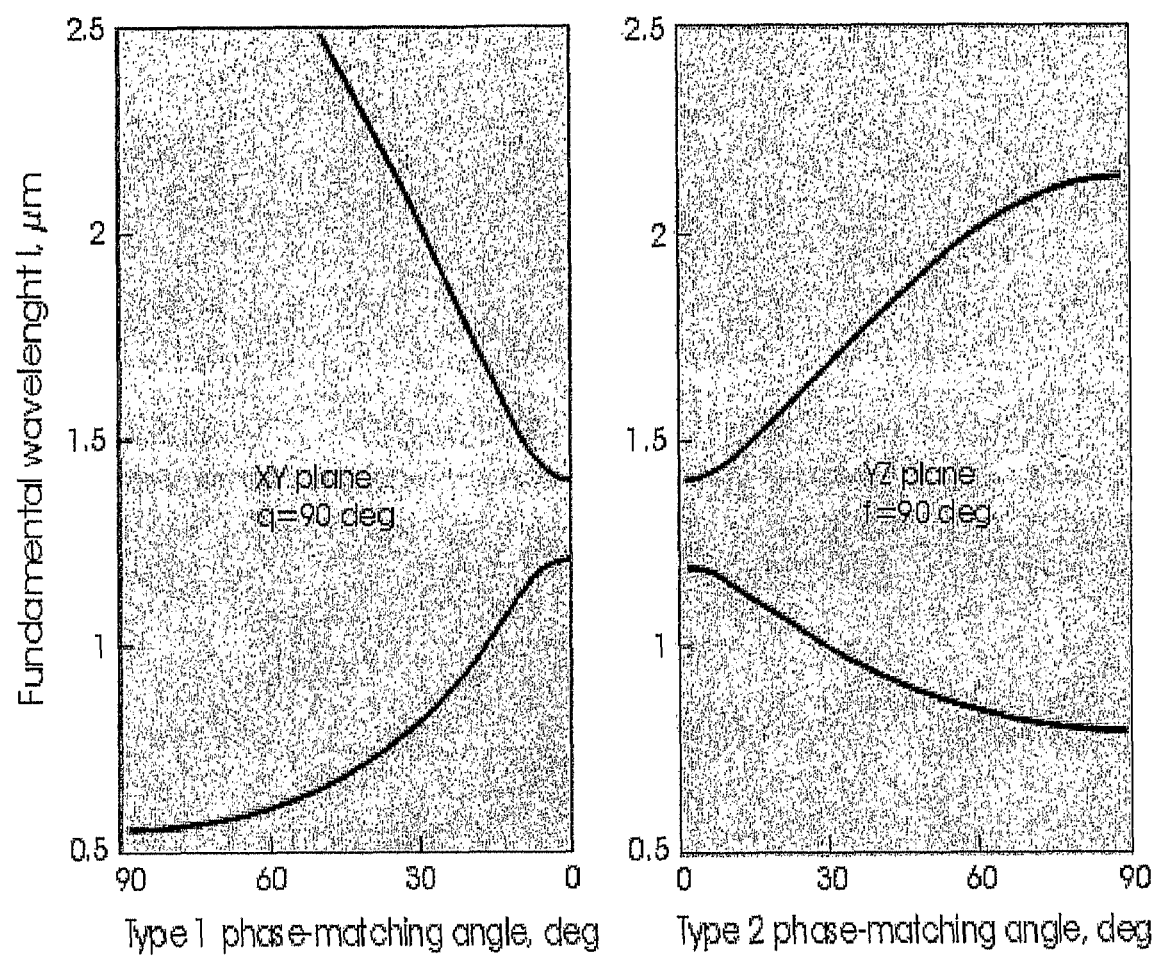
FIG. 16 is a graph illustrating critical phase matching in LBO.
Figure 17:
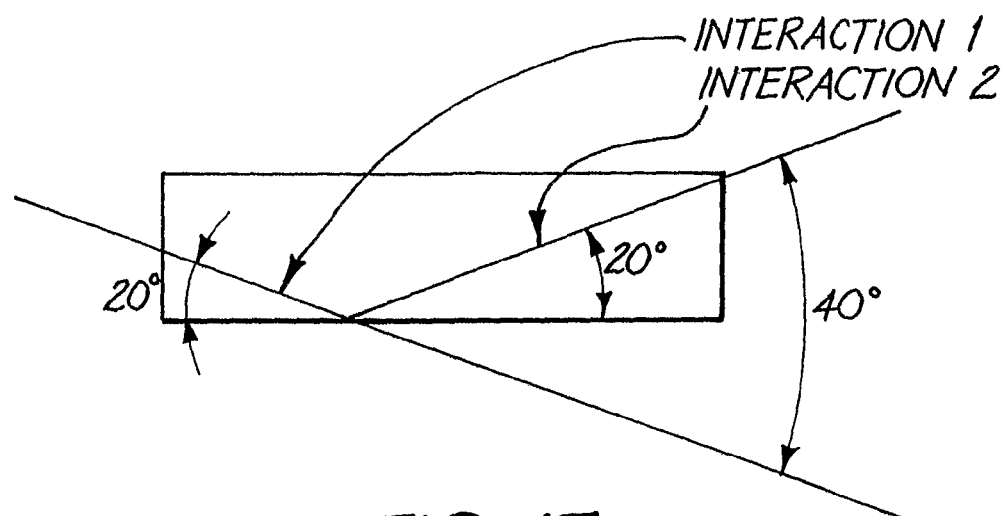
FIG. 17 is a diagrammatic representation of a bounce crystal as described herein having a large bounce angle of 20°.
Figure 18:
FIG. 18 is a diagrammatic representation of a bounce crystal in which period poling is performed on an angle such that the internal bounce causes the beam to experience two different poling periods.
Figure 19:
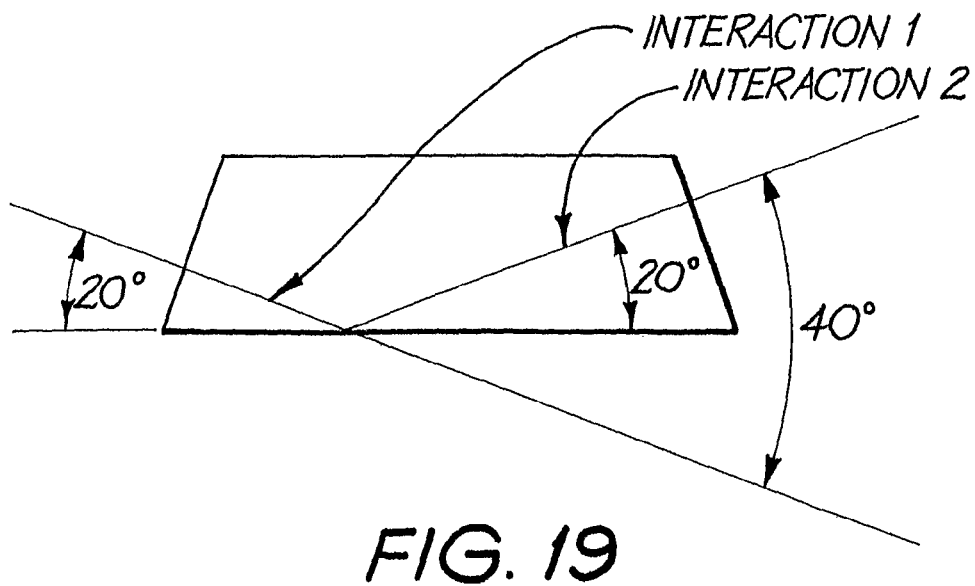
FIG. 19 is a diagrammatic representation of a bounce crystal with angled crystal faces allow for perpendicular beam entry.
Figure 20:
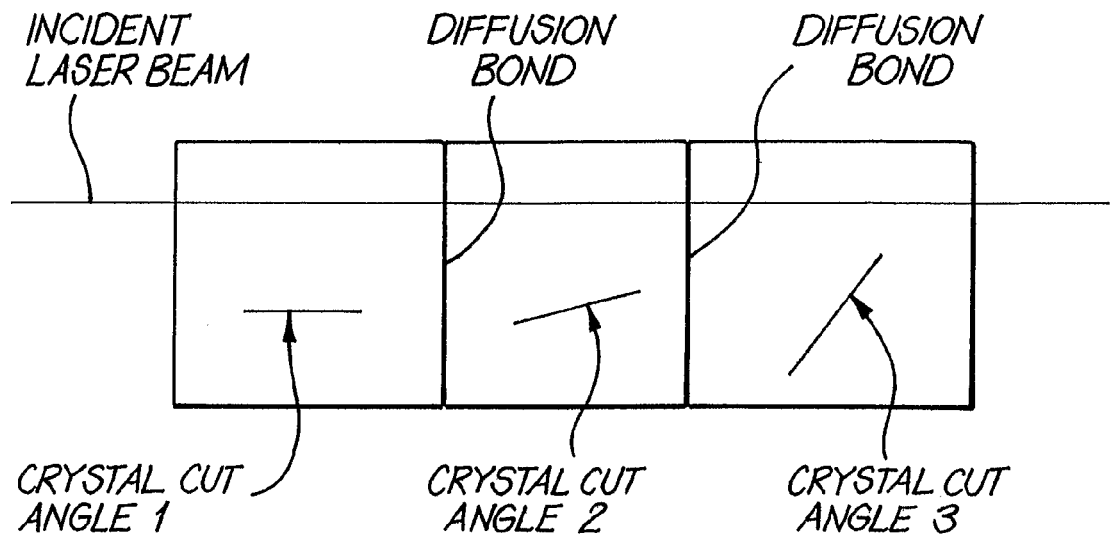
FIG. 20 is a diagrammatic representation of three crystals cut at different angles, bonded together, as may be used in the present invention.

In FIG. 13a, there is shown another embodiment of a laser system which is similar to that shown in FIG. 13 except that the laser system further comprises a second straight cavity 1602 which is defined by reflectors 1605 and 1620 where reflector 1620 is highly reflective at 1064-1072 nm and transmissive at 532 to 636 nm. The laser system further comprises a Z-cavity 1601 which is defined by reflectors 1605, 1610, 1615 and 1660 which are convex mirrors highly reflective at the fundamental wavelength, and the Stokes shifted wavelength. The reflector 1660 is also transmissive at the visible output wavelengths of the Z-cavity 1601 (532-636 nm). In an example of a KGW Raman active medium, the reflectors 1605, 1610 and 1615 would be highly reflective at 1064 to 1272 nm. The mirrors 1620 and 1660 are therefore capable of functioning as respective output couplers for the Z-cavity 1601 and the second cavity 1602 at visible wavelengths of output laser light. A laser material 1625 is provided between the mirrors 1605 and 1610, and may be as described above for Example 4 (i.e. a 4 mm diameter, 75 mm length cylindrical Nd:YAG rod). A flashlamp 1630 is provided extracavity for side pumping the laser material 1625, as described above in the description for Example 4.

A first Raman-active medium 1635 is located in the Z cavity 1601 and a second Raman-active medium 16445 is located in the second cavity 1602, respectively. The first Raman-active medium 1635 is located between the mirrors 1615 and 1660, and may be as described above for Example 4 (e.g. KGW). The second Raman-active medium 1645 is located between the mirrors 1610 and 1620 and may be the same or different from the first Raman-active medium 1635. Where the first Raman-active medium 1635 and the second Raman-active medium 1645 are the same (e.g. KGW), the first Raman-active medium 1635 may be oriented to shift at a first Raman shift and the second Raman-active medium 1645 may be oriented to shift at a second or other Raman shift.

A first tunable non-linear medium 1640 is located in the Z cavity 1601 and a second tunable non-linear medium 1650 is located in the second cavity 1602, respectively. The first tunable non-linear medium 1640 is located between the first Raman-active medium 1635 and the reflector 1660 whilst the second tunable non-linear medium 1650 is located between the second Raman-active medium 1645 and the reflector 1620. The first tunable non-linear medium 1635 and the second tunable non-linear medium 1645, may each be capable of SHG or SFG or other parametric frequency conversion.

Although not shown in FIG. 13a for reasons of simplicity, the first tunable non-linear medium 1640 and the second tunable non-linear 1650 may be provided with means for tuning according to any one of the possibilities described in the present specification. Thus for example the first tunable non-linear medium 1640 and the second tunable non-linear medium 1650 may be provided with an angle tuner, or a temperature tuner, or may comprise a plurality of individual non-linear media and may be provided with a plurality of temperature and/or angle tuners. Alternatively the first non-linear medium 1640 and the second non-linear medium 1650 may each comprise a periodic structure which forms a grating within the medium, and the means for tuning may be a motor, a piezoelectric device or similar means for tuning the first tunable non-linear medium 1640 or the second tunable non-linear medium 1650.

In operation, the pump radiation from the flashlamp 1630 causes the laser material 1625 to produce a fundamental laser beam in the Z cavity 1601 when the mirror 1610 is moved into a position to reflect the fundamental laser beam to the mirror 1615. The first Stokes wavelength, and optionally higher Stokes wavelengths, in the IR range, is (are) shifted from the fundamental wavelength by the first Raman-active material 1635 located in the Z-cavity 1601. The fundamental and Stokes wavelengths resonate in the Z cavity 1601, whilst the fundamental laser beam and Stokes wavelengths are selectively frequency converted by the first tunable non-linear medium 1640 so that a visible wavelength is outputted from the cavity 1601 through the output coupler/reflector 1660. When the mirror is moved out of the position where the pumped laser beam is reflected to the mirror 1615, the fundamental laser beam is shifted by the second Raman-active medium 1645 located in the second straight cavity 1602. The fundamental laser beam and one or more Stokes wavelengths resonate in the second straight cavity 1602. The fundamental laser beam and the one or more Stokes wavelengths are then selectively frequency converted by the second tunable non-linear medium 1650 so as to produce a selected wavelength of visible light which is coupled out of the second straight cavity 1602 by the mirror 1620, acting as an output coupler.

In operation, the laser system shown in FIG. 13*a* allows the selection of two visible output wavelengths due to the use of the first and second Raman-active mediums 1635 and 1645, respectively. In order to select a desired wavelength, the reflector 1610 functions as a movable reflector which is moved so as to allow the laser beam from the laser material 1625 to be directed into either the Z cavity 1601 or the second cavity 1602 which results in either an output wavelength of light through the reflector 1660 from the Z-cavity 1601 or through the reflector 1620 from the second straight cavity 1602. The Raman-active medium 1635 and 1645 may be selected from any of the examples described above in the specification and specifically, may be for example a first KGW Raman-active material for a first Raman shift and a second KGW Raman-active material for a second or other Raman shift.

The laser system shown in FIG. 13*a* may comprise at least one polariser (not shown) which may be included in the Z cavity 1601 and/or the second straight cavity 1602. The polariser may be one or two plates of glass at Brewsters angle and/or a cube, one or more angle rods/crystals or other polariser known in the art. The polarisers are believed to cause the fundamental to lase on only one linear polarisation. The polariser may be positioned in a location in the cavity 1601 and/or 1602 where there is no significant visible field.

In summary, FIG. 13*a* depicts a laser system wherein the output may be selected from two or more different wavelengths of output laser light. The system comprises a first resonator cavity comprising at least two reflectors, a laser material located in the first cavity, a pump source located outside of the first cavity for pumping the laser material with a pump beam to generate a cavity laser beam. The system may optionally include a Q-switch for converting continuous laser light into pulsed laser light, a Raman-active medium located in the resonator cavity for Raman-shifting the wavelength of the cavity laser beam, a non-linear medium disposed in the cavity for selectively frequency converting either one wavelength (in the case of SHG) of laser light or a pair of wavelengths (in the case of SFG or DFG) of laser light, where the wavelength(s) of laser light are selected from the group consisting of the cavity laser beam and laser beams which have been produced through wavelength-shifting of the cavity laser beam by the Raman-active medium, to generate a single converted wavelength of laser light, an output coupler to output the single converted wavelength of the laser beam which has been produced by frequency conversion by the tunable non-linear medium in the resonator cavity, a director means capable of directing at least part of the cavity laser beam to a second resonator cavity. The second resonator cavity comprises at least two reflectors, a means for disposing the director means in the first cavity between the laser medium and the first Raman active medium or means for switching the director means from a transmissive state to a reflective state where the transmissive state permits the cavity laser beam to pass through the director means and the reflective state causes the cavity laser beam to be directed to the second resonator cavity. The second cavity may optionally comprise a second Q-switch for converting continuous laser light into pulsed laser light. The second cavity also comprises a Raman-active medium located in the second resonator cavity for Raman-shifting the wavelength of the cavity laser beam in the second cavity, a tunable non-linear medium disposed in the second cavity for selectively frequency converting either one wavelength (in the case of SHG) of laser light or a pair of wavelengths (in the case of SFG or DFG) of laser light, the wavelength(s) of laser light being selected from the group consisting of the cavity laser beam and laser beams which have been produced through wavelength-shifting of the cavity laser beam by the Raman-active medium located in the second resonator cavity, to generate a single converted wavelength of laser light in the second cavity; and an output coupler to output the single converted wavelength of the laser light which has been produced by frequency conversion by the tunable non-linear medium in the second resonator cavity. The means for directing may be a reflector that is highly reflecting for the cavity laser beam. The means for directing may be a switchable reflector that may be switched between a transmissive state and a reflective state wherein the transmissive state permits the cavity laser beam to pass through the director means and the reflective state causes the cavity laser beam to be directed to the second resonator cavity. The means for disposing the director means in the first cavity between the laser medium and the first Raman active medium may be a rotating wheel with at least one reflector disposed thereon and at least one aperture disposed therein or a means for moving the director in and out of the first cavity.

In FIG. 13*a*, the mirror 1610 may in another example be replaced by a beam splitter 1610. In this example, the beam splitter 1610 allows a portion of the cavity laser beam to pass through the beam splitter 1610 to the second straight cavity 1602 where the cavity laser beam will be Raman shifted by the second Raman-active medium 1645, frequency altered by non-linear medium 1650 to a single converted wavelength which is outputted through output coupler 1620. The beam splitter 1610 also reflects a portion of the cavity laser beam to the mirror 1615 which, in turn, reflects the cavity laser beam to the first Raman-active medium 1635 where the cavity laser beam will be Raman shifted by the first Raman-active medium 1635, frequency altered by non-linear medium 1640 to a single converted wavelength which is outputted through output coupler 1660. The single converted wavelengths out of output couplers 1620 and 1660 may be outputted simultaneously.

Example 5

This example illustrates the use of bounce geometry, which is an extension of the dual crystal arrangement. It represents a functional replication of the dual crystal arrangement detailed in *Optics Letters* Vol. 30, No. 12 (Jun. 15, 2005) by Mildren et al, the contents of which are incorporated herewith by cross-reference, which uses two LBO crystals cut at the following crystal axes:

Crystal 1, theta=90°, phi=0°

Crystal 2, theta=90°, phi=11.3°

Figure 21:
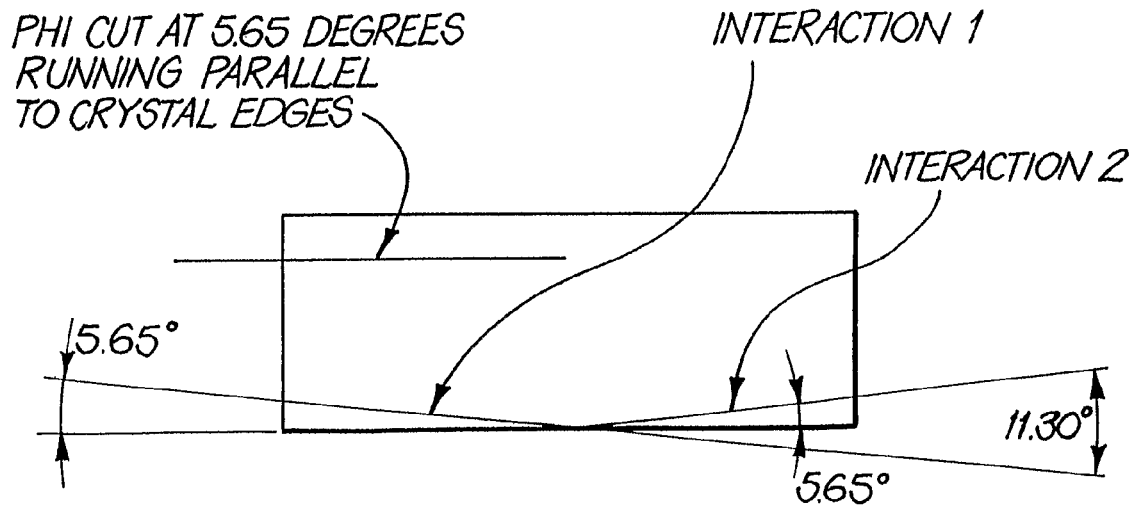
FIG. 21 is a diagrammatic representation of internal bounce geometry to achieve two non-linear phase matching conditions in a single crystal.

FIG. 21 shows the internal bounce geometry of the present example which was used to achieve two non-linear phase matching conditions in a single crystal.

Crystal 1 of Mildren et at phase matches the following non-linear processes at various temperatures (in degrees Kelvin):

1064+1064 (421K)
1064+1159 (370K)
1159+1159 (326K)
1159+1272 (293K)
1272+1272 (274K)

Note: the 1272+1272 nm phase match occurs below room temperature, which is not practical and hence was not investigated in the article.

Crystal 2 phase matches for 1064+1064 nm at 298K. The longer wavelengths phase-match at temperatures below zero in this crystal, which is impractical.

Rather than using two crystals, the present example used a crystal cut at an angle half way between the two. In this case, theta=90°, phi=5.65°. The optical beam propagation through the crystal was chosen so as to travel through the crystal at theta=90°, phi=0°, then bounce off a polished surface inside the crystal (total internal reflection), after which the optical beam traveled on a crystal angle theta=90°, phi=11.3°. In this situation the two interaction lengths (before and after the bounce) perform the same function as the dual crystal arrangement. In this example it would be difficult to obtain 1159+1272 nm, because the temperature for phase-matching (293K) is quite close to the phase matching temperature of 1064+1064 nm (298K). In the case of the bounce geometry, both of the non-linear interaction lengths must be at the same temperature, as they cannot be individually controlled.

Example 6

External Resonator Raman Laser System

Figure 22:
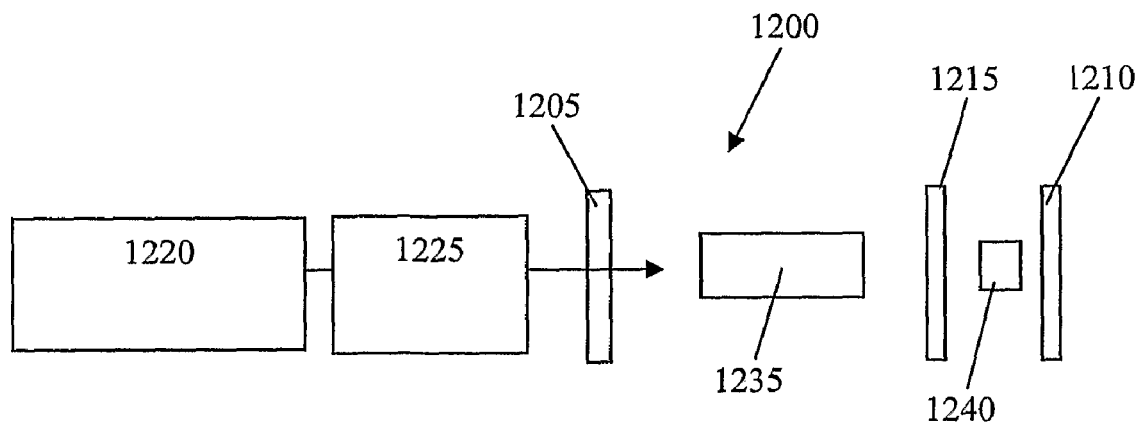
FIG. 22 is a diagrammatic representation of an embodiment of an external resonator Raman laser system according to the present invention.

In this example there is shown an external resonator Raman laser system, as shown in FIG. 22, which comprises a cavity 1200 having first reflector 1205 and a second reflector 1210 which are usually curved although either one of the first reflector 1205 and the second reflector 1210 may also be planar. A fundamental beam from a separate laser 1220 is transmitted through a suitable focusing medium 1225 (such as suitable focusing optics) and through the first reflector 1205 towards a Raman-active medium 1235. The fundamental beam 1220 is incident on a Raman-active medium 1235 and the laser in this example can be a Nd:YAG laser at 1064 nm or it could be another suitable laser known to those skilled in the art such as those previously described in the specification.

As an example, when the fundamental beam 1220 has a wavelength of 1064 nm, and a KGW oriented for the 901 cm$^{-1}$ shift is used, the first Stokes wavelength is 1176 nm, the second is 1316 nm and possible visible output wavelengths in the visible are 532 m, 559 m, 588 nm, 621 nm, and 658 nm after the shifted wavelength is frequency converted by a tunable non-linear medium 1240 located in the cavity 1200.

Usually, the fundamental beam 1220 is focussed so that the spot size of the fundamental beam 1220 is mode-matched to the Raman resonator mode. The presence of thermal lensing in the Raman-active medium 1235 typically impacts on the resonator mode of the laser system 1200 and should be considered in the design of the laser system 1200 for optimum efficiency. The second reflector 1210 can be a highly reflective reflector for the fundamental laser beam 1220 so that the pump can make a double pass through the Raman-active medium 1235.

The first reflector 1205 and the second reflector 1210 are coated for high reflectivity at the first Stokes, second Stokes and if desired higher Stokes order wavelengths. The second reflector 1210 is also an output coupler, typically with high transmission for the desired output laser beam. The fundamental beam 1220 is present in the resonator but is not resonated.

The nonlinear medium 1240 is located between the Raman-active medium 1235 and the second reflector 1210. The non-linear medium 1240 can be tuned as described previously herein to selectably double or produce the sum frequency of either the fundamental or any of the resonating Stokes beams. Although not shown in FIG. 22 for reasons of simplicity, the non-linear medium 1240 may be provided with means for tuning according to any one of the possibilities described in the present specification. Thus for example it may be provided with an angle tuner, or a temperature tuner, or may comprise a plurality of individual non-linear media and may be provided with a plurality of temperature and/or angle tuners. Alternatively it may comprise a periodic structure which forms a grating within the medium, and the means for tuning may be a motor or similar means for translating the non-linear medium 1240 relative to the laser beam resonating in the external resonator Raman laser system 1200.

A third reflector 1215 is optionally present in the external resonator Raman laser system 1200 and, when present, the third reflector 1215 is highly transmitting for the fundamental and Stokes waves, and highly reflective for the Visible output wavelengths. The incorporation of the third reflector 1215 allows for greater efficiency, simpler mirror coatings and better beam quality in the laser system 1200.

In operation, the separate laser 1220 produces a fundamental beam which is transmitted through a suitable focusing medium 1225 (such as suitable focusing optics) through the first reflector 1205 in to the cavity 1200. After the fundamental beam passes through the focusing medium 1225, the fundamental beam wavelength is shifted by the Raman-active medium 1235 to the first or other Stokes wavelength which in this example is 1176 nm for the first Stokes wavelength whilst the second Stokes wavelength is 1316 nm. The Stokes wavelength may then be frequency doubled by the tunable non-linear medium 1240 to produce visible wavelengths of 588 nm and 658 nm or frequency summed to produce other visible wavelengths. Thus, a number of visible wavelengths can be selected using the laser system of Example 6.

At least one polariser (not shown) may be included in the cavity of the laser system 1200 may be one or two plates of glass at Brewsters angle and/or a cube, angle rod(s)/crystal(s) or other polariser. Such polarisers cause the fundamental to lase on only one linear polarisation. It is preferable to place the polarizer in a location where there is no significant visible field.

It will be understood to those skilled in the art that a variety of different resonator layouts and configurations can be used for the external resonator Raman laser system including folded, bent and Z configurations which were described previously. An advantage of the external resonator Raman laser system is that the external resonator Raman laser system may be added onto an existing laser system.

Example 7

Selectable Output from a Fibre Raman Laser

Figure 23A:
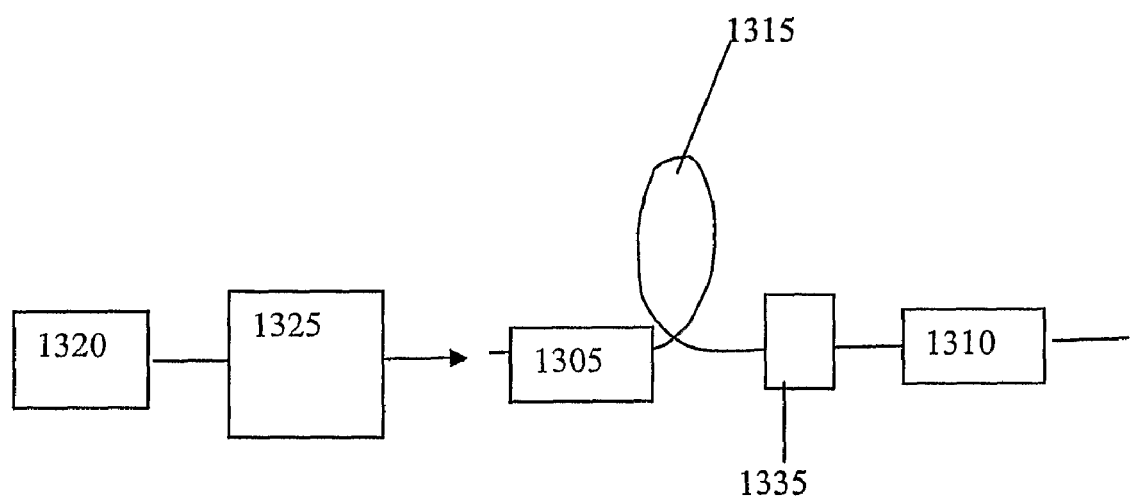
FIG. 23a is a diagrammatic representation of a further embodiment of an external resonator Raman laser system according to the present invention.

In this example, there is shown in FIG. 23a, an external Raman laser system which comprises a fiber Raman laser source 1320 and a focusing medium 1325. The fibre Raman laser source 1320 is a Raman laser in which the Raman medium is an optical fibre or another separate laser such as Nd:YAG. The fibre Raman laser source devices (such as depicted as 1320) can be very efficient in converting a fundamental laser beam eg at 1064 nm to Raman shifted wavelengths, by (cascaded) stimulated Raman scattering. These wavelengths are determined by the frequency shift of the fibre material. For example, when the fibre Raman laser source comprises silica and germanosilicate fibres, the shift is typically 440 $cm^{-1}$. It should be noted that larger shifts can be achieved eg. by using phosphate glass fibres.

A Raman resonator 1301 is defined by a first reflector 1305 and a second reflector 1310. The first and second reflectors 1305 and 1310, respectively may be dielectric mirrors which are glued, butted or directly coated onto the ends of a fibre Raman laser source 1315. The dielectric mirror 1305 and 1310 allows the fundamental laser beam to pass through to the fibre Raman laser source 1315 and is highly reflective of the desired number of Stokes wavelengths. Alternatively, one or more fibre Bragg gratings can be used as the first reflector 1305 and the second reflector 1310, respectively, to resonate the desired number of Stokes wavelengths. The second reflector 1310 is highly reflective of the fundamental laser beam and the desired Stokes wavelengths and is transmissive of the desired visible wavelengths.

In this example, the Bragg grating is a narrowband reflector such as for a single wavelength and if more than one wavelength is desired to be resonated in the Raman resonator 1301 then further Bragg gratings are used to reflect the first and optionally second Stokes wavelengths. Thus, if the resonator is to reflect the fundamental and the first two Stokes wavelengths then three Bragg gratings are used in series with one Bragg grating for each wavelength. A tunable non-linear medium 1335 (such as a suitable non-linear crystal and coupling optics) is located between the fibre Raman laser source 1315 and the reflector 1310. The non-linear medium 1340 can be tuned as described previously herein to selectably double or produce the sum frequency of either the fundamental or any of the resonating Stokes beams. Although not shown in FIG. 23a for reasons of simplicity, the non-linear medium 1240 may be provided with means for tuning according to any one of the possibilities described in the present specification. Thus for example it may be provided with an angle tuner, or a temperature tuner, or may comprise a plurality of individual non-linear media and may be provided with a plurality of temperature and/or angle tuners. Alternatively it may comprise a periodic structure which forms a grating within the medium, and the means for tuning may be a motor or similar means for translating the non-linear medium 1340 relative to the laser beam resonating in the external resonator Raman laser system. In operation, the laser or fibre laser 1320 pumps a fundamental laser beam through the focusing medium 1325 before the fundamental laser beam passes through the first reflector 1305 into the resonator 1301 which comprises the Raman fibre material 1315. The fundamental laser beam is then shifted to the desired number of Stokes wavelengths by the Raman fibre material 1315 before being frequency converted by the tunable non-linear medium 1340 to the desired visible wavelengths. The non-linear medium 1340 can be tuned to selectably double or produce the sum frequency of either the fundamental or any of the resonating Stokes beams as previously described herein. The second reflector 1310 is an output coupler, typically with high transmission for the output beam. Thus, The desired visible wavelength(s) is then outputted through the reflector 1310. For efficient laser operation, it is important that the coupling optics are designed so that the coupling losses are kept low. A separate laser 1320, eg Nd:YAG or another fibre laser such as a Nd or Yb fibre laser produces a fundamental beam which passes through a suitable focusing medium 1325 (such as suitable focusing optics) in a similar manner as described in FIG. 22. towards the Raman resonator 1325. The laser may be pulsed or continuous wave (cw).

Figure 23B:
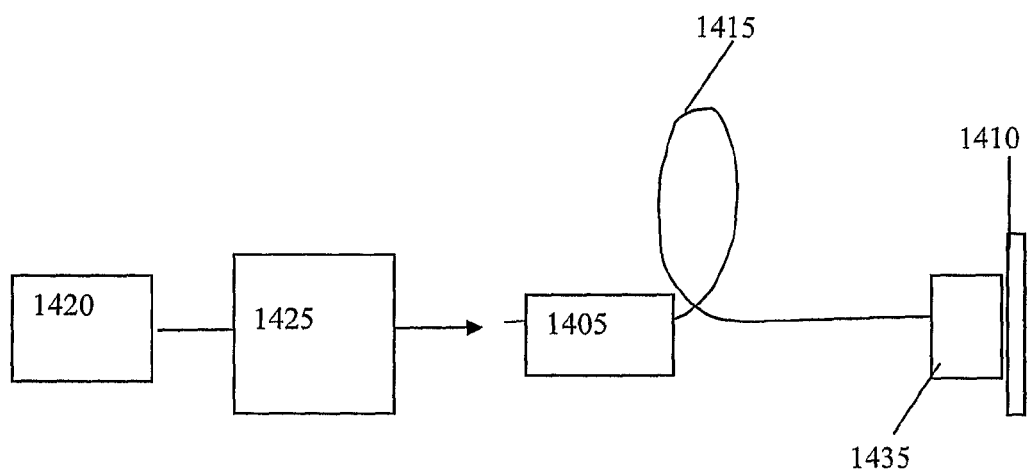
FIG. 23b is a diagrammatic representation of yet another embodiment of an external resonator Raman laser system according to the present invention.

In FIG. 23b, there is shown a fibre Raman laser system 1400 which is similar to the fibre Raman laser system 1300 described in FIG. 23a. The fibre Raman laser system 1400 is also an external Raman laser system which is pumped by a separate laser 1420, particularly Nd:YAG, or another fibre laser such as a Nd or Yb fibre laser. The laser could be pulsed or cw. In FIG. 23b, there is also shown a suitable focusing medium 1425 (such as suitable focusing optics), a first reflector 1405, a second reflector 1410, a fiber Raman laser 1415 and a tunable non-linear medium 1435 (such as a suitable non-linear crystal and coupling optics). Although not shown in FIG. 23b for reasons of simplicity, the non-linear medium 1435 may be provided with means for tuning according to any one of the possibilities described in the present specification. Thus for example it may be provided with an angle tuner, or a temperature tuner, or may comprise a plurality of individual non-linear media and may be provided with a plurality of temperature and/or angle tuners. Alternatively it may comprise a periodic structure which forms a grating within the medium, and the means for tuning may be a motor or similar means for translating the non-linear medium 1435 relative to the laser beam resonating in the external resonator Raman laser system.

However, in this example, the first reflector 1405 is a grating (such as a fibre Bragg grating described above) and the second reflector 1410 is a dielectric mirror. The second reflector 1410 is highly reflective of the fundamental and Stokes wavelengths and also acts as an output coupler typically with high transmission for the desired output beam. For efficient laser operation, it is important that the coupling optics are designed so that the coupling losses are kept low.

In operation, the laser or fibre laser 1420 pumps a fundamental laser beam through the focusing medium 1425 before the fundamental laser beam passes through the first reflector 1405 into the resonator 1401 which comprises the Raman fibre material 1415. The fundamental laser beam is then shifted to the desired number of Stokes wavelengths by the Raman fibre material 1415 before being frequency converted by the tunable non-linear medium 1435 to the desired visible wavelengths. The non-linear medium 1435 can be tuned to selectably double or produce the sum frequency of either the fundamental or any of the resonating Stokes beams as previously described herein. The second reflector 1410 is an output coupler, typically with high transmission for the output beam. Thus, the desired visible wavelength(s) is then outputted through the reflector 1410. For efficient laser operation, it is important that the coupling optics are designed so that the coupling losses are kept low.

At least one polariser (not shown) may be included in the cavity of the laser systems 1300 and 1400 and may be one or two plates of glass at Brewsters angle and/or a cube, angle rod(s)/crystal(s) or other polariser. Such polarisers cause the fundamental to lase on only one linear polarisation. It is preferable to place the polarizer in a location where there is no significant visible field.

Figure 23C:
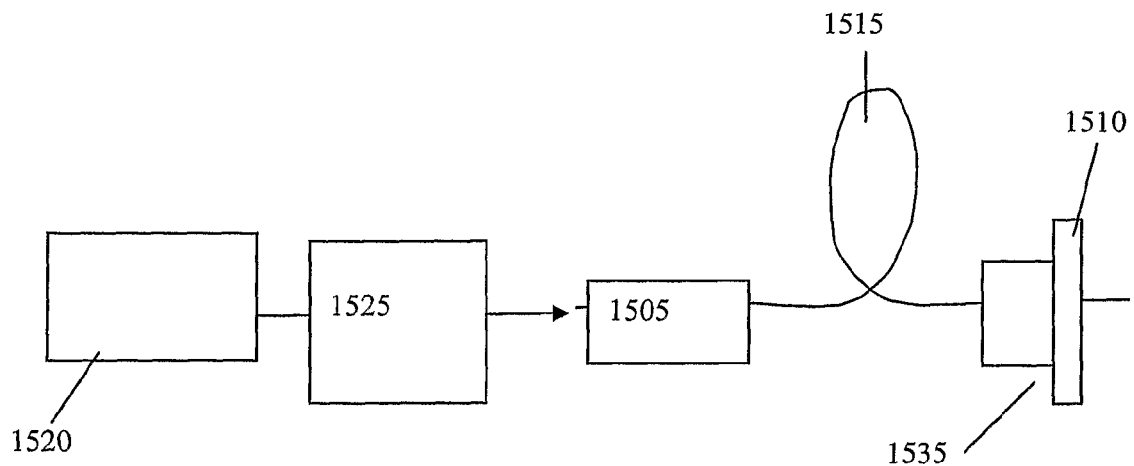
FIG. 23c is a diagrammatic representation of another embodiment of an embodiment of an intracavity Raman laser system using a fibre Raman laser according to the present invention.

In FIG. 23c, there is shown a fibre Raman laser system 1500 which is an intracavity Raman laser system. The fibre Raman laser system 1500 comprises a pump source 1520, a focusing medium 1525 (such as suitable focusing optics), a first and second reflector 1505 and 1510 which can be one or more gratings (such as a fibre Bragg gratings described above for FIG. 23a and FIG. 23b) or dielectric mirrors. In one example, the first reflector 1505 is a grating and the second reflector 1510 is a dielectric mirror which is highly transmissive to the fundamental and Stokes wavelengths as previously described. An optical fibre 1515 is doped, eg. with Nd or Yb ions, and performs the dual functions of a laser medium (generating the fundamental laser beam) and Raman-active medium (generating the Stokes beams). A tunable non-linear medium 1540 and coupling optics is located between the optical fibre 1515 and the reflector 1510.

In operation, the pump source 1520, pumps a laser beam through the focusing medium 1525 (such as suitable focusing optics) to produce a laser beam which passes through the first reflector 1505 into the doped optical fibre 1515. The optical fibre 1515 is doped, eg. with Nd or Yb ions, and generates the fundamental laser beam. The optical fibre 1515 also comprises the Raman-active medium which generates the Stokes wavelength beams. The shifted Stokes wavelengths are then frequency converted by the tunable non-linear medium 1540 and second reflector 1505 and is outputted through the output coupler/reflector 1510 which can be one or more gratings (such as a fibre Bragg grating. Although not shown in FIG. 23c for reasons of simplicity, the non-linear medium 1540 may be provided with means for tuning according to any one of the possibilities described in the present specification. Thus for example it may be provided with an angle tuner, or a temperature tuner, or may comprise a plurality of individual non-linear media and may be provided with a plurality of temperature and/or angle tuners. Alternatively it may comprise a periodic structure which forms a grating within the medium, and the means for tuning may be a motor or similar means for translating the non-linear medium 1540 relative to the laser beam resonating in the external resonator Raman laser system. Thus, the non-linear medium 1540 may frequency double, frequency sum or provide other frequency conversion to the Stokes or fundamental wavelengths so to provide a selectable output wavelength in the visible spectrum.

At least one polariser (not shown) may be included in the cavity of the laser system 1500 and may be one or two plates of glass at Brewsters angle and/or a cube, angle rod(s)/crystal(s) or other polariser. Such polarisers cause the fundamental to lase on only one linear polarisation. It is preferable to place the polarizer in a location where there is no significant visible field.

The examples described above may further comprise a step of providing an intracavity etalon. The intracavity etalon may prevent generation of parasitic laser wavelengths. The oscillation of these parasitic wavelengths with the fundamental may be the cause of very high laser fields (spiking) that surpass the damage threshold of the laser optics. The step of providing an intracavity etalon may be particularly relevant to flashlamp pumped Q-switched cavities although an intracavity etalon may be used in all cavities as described in the above examples.

Modifications and variations such as would be apparent to a skilled addressee are deemed to be within the scope of the present invention. It is to be understood that the present invention should not be restricted to the particular embodiment(s) described in the examples and accompanying figures.

The invention claimed is:

1. A laser apparatus selectable between two or more frequencies of output laser light, the laser apparatus comprising:
  a resonator cavity comprising mirrors or reflectors, and coatings thereon, to achieve high reflectivity for wavelengths in the cavity to simultaneously resonate at least first and second laser light beams in the cavity, each beam being of a different wavelength;
  at least one gain medium locate in the resonator cavity for generating the laser light beams;
  a tunable non-linear medium located in the cavity to frequency convert at least two different frequencies, disposed in the cavity to select at least one of the first and second laser light beams to be frequency converted to a frequency altered laser light beam comprising a single converted wavelength by tuning thereof, wherein the non-linear medium converts the selected laser beam(s) by a non-linear interaction selected from the group of second, third or fourth harmonic generation, sum frequency generation, difference frequency generation and otherwise-frequency-transformed generation not comprising Raman frequency conversion;
  a tuner to tune the tunable non-linear medium and to select the at least one laser beam from the group of the at least first and second laser beams; and
  an output coupler to output two or more different frequencies of output laser light for outputting the frequency altered laser light beam from the cavity, wherein the two or more different frequencies are derived from at least one of the first and second laser light beams;
  wherein the tunable non-linear medium is tuned to selectively frequency convert at least one of the first and second laser light beams to the frequency altered laser light beam.

2. The laser apparatus of claim 1 wherein the frequency altered laser light beam is polarised and the output coupler is a polarisation-sensitive output coupler capable of outputting two or more different frequencies of output laser light for outputting the frequency altered laser light beam from the cavity.

3. The laser apparatus of claim 1, wherein the output coupler is a mirror or reflector comprising coatings thereon adapted for outputting two or more different frequencies of output laser light, the output coupler being highly reflective at the frequency of each of the resonating laser light beams and transmissive at the frequency of the frequency altered laser light beam derived from the selected at least one of the first and second laser light beams.

4. The laser apparatus of claim 3, wherein the reflector is highly transmissive at the frequency of the frequency altered laser light.

5. The laser apparatus of claim 1 further comprising:
 a first gain medium comprising a laser material located in the cavity;
 a pump source located outside of the cavity for pumping the laser material with a pump beam, whereby the laser material generates the first laser beam; and
 a second gain medium comprising a Raman-active medium located in the cavity for Raman-shifting the first laser beam, to generate one or more Raman-shifted laser beams from the first laser beam comprising at least the second laser beam;
 wherein the tunable non-linear medium is disposed in the cavity to selectively frequency convert a laser light beam selected from the group of the first laser light beam and the one or more Raman-shifted laser beams to a frequency altered laser light beam comprising a single converted wavelength.

6. The laser apparatus of claim 5, wherein one or more of the laser material, the Raman-active medium and the non-linear medium is a solid.

7. The laser apparatus of claim 3 further comprising a Q-switch for converting continuous laser light into pulsed laser light.

8. The laser apparatus of claim 1, wherein the frequency altered laser light beam comprises a single converted visible wavelength in the range from 532 nm to 675 nm.

9. The laser apparatus of claim 1, wherein the frequency altered laser light beam comprises a single converted visible wavelength selected from the group of 470 nm, 532 nm, 555 nm, 559 nm, 579 nm, 588 nm, 589 nm, 593 nm, 606 nm, 621 nm, 636 nm 658 nm and 671 nm.

10. The laser apparatus of claim 1, wherein the tuner is selected from the group of an angle tuner and a temperature tuner.

11. The laser apparatus of claim 1 wherein the tuner is a temperature tuner and the temperature of the tuneable non-linear medium is tunable through a range of 25 degrees Celsius to 150 degrees Celsius for selection of at least one of the first and second laser light beams for conversion.

12. The laser apparatus of claim 1 wherein the tuner is an angle tuner and the angle of the tuneable non-linear medium is tunable through a range of 0 to 20 degrees for selection of at least one of the first and second laser light beams for conversion.

13. The laser apparatus of claim 1, wherein the non-linear medium is selected from the group of a temperature tunable non-linear medium, an angle tunable non-linear medium.

14. The laser apparatus of claim 1, wherein the tunable non-linear medium comprises two or more tunable non-linear media.

15. The laser apparatus of claim 14 wherein each of the two or more tunable non-linear media is associated with or coupled to a respective tuner to tune and detune the non-linear media with which it is associated or coupled.

16. The laser apparatus of claim 15 wherein each of the two or more non-linear media is selected from the group of a temperature tunable non-linear medium, an angle tunable non-linear medium, and each of the corresponding tuners is selected from the group of an angle tuner and a temperature tuner according to the selection of the respective non-linear medium.

17. The laser apparatus of claim 1, wherein the non-linear medium comprises a periodic structure which forms a grating within the medium, and wherein the tuner comprises a mechanical translator, for translating the non-linear medium laterally to the laser beam.

18. The laser apparatus of claim 1, further comprising an etalon located in the resonator cavity.

19. The laser apparatus of claim 1, further comprising a polariser located in the resonator cavity.

20. The laser apparatus of claim 1, further comprising a Q-switch located in the resonator cavity for converting the resonating laser light beams to pulsed resonating laser light beams.

21. The laser apparatus of claim 1, wherein the non-linear medium comprises a solid non-linear medium comprising at least two portions, wherein, in a first portion, the non-linear medium has a crystal cut angle aligned at a first angle to the propagation direction of the resonating light beams, and in a second portion, the non-linear medium has a crystal cut angle aligned at a second angle to the propagation direction of the resonating light beams.

22. The laser apparatus of claim 21 further comprising a plurality of portions, wherein the crystal cut angle of the non-linear medium in each portion is aligned at a respective axis to the optical axis of the laser cavity.

23. The laser apparatus of claim 21 wherein the first and second angles correspond to alignment angles for respective first and second non-linear interactions.

24. The laser apparatus of claim 21 wherein the first and second portions are adjacent and collinear with the propagation direction of the resonating light beams.

25. The laser apparatus of claim 21 wherein the first and second portions are diffusion bonded adjacent to each other.

26. The laser apparatus of claim 1 wherein the non-linear medium is a solid non-linear medium located in the cavity such that each of the at least two laser beams resonating in the cavity experience total internal reflection within the non-liner medium; wherein the non-linear medium has a crystal cut angle and is aligned with respect to the propagation direction of the resonating light beams such that prior to the site of the total internal reflection the crystal cut angle of the non-linear medium subtends a first angle to the propagation direction of the resonating light beams, and after the site of total internal reflection, the crystal cut angle subtends a second angle to the propagation direction of the resonating light beams.

27. The laser apparatus of claim 26 wherein the first angle corresponds to a first non-linear interaction and the second angle corresponds to a second non-linear interaction.

28. A method for selectively providing an output laser beam from a laser apparatus, said method comprising:
 a) generating at least two laser light beams in a resonator cavity comprising mirrors or reflectors, and coatings thereon, each beam being of a different wavelength, the coatings being adapted to achieve high reflectivity for wavelengths in the cavity to simultaneously resonate the at least two laser light beams in the cavity, the resonator cavity comprising an output coupler capable of outputting two or more different frequencies of output laser light, the two or more different frequencies being derived from at least one of the first and second laser light beams;
 b) selecting at least one of the first and second laser light beams to be frequency converted in a tunable non-linear medium capable of frequency converting at least two different frequencies, wherein the non-linear medium includes a tuner to tune the tunable non-linear medium, to select the at least one laser beam, and tuning the tunable non-linear medium to selectively frequency convert the selected laser light beam to a frequency altered laser light beam comprising a single converted wavelength, said frequency converting comprising converting the selected laser beam(s) by a non-linear interaction selected from the group of second, third or fourth harmonic generation, sum frequency generation, difference frequency generation and otherwise-frequency-transformed generation not comprising a Raman frequency shift; and c) outputting the frequency altered laser light beam from the cavity.

29. The method of claim 28 wherein the frequency altered laser light beam is polarised and the output coupler is a polarisation-sensitive output coupler capable of outputting two or more different frequencies of output laser light for outputting the frequency altered laser light beam from the cavity.

30. The method of claim 28 wherein the output coupler is a reflector capable of outputting two or more different frequencies of output laser light and being highly reflective at the frequency of each of the resonating laser light beams and transmissive at the frequency of the frequency altered laser light beam derived from the selected at least one of the first and second laser light beams.

31. The method of claim 30 wherein step (c) comprises outputting the frequency altered laser light beam from the cavity through the output coupler, wherein the output coupler is highly reflective at the frequency of each of the resonating laser light beams and highly transmissive at the frequency of the frequency altered laser light beam.

32. The method of claim 28 wherein step a) comprises generating each of the two beams in a solid medium.

33. The method of claim 28 further comprising:
d) selectively frequency converting at least one of the laser light beams to a different frequency altered laser light beam comprising a different single converted wavelength said frequency converting not comprising a Raman frequency shift and said different single converted wavelength not being the same as the single converted wavelength of step (b); and
e) outputting the different frequency altered laser light beam from the cavity through the output coupler.

34. The method of claim 28 further comprising:
d) stopping the outputting of the frequency altered laser light beam from the cavity in step c);
e) selecting at least one laser light beam from the group of the at least two laser light beams and the frequency altered laser light beam;
f) frequency converting the selected at least one laser light beam(s) in the tunable non-linear medium to a different frequency altered laser light beam comprising a different single converted wavelength said frequency converting not comprising a Raman frequency shift and said different single converted wavelength not being the same as the single converted wavelength of step (b); and
g) outputting the different frequency altered laser light beam from the cavity.

35. The method of claim 28 wherein step a) comprises generating a cavity laser beam in a resonator cavity by pumping a laser material located in the resonator cavity with a pump beam from a pump source located outside the cavity, shifting the wavelength of a portion of the cavity laser beam by passing the laser beam through at least one Raman-active medium located in the resonator cavity to form a Raman shifted beam wherein the cavity laser beam and the Raman shifted beam resonate in the cavity simultaneously.

36. The method of claim 28, wherein step (b) comprises a step selected from the group of selectively frequency converting at least one of the laser light beams to a frequency altered laser light beam comprising a single converted wavelength said frequency converting not comprising a Raman frequency shift by angle-tuning a non-linear medium in the resonator cavity and selectively frequency converting at least one of the laser light beams to a frequency altered laser light beam comprising a single converted wavelength said frequency converting not comprising a Raman frequency shift by temperature-tuning a non-linear medium in the resonator cavity.

37. The method of claim 28, wherein step (b) comprises selectively frequency converting at least one of the laser light beams to a frequency altered laser light beam comprising a single converted wavelength said frequency converting not comprising a Raman frequency shift by tuning a first non-linear medium in the resonator cavity and detuning a second non-linear medium whereby the second non-linear medium does not frequency convert at least one of the laser light beams.

38. The method of claim 37, wherein
step (b) comprises selectively frequency converting at least one of the laser light beams to a frequency altered laser light beam comprising a single converted wavelength said frequency converting not comprising a Raman frequency shift by tuning a first non-linear medium in the resonator cavity and detuning a second non-linear medium whereby the second non-linear medium does not frequency convert at least one of the laser light beams; and
step (d) comprises selectively frequency converting at least one of the laser light beams to a different frequency altered laser light beam comprising a different single converted wavelength said frequency converting not comprising a Raman frequency shift and said different single converted wavelength not being the same as the single converted wavelength of step (b) and detuning the first non-linear medium whereby the first non-linear medium does not frequency convert at least one of the laser light beams.

39. The method of claim 28 wherein step (b) comprises selectively frequency converting at least one of the laser light beams to a frequency altered laser light beam comprising a single converted visible wavelength said frequency converting not comprising a Raman frequency shift.

40. The method of claim 28 wherein step (b) comprises selectively frequency converting at least one of the laser light beams to a frequency altered laser light beam comprising a single converted visible wavelength in the range from 532 nm to 675 nm.

41. The method of claim 28 wherein step (b) comprises selectively frequency converting at least one of the laser light beams to a frequency altered laser light beam comprising a single converted visible wavelength selected from the group of 470 nm, 532 nm, 555 nm, 559 nm, 579 nm, 588 nm, 589 nm, 593 nm, 606 nm, 621 nm, 636 nm, 658 nm, and 671 nm.

42. A method of treatment, detection diagnosis of a selected area on or in a subject requiring such diagnosis or treatment, or visual display, the method comprising
(a) generating at least two laser light beams in a resonator cavity comprising mirrors or reflectors, and coatings thereon, each beam being of a different wavelength, the coatings being adapted to achieve high reflectivity for wavelengths in the cavity to simultaneously resonate the at least two laser light beams in the cavity, the resonator cavity comprising an output coupler capable of outputting two or more different frequencies of output laser light, the two or more different frequencies being derived from at least one of the first and second laser light beams;

(b) selecting at least one of the first and second laser light beams to be frequency converted in a tunable non-linear medium adapted for frequency converting at least two different frequencies, wherein the non-linear medium includes a tuner to tune the tunable non-linear medium, to select the at least one laser beam and tuning the tunable non-linear medium to selectively frequency convert the selected laser light beam to a frequency altered laser light beam comprising a single converted wavelength said frequency converting comprising converting the selected laser beam(s) by a non-linear interaction selected from the group of second, third or fourth harmonic generation, sum frequency generation, difference frequency generation and otherwise-frequency-transformed generation not comprising a Raman frequency shift;

(c) outputting the frequency altered laser light beam from the cavity; and (d) illuminating the selected area with the frequency altered laser light beam.

43. The method of claim 42 wherein the frequency altered laser light beam is polarised and the output coupler is a polarisation-sensitive output coupler capable of outputting two or more different frequencies of output laser light for outputting the frequency altered laser light beam from the cavity.

44. The method of claim 42, wherein the output coupler is a reflector capable of outputting two or more different frequencies of output laser light and being highly reflective at the frequency of each of the resonating laser light beams and transmissive at the frequency of the frequency altered laser light beam derived from the selected at least one of the first and second laser light beams.

45. The method of claim 42 wherein the non-linear medium is tuned by a either angle tuning or temperature tuning.

46. The method of claim 42 wherein step (b) comprises selectively frequency converting at least one of the laser light beams to a frequency altered laser light beam comprising a single converted visible wavelength in the range from 532 nm to 675 nm.

47. The method of claim 42 wherein step (b) comprises selectively frequency converting at least one of the laser light beams to a frequency altered laser light beam comprising a single converted visible wavelength selected from the group of 532 nm, 555 nm, 559 nm, 579 nm, 588 nm, 589 nm, 593 nm, 606 nm, 621 nm, 636 nm, 658 nm and 671 nm.

48. The method of claim 44 wherein the reflector is highly transmissive at the frequency of the frequency altered laser light beam.

49. The laser apparatus of claim 3 wherein the output coupler is greater than 50% transmissive at the single converted wavelength corresponding to either or both of first or second laser light beams.

50. The laser apparatus of claim 3 wherein the output coupler is highly reflective at wavelengths in the range of between 1064 nm and 1272 nm, and partially transmissive at wavelengths in the visible range of between 532 nm and 636 nm.

* * * * *